US005663547A

United States Patent [19]
Ziarno

[11] Patent Number: 5,663,547
[45] Date of Patent: Sep. 2, 1997

[54] METHOD OF FUND-RAISING WITH A KEYLESS CONTRIBUTION AND GIFT COMMITMENT MANAGEMENT DEVICE

[76] Inventor: Witold A. Ziarno, 4519 S. St. Louis Ave., Chicago, Ill. 60632

[21] Appl. No.: 505,610

[22] Filed: Jul. 24, 1995

Related U.S. Application Data

[63] Continuation-in-part of Ser. No. 318,914, filed as PCT/US94/09915, Sep. 6, 1994.

[51] Int. Cl.$^6$ ........................................ G06K 5/00
[52] U.S. Cl. .................... 235/380; 235/379; 235/385; 235/472; 902/4; 705/1
[58] Field of Search ............................ 235/380, 379, 235/385, 472; 902/4, 22; 364/401, 402, 406, 408

[56] References Cited

U.S. PATENT DOCUMENTS

| | | | |
|---|---|---|---|
| 4,454,414 | 6/1984 | Benton | 235/379 |
| 5,055,660 | 10/1991 | Bertagna et al. | 235/472 |
| 5,089,690 | 2/1992 | Okamura | 235/145 R |
| 5,206,488 | 4/1993 | Teicher | 235/380 |
| 5,221,838 | 6/1993 | Gutman et al. | 235/379 |
| 5,294,782 | 3/1994 | Kumar | 235/462 |
| 5,359,658 | 10/1994 | Goodson | 379/447 |
| 5,466,919 | 11/1995 | Hovakimian | 235/380 |
| 5,475,585 | 12/1995 | Bush | 364/401 |
| 5,546,303 | 8/1996 | Helbling | 364/401 |

*Primary Examiner*—Donald T. Hajec
*Assistant Examiner*—Michael G. Lee
*Attorney, Agent, or Firm*—Witold A. Ziarno

[57] ABSTRACT

A method of and device for streamlining, simplifying and inducing the giving of contribution or gift commitments by contributors or prospective gift givers [, and receiving thereof upon receipt that] involves dispersing through a crowd of prospective contributors or gift givers a plurality of keyless, electronic contributions or gifts management devices for immediate entry of consecutive data comprising the identities of the contributors or gift givers making the monetary contribution commitments or monetary gift commitments, and device therefor. Optionally, the method and mode of operation of the device involves a plurality of gift recipients of the monetary contribution or monetary gift commitments, and further includes the step of supplanting a gift recipient or fund-raising organization with another gift recipient or fund-raising organization to which contribution or gift commitments are made. The method and mode of operation of the device has the advantage that the entry of gifts or contribution commitments to a plurality of the gift recipients or fund-raising organizations is simplified. [Optionally, the method and the mode of operation of device includes the step of correlating a numerical amount to the successive contributors' or gift givers' data to obtain contribution or gift data sets, and in which the step of dispersing is selected from the group consisting of spreading, distributing, migrating, advancing, disseminating, and diffusing the devices. The method and mode of operation of the device further includes the steps of communicating the data for a plurality of contribution or gift commitments in a substantially continuous stream to a remote device for immediate recordation thereof on the remote device. Optionally, the method or mode of operation of the devices involves a plurality of consecutive contribution or gift commitments entered on the devices unimpeded by verification of authorization whereby the throughput of contribution or gift commitments entered on the devices is enhanced. In yet another variant of the method or mode of operation of the device involves a first group of contributors or gift givers making gift or contribution commitments on the devices that are correlated to a numerical contribution or gift amount and in other contributors or gift givers making gift or contribution commitments correlated to mutable contribution numerical amounts. The numerical amount is selected from the group of a pre-programmed numerical amount, a prearranged numerical amount, a fixed numerical amount, a variable numerical amount, a numerical amount of an order inducing the making of a monetary contribution, and a post-programmed numerical amount. The entry of the consecutive contributions or gifts further comprises immediate recordation thereof on the devices, and optionally further including the step of communicating the contribution or gift data to a card account processor for processing thereof.

22 Claims, 26 Drawing Sheets

$$C(p) \propto I_i \quad \sim 4062 \quad C(p) = (I_i)(k_1)$$

$$C(p) \propto M_i \quad \sim 4064 \quad C(p) = (M_i)(k_2)$$

$$C(p) \propto P_i \quad \sim 4066 \quad C(p) = (P_i)(k_3)$$

$$C(p) \propto G_i \quad \sim 4068 \quad C(p) = (G_i)(k_4)$$

$$C(p) \propto C_i \quad \sim 4070 \quad C(p) = (C_i)(k_5)$$

$$C(p) \propto N_i \quad \sim 4072 \quad C(p) = (N_i)(k_6)$$

$$C(p) \propto X_i \quad \sim 4074 \quad C(p) = (X_i)(k_7)$$

$$C(p) \propto A_i \quad \sim 4076 \quad C(p) = (A_i)(k_8)$$

FIG. 17a $$C(p) \propto \sum_{i=1}^{n} \left[ I_i \times M_i \times P_i \times G_i \times C_i \times N_i \times X \times X_i \times A_i \right]$$

$$X(s) \propto \S \qquad X(t) \propto t$$

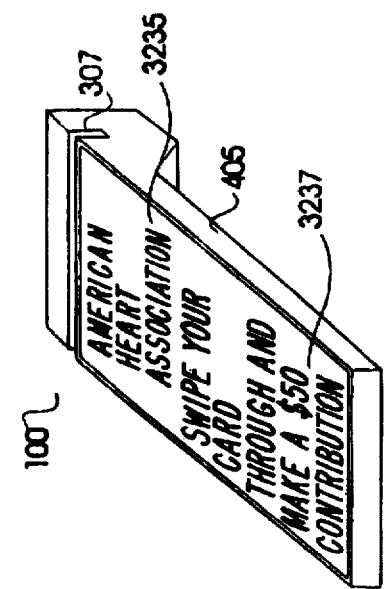
FIG. 21a
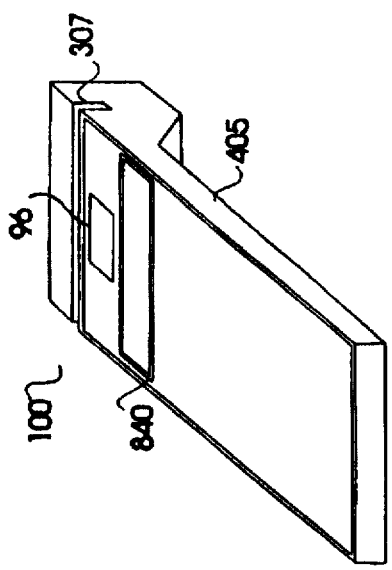
FIG. 21
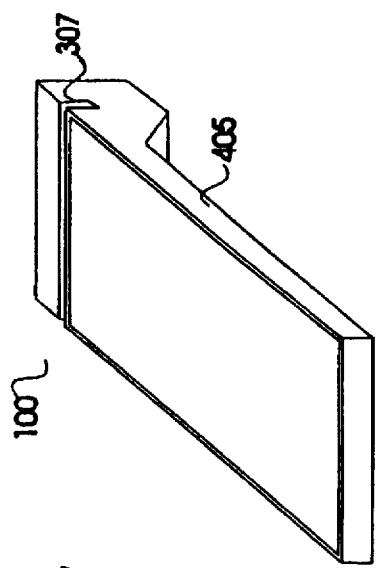
FIG. 21d
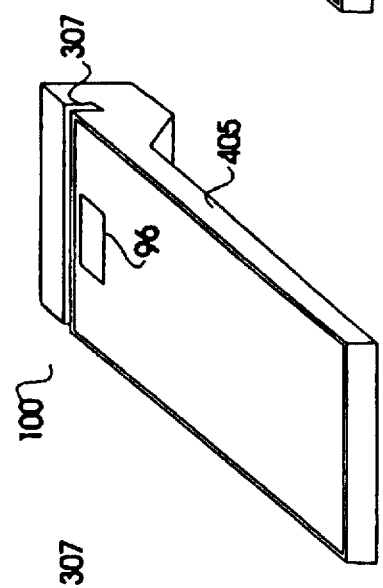
FIG. 21c
FIG. 21b

METHOD OF FUND-RAISING WITH A KEYLESS CONTRIBUTION AND GIFT COMMITMENT MANAGEMENT DEVICE

CROSS-REFERENCE TO RELATED APPLICATIONS (Claiming Benefit Under 35 U.S.C. 119 and 120)

This application is a continuation-in-part of pending U.S. patent application, Ser. No. 08/318,914, filed Oct. 5, 1994, now pending, and PCT Application US 94/09915 filed Sep. 6, 1994.

BACKGROUND

Technical Field: This invention relates generally to a method of providing a keyless and dual mode contribution and gift commitment management device to maximize contribution and gift commitments and device therefor, particularly, it relates to an electronic contribution or gift commitment management terminal or peripheral that provides for the entry and recordation of contribution and gift commitments extremely efficiently by only requiring a single action on the part of contributors or gift givers in one mode of operation, and provides for a second mode of operation that provides for contributors and gift givers to make successive contribution or gift commitments that are their contribution of gift commitment preferences. The invention provides a streamlined method of fund raising and gift making and providing substantiation for contributions and gifts made to fund raising organizations and gift recipients that maximizes that making of and consummation of monetary contribution or gift commitments.

Fund-raising organizations and recipients of gifts are typically assisted in the solicitation of contributions and gifts through the use of pledges, and the like. A contributor or gift giver is requested to make a pledge, and then later to honor the pledge. A problem with this type of fund-raising is that a number of pledges do not get honored. Some contributors or gift givers forget about their pledge. Another problem is that when a pledge is solicited the contributor or gift giver may not have his check book with him or may not have adequate cash on hand to make a contribution or gift. Moreover, the contributor's or gift giver's financial situation may have changed between the making of a pledge and the honoring the pledge so that he no longer has adequate resources, even though the contributor or gift giver had adequate resources available at the time a pledge was made.

Moreover, the impulse for a contributor or gift giver to make a pledge is maximized at the time a pledge is solicited. However, the impulse dissipates over time, and as such when it comes time to honor the pledge and consummate the pledge (at a time remote from when the pledge was solicited and made) the contributor or gift giver generally does not have the same desire to do so. In any event, in such situations fund raising organizations or gift recipients lose pledged contributions and gifts. There exists a need for an apparatus and method that allows a fund-raising organization or gift recipient to capture the impulse of a contributor or gift giver to make a contribution or gift commitment and consummate a contribution or gift prior to the dissipation of the impulse of the contributor or gift giver to make the contribution or gift commitment.

If a contributor or gift giver is a cardholder and wishes to make a contribution or gift at a fund-raising event by way of an information bearing card, for example a credit or debit card, there is no convenient way available for the contributor or gift giver to make a contribution or gift conveniently or rapidly. Hence, the contributor's or gift giver's ardor, impulse, and desire to make a contribution or gift will dissipate before a contribution or gift, by way of cash or check, can be obtained from the card bearing contributor or gift giver.

Another possibility is that a fund raising campaign or gift recipient may have a short time period allocated for the solicitation of contributions and gifts. Known information bearing card processing terminals require a procedure of verification of authorization of amounts of the contributions and gifts, validity of the cardholder's accounts, or identity of the cardholder for each encounter and are thus too slow for passing the device from contributor or gift giver to contributor or gift giver. Consequently, due to the inconvenience a cardholder is less likely to make a contribution or gift. Moreover, these types of terminals do not allow a plurality of cardholders to sequentially make contributions and gifts rapidly during a time allocated to the contribution or gift process to be practical. There exists a need for a fund-raising contributions and gifts management terminal or peripheral that will allow for the immediate recordation of contributions or gifts in a short amount of time.

Interposing a verification of authorization step between sequential contributions or gifts results in delay, that further inconveniences a group of contributors or gift givers who are cardholders making them less likely to contribute by information bearing card. Interposing a request for authorization further raises the specter that where a group of sequential contributors or gift givers, 1 through n, are solicited for contributions and gifts, the ardor and desire of the nth contributor or gift giver in the sequence will have dissipated (e.g. the nth contributor or gift giver grows impatient or looses his desire to make a gift or contribution), by the time contributor or gift giver 1 through contributor or gift giver n−1 have recorded contribution or gift information, requests for authorization have been obtained for each contribution or gift, signatures for each contribution or gift have been obtained, or a combination thereof. There exists a need for a contributions and gifts management terminal and method that does not interpose a request for authorization between a plurality of sequential contributions or gifts whereby contributors or gift givers are not inconvenienced and the ardor to make a contribution or gift is captured in time and space.

Known methods by which a contributor or gift giver makes a contribution or gift do not induce or facilitate the making of a contribution or gift in that when approached by a fund-raiser or gift recipient, a contributor or gift giver may not have cash on him to make a contribution or gift. Moreover, a contributor or gift giver may not have his check book with him. Hence, there is a high probability that the fund raiser or gift recipient will not receive any contribution or gift from an individual if that is the case. There exists a need for a contributions and gifts management fund-raising terminal that immediately records card contributions and gifts by cardholders, and a method of fund-raising and gift making that induces and facilitates the making of a contribution or gift.

Furthermore, processing of contributions and gifts is costly and generally requires time and resources: to scout out contribution or gift prospects, to solicit a pledge on behalf of a fund-raising organization or gift recipient, to have a contributor or gift giver fill out a pledge card, to have the contributor or gift giver honor the pledge, and considerable time and resources to process a pledge made by cash or check to get it into the fund-raising organization's or gift recipient's account. There exists a need for a quicker, more efficient, less costly method and apparatus to solicit, and manage contributions and gifts.

Further, known methods by which a contributor or gift giver makes a contribution or gift allow for the external stimulus that induces the making of a contribution or gift to dissipate before the contribution or gift is consummated. With respect to pledges, known pledging methods remove the consummation of the contribution or gift process in time and space from the point where an external stimulus for inducing the making of a contribution or gift is exerted on a contributor or gift giver or on a group of contributor or gift givers or gift givers. The problem of removing the consummation of the contribution or gift process in time and space from the point of exertion of maximum stimulus, is that the impulse to make a contribution or gift decays and dissipates over time. As the impulse dissipates over time a contributor or gift giver is less likely to consummate the contribution or gift or less likely to contribute a larger contribution or gift amount than he or she would otherwise give if the consummation of the contribution or gift process were to occur near the point of maximum stimulation to make a contribution or gift.

By way of example, where a fund-raiser or gift recipient solicits a pledge from a contributor or gift giver the solicitation of a pledge, and pledge commitment is usually made during a point close to the maximum stimulus to the prospective contributor or gift giver to make a contribution or gift. However, a pledge commitment is generally honored at a time and place remote from the time and place the pledge commitment was solicited and made. Interposing a period of time between the solicitation and making of a pledge and honoring of a pledge results in a dissipation of the impulse to make a contribution or gift. The result is that fund-raisers and gift recipients are usually required to make several follow-ups solicitations in order to consummate the contribution or gift, e.g. actually get the contributor or gift giver to fill out a check in the amount of the contribution or gift, and mail the check to the fund-raising organization or gift recipient.

Since the contributor or gift giver has at this point been far separated in time and space from the external stimulus applied to make the contribution or gift, the impulse to make a contribution or gift has decayed and dissipated, and it is more difficult to consummate the contribution or gift. There exists a need for a method of facilitating, consummating, and inducing a monetary contribution or gift that allows the contribution or gift to be consummated at a time and place where the impulse, or the external stimulus creating the impulse, to make a contribution or gift is greatest. There exists a need for a fund-raising contributions and gifts management terminal and method that obtains successful consummations of contribution or gift prior to the dissipation of the impulse or motivation to make a contribution or gift.

Fund-raisers and gift recipients are faced with limited resources that include man-power resources, and other tangible resources. By way of example, assuming that a fund-raising organization has a plurality of simultaneous events competing for man-power, a fixed group of resources with which to gather and solicit contributions or gifts, and a scenario where it would be logistically impossible to service all of the competing events, a fund-raising organization must allocate its resources in such a way as to maximize the contributions and gifts over the competing events. There exists a need for a method of allocating the resources of a fund-raising organization that will maximize the quantity and size of contributions and gifts over a number of competing events given a fixed amount of resources.

Similarly, assuming that a fund-raising organization or gift recipient has a multiplicity of prospective contributor or gift givers at a single event, a fixed group of resources with which to gather and solicit contributions or gifts at a single event and a limited amount of time during which to gather contributions and gifts, and a scenario where it would be logistically impossible to solicit all of the prospective contributors or gift givers, a fund-raising organization or gift recipient must allocate its resources in such a way as to maximize the contributions and gifts during the single event. There exists a need for a method of dispersing, circulating, and allocating the resources of a fund-raising organization during an event that will maximize the quantity and size of contributions and gifts given a fixed amount of resources. That is, there exists a need for a method of allocating contribution management terminals to maximize results of contribution or gift sessions that are generally conducted with limited staffing, limited seed money, and a lack of volunteers.

A further problem is that when a solicitor of contributions and gifts contacts a contribution or gift prospect, he or she generally has no background information concerning the prospect's historical propensity to give or his ability to give, e.g. his or her affluence. As a result the solicitor may request a contribution amount that is less than the amount that the prospect has the ability, propensity, or means to absorb. Hence, the contribution potential of an individual prospect may not be maximized. There exists a need for a contributions and gifts management terminal that can provide message prompts corresponding to a contributor or gift giver's or gift giver's ability to give, historical propensity to give, and that provides the ability to determine how large of a contribution or gift to request based on a prospect's perceived ability to contribute.

A further problem is risk of loss associated with the large amount of contributions or gifts that are stored on a contributions and gifts management terminal or peripheral. A contributions and gifts management terminal may have tens of hundreds of successive contributions or gifts stored thereon representing tens of thousands of dollars of contributions and gifts. Loss or damage to a single terminal may jeopardize a significant number of contributions and gifts resulting in the great loss of the information concerning the contributions or gifts. There exists a need for a method of safe-guarding and fail-safe apparatus for safe-guarding the multiplicity of contributions or gifts stored on contribution management terminals.

Gift recipients have no convenient way of facilitating the making of gifts at social occasions by way of information bearing card. There social occasions include weddings, birthday parties, christenings, funerals, other religious rites, and the like. There exists a need for a method of facilitating and inducing the making of monetary gifts made by information bearing card that immediately records successive gifts rapidly at weddings, birthday parties, baptisms, graduations, anniversaries, and the like. There also exists a need for a contributions and gifts management terminal or peripheral that increases the immediate recordation of a plurality of successive by eliminating portions of the decision making process surrounding the making of a plurality of successive contributions including the time needed to select a preferred gift amount.

It would be highly desirable to solve the variety of problems enumerated above facing fund raisers and gift recipients, and members of fund-raising organizations in soliciting contributions and gifts by way of information bearing cards. It is an object of the present invention to solve the variety of problems enumerated above facing fund raisers and gift recipients.

It is an object of the present invention to provide a fund-raising and gift giving method and contributions and gifts management terminal, and system that can collect, analyze, and display statistical information associated with a contribution or gift or a plurality of respective contributions and gifts and provide useful quantitative data.

SUMMARY OF THE INVENTION

These and other objects of the present invention are achieved in a method of streamlining, simplifying and inducing the giving of contribution or gift commitments by contributors or prospective gift givers, and receiving thereof upon receipt that involves dispersing through a crowd of prospective contributors or gift givers a plurality of keyless, electronic contributions or gifts management devices for mediate entry of consecutive data comprising the identifies of the contributors or gift givers making the monetary contribution commitments or monetary gift commitments, and device therefor. Optionally, the method and mode of operation of the device involves a plurality of gift recipients of the monetary contribution or monetary gift commitments, and further includes the step of supplanting a gift recipient or fund-raising organization with another gift recipient or fund-raising organization to which contribution or gift commitments are made. The method and mode of operation of the device has the advantage that the entry of gifts or contribution commitments to a plurality of the gift recipients or fund-raising organizations is simplified.

Optionally, the method and the mode of operation of device includes the step of correlating a numerical amount to the successive contributors' or gift givers' data to obtain contribution or gift data sets, and in which the step of dispersing is selected from the group consisting of spreading, distributing, migrating, advancing, disseminating, and diffusing the devices. The method and mode of operation of the device further includes the steps of communicating the data for a plurality of contribution or gift commitments in a substantially continuous stream to a remote device for immediate recordation thereof on the remote device. Optionally, the method or mode of operation of the devices involves a plurality of consecutive contribution or gift commitments entered on the devices unimpeded by verification of authorization whereby the throughput of contribution or gift commitments entered on the devices is enhanced. In yet another variant of the method or mode of operation of the device involves a first group of contributors or gift givers making gift or contribution commitments on the devices that are correlated to a numerical contribution or gift amount and in other contributors or gift givers making gift or contribution commitments correlated to mutable contribution numerical amounts. The numerical amount is selected from the group of a pre-programmed numerical amount, a prearranged numerical amount, a fixed numerical amount, a variable numerical amount, a numerical amount of an order inducing the making of a monetary contribution, and a post-programmed numerical amount. The entry of the consecutive contributions or gifts further comprises immediate recordation thereof on the devices, and optionally further including the step of communicating the contribution or gift data to a card account processor for processing thereof.

Optionally, the method and mode of operation includes the step of temporarily retaining substantially identical data of the contribution and gift commitments at said device and at another remote device simultaneously. Means for capturing information of a plurality of consecutive card record mediums of contributors or gift givers with out breaking up of the capture of the information of the card record mediums is provided. These and other objects of the present invention are further described herein in the description of the preferred embodiments.

BRIEF DESCRIPTION OF THE DRAWINGS

FIG. 17a is a diagram of formulas applied in the utilization of methods of the present invention;

FIG. 21 is a perspective view of a variant of the fund-raising contributions and gifts management terminal or peripheral;

FIGS. 21a–21d are perspective views of variants of keyless contributions and gifts management terminals or peripherals;

DETAILED DESCRIPTION OF THE PREFERRED EMBODIMENTS

Figure 1:
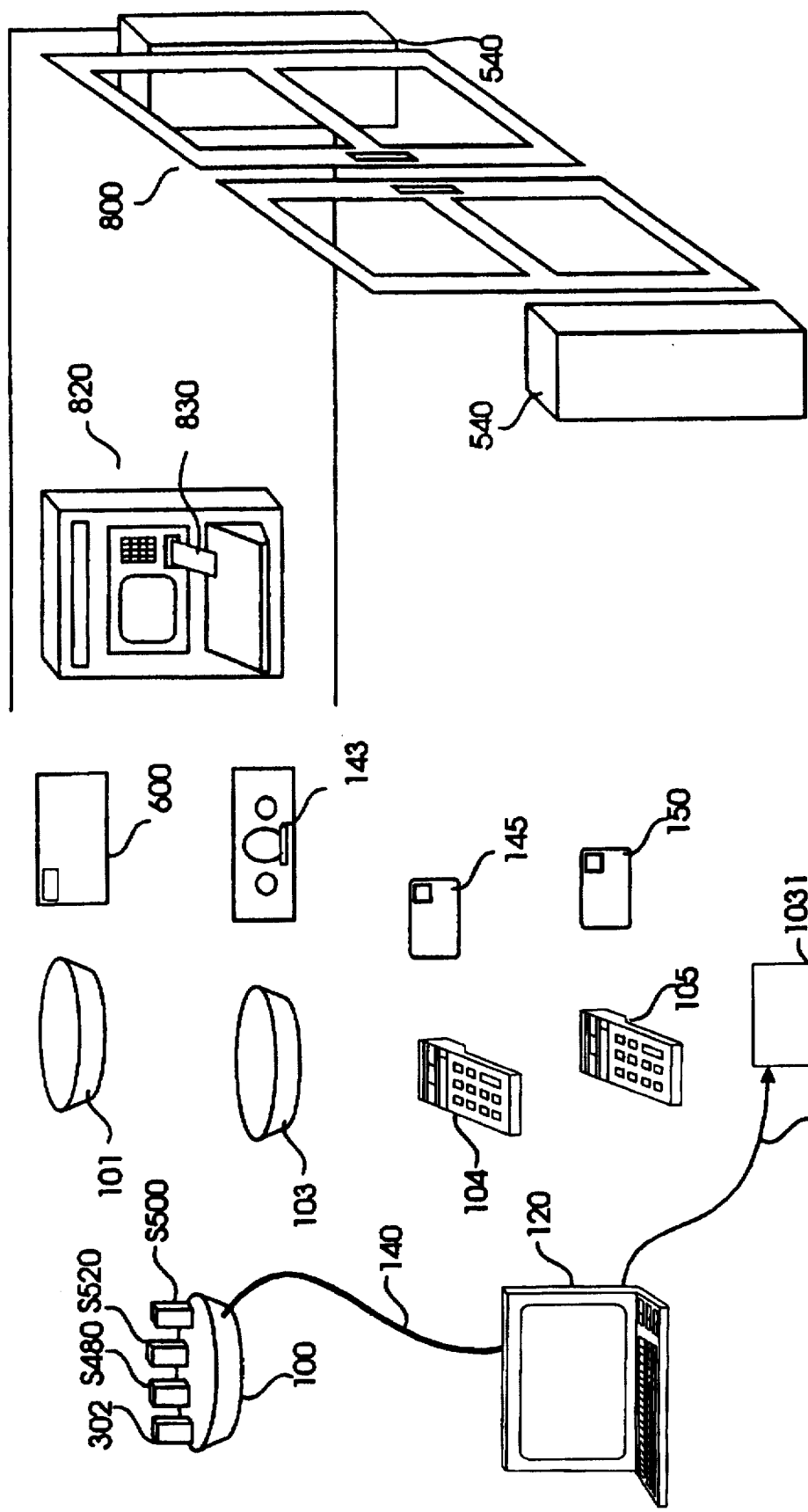
FIG. 1 is a diagram illustrating an overall system of a gift and contributions management terminal network according to the present invention.

FIG. 1 illustrates an overall configuration of a contributions and gifts management terminal or peripheral network according to the present invention. An electronic contributions or gifts management terminal 100 or peripheral 100 is used by a fund-raiser or gift recipient at a fund-raising event or social event for the solicitation and receiving of contributions and gifts. Fund raising events include charity balls, political fund raising dinners, benefit concerts, sports events, door to door contribution or gift solicitation, personal contribution or gift solicitation, and the like. Social events include weddings, funerals, interments, last rites, burials, burial ceremonies, anniversaries, birthday parties, graduation parties, religious rite events, and the like.

A fund-raiser can include a charitable organization. A charitable organization generally is an organization that is awarded nonprofit status by the IRS, or other tax processing governmental body. Charitable organizations include non-profit tax exempt organizations that are classified under Section 501(c)(3) of the IRS Code. This classification is a reliable indicator of the tax deductibility of contributions and gifts. Charitable organizations defined under Section 501(c)(3) of the IRS Code are divided into two classes: public charities and private foundations. A public charity solicits funds from the public and uses the funds to sponsor or support social, educational, or religious activities, or engage in activities that provide for relief for distressed or underprivileged individuals. Public charities are defined in Section 509(a)(1–4) of the IRS Code.

Included in the group of charitable organizations are churches, conventions or associations of churches; educational organizations; hospitals and medical research organizations; organizations created to benefit state and municipal colleges and universities that normally receive their support from the government or the general public; and other publicly supported organizations such as museums, libraries, support groups for cultural organizations, organizations for the gathering of contributions and gifts for research into and the elimination of medical disorders, and organizations that provide direct services to the public.

Fund-raising organizations also include organizations that receive the majority of their support from activities relating to their tax exempt functions, such as a museum's receipts or tuition paid to an educational institute. Fund raising organizations or gift recipients also include public television, radio, and other forms of media organizations that derive support from the public by way of contributions and gifts.

Fund-raising organizations also include those organized exclusively to support other qualified public charities, such as churches, schools, and hospitals; those operated for the purpose of testing products for public safety; and, private foundations established to maintain or aid social, educational, religious, or other charitable purposes.

A "fund-raiser" or "fund-raising organization" is a private foundation; a tax exempt corporation; a not-for-profit corporation; an organization organized and operated exclusively for religious, charitable, scientific, testing for public safety, literary, or educational purposes, to foster national or international amateur sports competition, and/or for the prevention of cruelty to children or animals; a civic league; an organization not organized for profit but operated exclusively for the promotion of social welfare; and, private for profit an not-for-profit organizations that gather a contribution or gift on behalf the above mentioned organizations. Exemplary organizations may include the Red Cross, the Boy Scouts, the Girl Scouts, Salvation Army, American Heart Association, American Diabetes Association, United Way Crusade of Mercy, high schools, grammar schools, colleges, museums, and fund-raising arms of other organizations, the like.

A "fund-raising organization" and/or "fund-raiser" also includes a political organization, a party, committee, association, fund, or other organization, fund, or other organization (whether incorporated or not) organized and operated primarily for the purpose of directly or indirectly accepting a monetary contribution or gift or making an expenditure, or both, for an "exempt function." An exempt function includes the function of influencing or attempting to influence the selection, nomination, election, or appointment of an individual to any Federal, State, or local public office or office in a political organization, or the election of Presidential or Vice-Presidential electors, whether or not such an individual or electors are selected, nominated, elected, or appointed; and, a campaign committee, and/or a fund established for the nomination or election of an individual to a Federal, State, or Public office.

A "fund-raiser" or "fund raising organization" can also include an ad hoc committee or organization created for the direct or indirect gathering of a monetary contribution or gift for a charitable goal. It may include an organization or fund established for a humanitarian purpose such as raising resources for an organ transplant, for feeding or clothing needy people, and the like.

Information bearing cards as referred to herein are used for making of a monetary contribution or gift by a contributor or gift giver who is a cardholder. An example of an information bearing card is a credit card including, credit cards issued by an organization. Such cards are: VISA, MasterCard, Discover, and an American Express cards. An information bearing card as used herein refers also to a debit card including, by way of example, a Cirrus card, a Plus card, a Maestro card, an Interlink card, and any other type of card that can be used for an electronic fund transfer. The term "card" also contemplates a private label card issued or maintained by a fund-raising organization or an affiliate of a fund-raising organization, and a prepaid card that can be purchased by cash, check, credit, or debit cards. An information bearing card can be a credit card, debit card, or combination thereof. Different information bearing cards are used herein including magnetic striped cards and cards having electronic circuits thereon.

Figure 3:
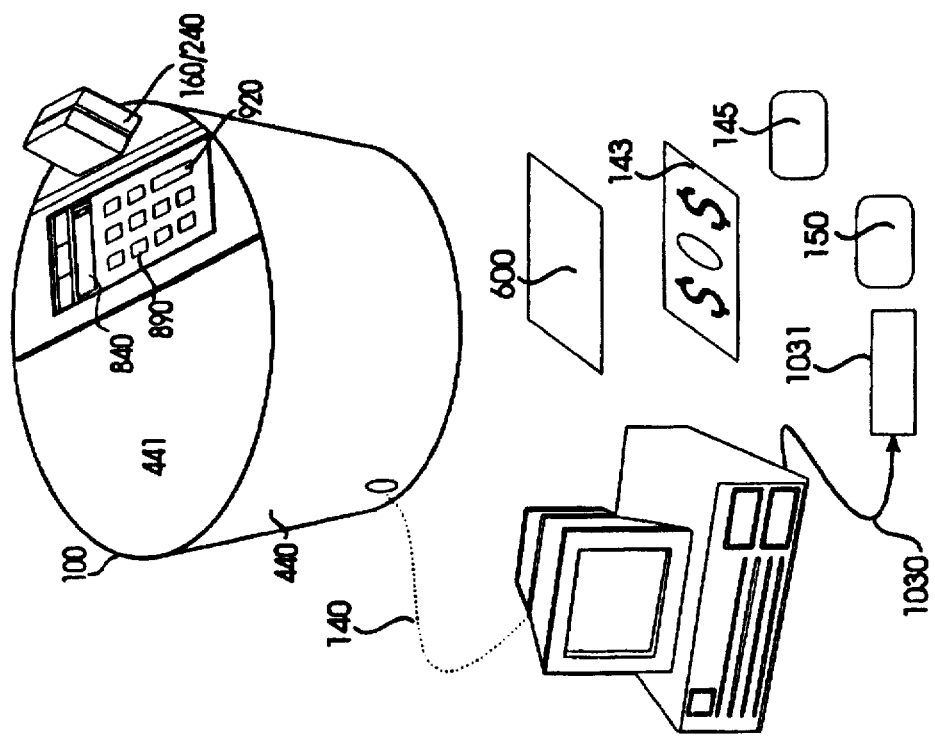
FIG. 3 is a perspective view of an electronic contributions and gifts management terminal or peripheral with a card processor, and capable of accepting cash, check, or envelope contributions and gifts.

Electronic contributions or gifts management terminal 100 or peripheral 100 of the type in FIG. 3 mounts a card processor 160/240 that processes contributions and gifts, and a card reader and accompanying circuitry that reads smart cards, e.g. PCMCIA cards, JEIDA/PCMCIA compliant memory cards, IC cards, GEC Card Technology LTd. IC cards, West Midlands, U.K. and/or Gemplus Card Services memory and microprocessor cards. The present invention contemplates the use of contact less IC cards, e.g. such as those available from Mitsubishi Electric UK Ltd., Hatfield UK, and Oakwood design, Letchworth UK, and the like.

Other forms of information bearing cards are also usable with fund-raising electronic contributions or gifts management terminal 100 or peripheral 100 embodiments.

Figure 2:
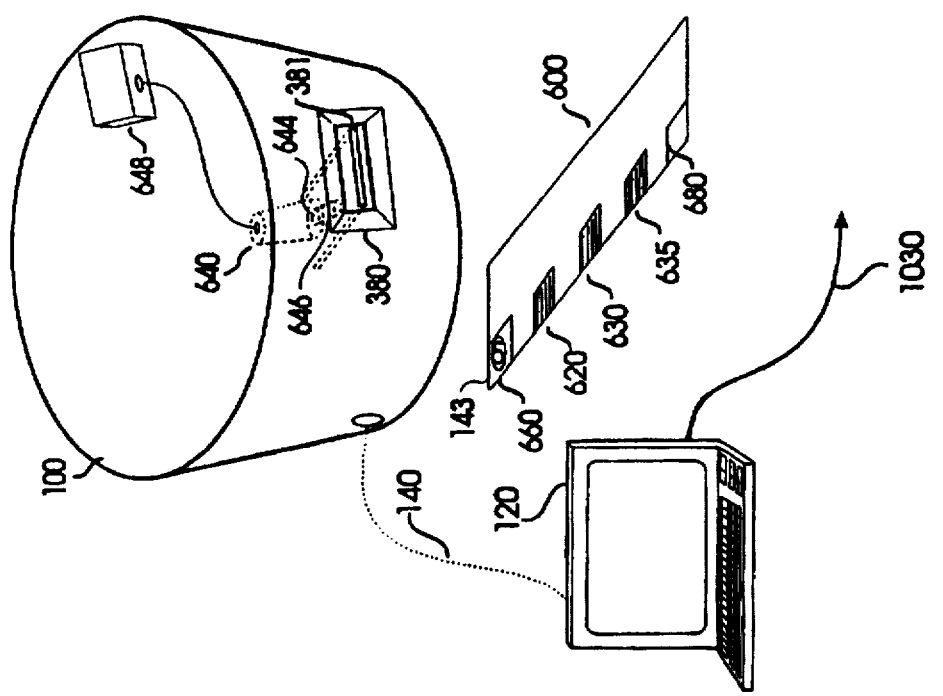
FIG. 2 is a perspective view of a bar coded envelope, an embodiment of an fund-raising terminal with an envelope contribution or gift acceptor, and a fund-raiser's terminal.

The electronic contributions or gifts management terminal 100 or peripheral 100, FIGS. 1 and 2, accepts a cash currency contribution 143, an envelope 600 containing a cash contribution or gift, a credit card 145 contribution or gift, and/or a debit card 150 contribution or gift. Electronic contributions or gifts management terminal 100 or peripheral 100 collects, stores, and provides information about a contributor or gift giver and a contribution or gift. In the embodiment of FIG. 1, the electronic contributions or gifts management terminal 100 or peripheral 100 is a portable unit with a wire-less communication link 140. The electronic contributions or gifts management terminal 100 or peripheral 100 is a portable hand-held unit with a wire-less communication link 140. Using a communication link 140, preferably an RF (radio frequency) communication link, an infra-red communication link or other free-propagating electromagnetic energy communication link, the electronic contributions or gifts management terminal 100 or peripheral 100 communicates information about a contributor or gift giver and the contribution or gift to a fund-raiser's terminal or peripheral 120 in the embodiment shown. As used herein, the term, "fund-raiser's terminal or peripheral," refers to a terminal or peripheral that can be used by personnel associated with a fund-raising organization or gift recipient, such as its business manager, a secretary, a clerk, a volunteer acting on behalf of the fund-raiser or gift recipient, or an accountant, etc.

In another embodiment, the electronic contributions or gifts management terminal 100 or peripheral 100 immediately; at once; without delay; directly; forthwith; or combination thereof, records the information about the contributor or gift giver and the contribution or gift or a plurality of successive, sequential, in line, and/or in succession contributors or gift givers and their corresponding monetary contributions and gifts, e.g. each contributors' or gift givers' respective card information and respective information representative of a numerical monetary contribution or gift amount for each respective contributor or gift giver, it has accepted in a data storage 302, and then at a later time it can be off-loaded and communicated to fund-raiser's or gift recipient's terminal or peripheral 120 via communication circuitry 990 (FIG. 1a) and a communication link 140, e.g. after a single event fund-raising or social event or after a full day of such fund-raising or social events. Terminal or peripheral 100 and/or terminal or peripheral 120 is optionally programmed to correlate sequential, serial, continuously made, consecutively made, chain of, and/or string of data sets of information that identify the specific event with contributor or gift giver data sets comprised of contribution information. As such, the contributors and gift givers acknowledgments of the contributions and gifts will identify the social event, fund-raising event, recipient of the contribution or gifts, as appropriate. The fund-raiser's or gift recipient's terminal or peripheral 120 can be located on-site or at some remote location. The fund-raiser's or gift recipient's terminal or peripheral 120 communicates the information about the successive, systematic, in order, and/or in regular order contributors or gift givers and their respective contributions or gifts, or a plurality of contributor s or gift givers and their corresponding numerical contribution or gift amounts, e.g. card information and information representative of a numerical monetary contribution or gift amount for each respective contributor or gift giver, via a communication link 1030, which by way of example, can be a telephone hookup, with a card account processor 1031, or the like. A card account processor can also be a funds processing telecommunications network, third party card processor, a bank, or a combination thereof. A card account processor can also be computer network, e.g. the Internet, VISA Net, a merchant bank, a card processing bank or organization, or a combination thereof.

Figure 12:
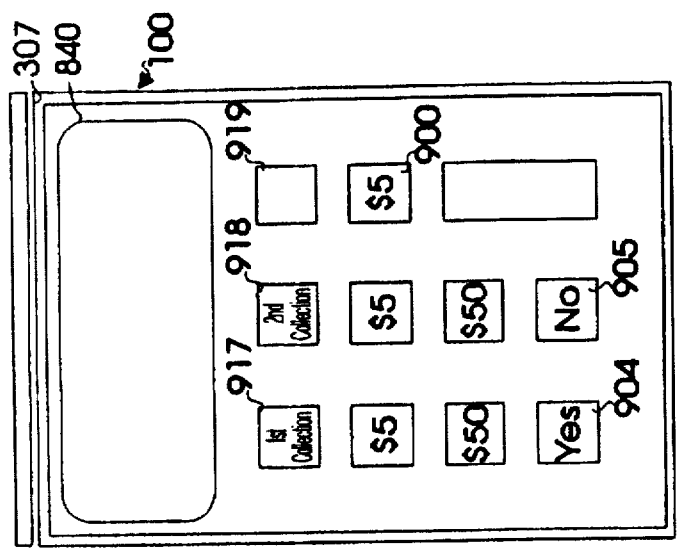
FIG. 12 is a plan view of a face of a terminal or peripheral for soliciting contributions and gifts for a fund-raising organization or gift recipient where there are multiple causes during each collection of a contributions and gifts.
Figure 13:
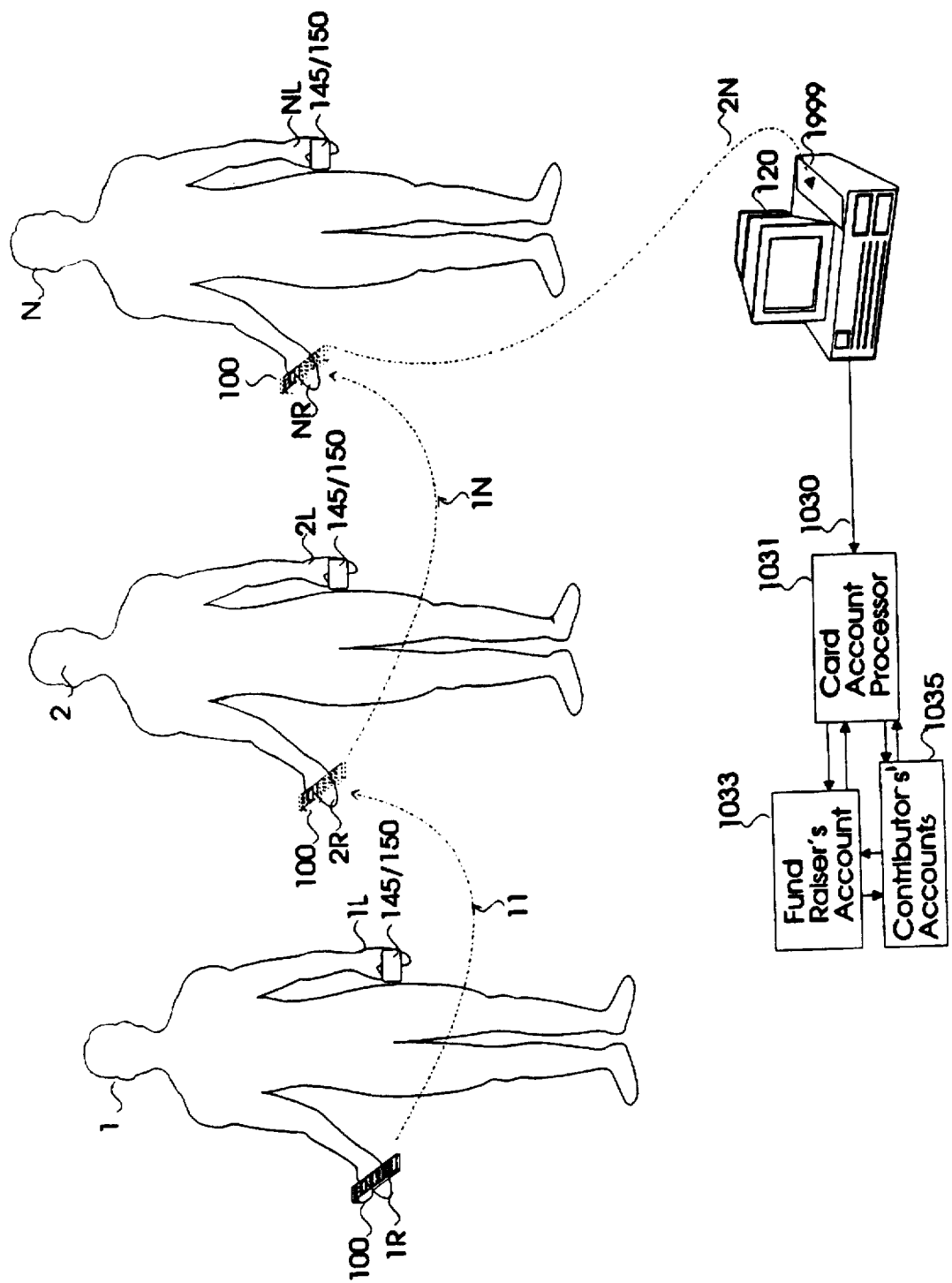
FIG. 13 is a diagram of a method of soliciting contributions and gifts for a fund-raising organization or gift recipient.
Figure 14:
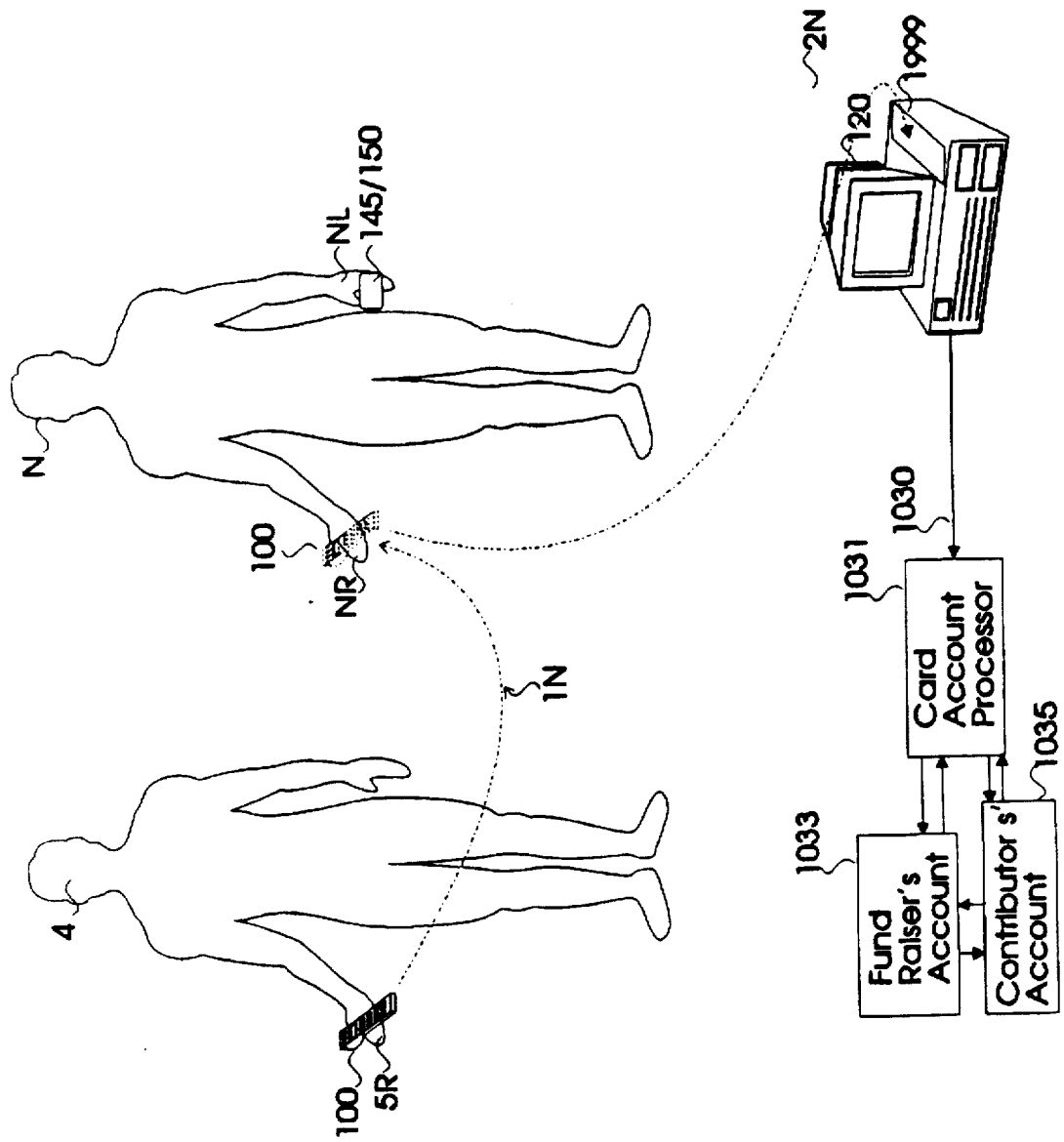
FIG. 14 is a diagram of another embodiment of the method of soliciting contributions and gifts illustrated in FIG. 13.

All embodiment of the electronic contributions or gifts management terminal 100 or peripheral 100 is hand-held and comprises a card reader 307, means for manually entering a monetary contribution or gift amount, an optional visual display 840 for displaying numerical information of the amount entered, an on-board battery power source (preferably, a rechargeable battery power source) 1437, a data storage 302, and an optional program storage. Preferably the case of the fund raising electronic contributions or gifts management terminal 100 or peripheral 100 is of a size and shape to easily fit into the palm of a contributor's or gift giver's hand. The contributor or gift giver's thumb can rest on a side wall of the case of the electronic contribution or gifts or gifts management terminal 100 or peripheral 100 and other fingers on the same hand can bear against a second side wall of an opposite side of the case of the electronic contributions or gifts management terminal 100 or peripheral 100. This allows the contributor or gift giver to easily hold the electronic contributions or gifts management terminal 100 or peripheral 100 in one hand. The size and shape of the electronic contributions or gifts management terminal 100 or peripheral 100 also assists in the passing of the electronic contributions or gifts management terminal 100 or peripheral 100 from one contributor or gift giver to another (FIG. 12). It will be further understood that the optional size and shape of the case of the hand-held electronic contributions or gifts management terminal 100 or peripheral 100 further allows for the contributor or gift giver to hold the terminal in one hand while being able to pass an information bearing card, for example a credit card or a debit card, with the contributor or gift giver's other hand through a card reader on the electronic contributions or gifts management terminal 100 or peripheral 100 (FIGS. 13 and 14).

An embodiment of electronic contributions or gifts management terminal 100 or peripheral 100 communicates information about successive contributors or gift givers, e.g. card information, and the contribution or gift amount, e.g. numerical monetary amount information, or a plurality of contributor or gift givers or gift givers and their corresponding contribution or gifts and gifts, e.g. card information for each respective contributor or gift giver and information representative of a numerical contribution monetary amount for each respective contributor or gift giver, directly via a communication link 1030, for example, a telephone hookup, thereby bypassing the fund-raiser's or gift recipient's terminal or peripheral 120 to a funds processing database 1031, and the like. The card account 1035 of the contributor or gift giver is appropriately charged the amount of the contribution or gift, or debited for the contribution or gift, as appropriate, and the account of the fund-raising organization 1033 is augmented respectively (FIGS. 13 and 14).

An example of a electronic contributions or gifts management terminal 100 or peripheral 100 optionally has a credit card processor 160, and/or a debit card contribution or gift processor 240. Such a processor directly utilizes a cellular communication link, or other standard telephone hookup. The electronic contributions or gifts management terminal 100 or peripheral 100 immediately records successive, sequential, in line, and/or in succession contributors' or gift givers' card account and contribution or gift information in a data storage 302. After the fund-raising event or day (or a portion thereof) of soliciting contributions and gifts, a communication link 1030 is connected directly to a processor 160/240 and/or data storage 302, and communication circuitry 990 via a communication link 1030 transfers contributor or gift giver information to a card account processor 1031, and the like. The card account of the contributor or gift giver 1035 is appropriately charged or debited the amount of the contribution or gift and the account of the fund-raising organization 1033 is augmented respectively (FIG. 13).

A contribution or gift can be made on an off-line electronic contributions or gifts management terminal 100 or peripheral 100. The electronic contributions or gifts management terminal 100 or peripheral 100 does not interpose a request, or requests, for an authorization or verification, an authorization step, pre-authorization step, verification step, or combination thereof, between the making, entering, immediate recording, or combination thereof, of a contribution or gift made by a first contributor or gift giver, and subsequent contributions or gifts made by a plurality of subsequent contributor or gift givers or gift givers.

In yet another variant of the method of the present invention, the terminal 100, the peripheral 100, the network, and/or the system described herein optionally have a mode of operation in which consecutive data sets are entered, and/or recorded uninterrupted, uninterferred with, uncut in on, unbroken in on, unimpeded, and/or uniformly entered, and or recorded.

In another embodiment of the method disclosed herein, the terminal 100 or peripheral 100 does not interpose a request for an authorization or verification, an authorization step, pre-authorization step, verification step, or combination thereof, between the making of a sub-group of contributions or gifts within a group of contributions or gifts (N) made by contributor or gift giver$_1$ through contributor or gift giver$_{N-1}$, e.g. at a single fund-raising or social event such as a dinner or the like. By way of example, there may be several hundred cardholder contributions or gifts, e.g. N=500. Sequential contributions or gifts are made by contributor or gift giver 1 to contributor or gift giver 500 prior to interposing a request for an authorization or verification, an authorization step, pre-authorization step, verification step, or combination thereof. In another variant, a sequential contributions or gifts are made by contributor or gift giver 1 to contributor or gift giver 500 prior to interposing a request for an authorization or verification, an authorization step, pre-authorization step, verification step, or combination thereof, between contribution or gift 10 and contribution or gift 11, contribution or gift$_n$ (where n is an integer greater than 10) and contribution or gift$_{n+1}$, or combination thereof. Electronic contributions or gifts management terminal 100 or peripheral 100, fund-raiser's or gift recipient's terminal or peripheral 120, a card account processor 1031 (including a clearing organization and/or an issuing organization), fund-raising terminal network, or combination thereof, post contribution or gift processes card information and contribution or gift numerical amount information. Post contribution or gift processing may include a request for authorization or verification, an authorization step, pre-authorization step, verification step, or combination thereof. It will be understood that a plurality of sequential contributions and gifts made by a first contributor or gift giver, a second contributor or gift giver, and ... nth contributor or gift giver can be made at a electronic contributions or gifts management terminal 100 or peripheral 100 off-line before the information representative of the contributions and gifts, e.g. card information and numerical contribution or gift amount information, is off-loaded from an off-line electronic contributions or gifts management terminal 100 or peripheral 100 to card account processor 1031, fund-raiser's or gift recipient's terminal or peripheral 120, or combination thereof, for processing and authorization. It is further understood that the speed with which a multiplicity of sequential contributions and gifts can be accepted from a large group of sequential contributor or gift givers or gift givers is greatly accelerated since a request for authorization or verification, an authorization, preauthorization, verification step, or combination thereof, is not interposed between an entry of card information and entry of a numerical monetary contribution or gift amount by each respective contributor or gift giver. It is yet further understood that this method and apparatus allows down stream contributor or gift givers or gift givers to be closer in time and place to the stimulus, or impulse created by the stimulus, to make a contribution or gift transaction.

By way of example, there may be several thousand cardholder contributor or gift givers or gift givers at an event, e.g. a Papal Mass, a convention, at an out-door concert, zoo, the republican or democratic national convention, at an auditorium, at a church, at a church hall, an out door religious service, an outdoor fund-raising event at a national park, at a seminar, at a rally, at a banquet hall, at a movie theater, at a sporting event, etc. Electronic contributions or gifts management terminal 100 or peripheral 100$_1$ through electronic contributions or gifts management terminal 100$_X$ (where X is an integer) are circulated, interspersed, or dispersed among the prospective cardholding contributors or gift givers. Successive sequential, in line, and/or in succession contributions or gifts are made on and immediately recorded on electronic contributions or gifts management terminals of peripherals 100 by each respective cardholding contributors or gift givers desiring to do so. Each respective electronic contributions or gifts management terminal 100 can receive several hundred successive, systematically entered, in order, and/or in regular order contributions or gifts without need of input of additional information. Tens of hundreds of contributions or gifts are received at one fund-raising or social event by electronic gifts and contributions management terminals 100$_{1-X}$. These tens of hundreds of contributions and/or gifts are then off-loaded at the end of such an event from the electronic contributions and gifts management terminals 100$_1$ to 100$_X$ for further processing as described above. It will be seen that literally tens of hundreds of contributions or gifts can be received from cardholder contributors or gift givers in a single social or fund-raising event. The apparatus and method of the invention are highly efficient in receiving possibly tens of thousands of dollars of contributions and gifts within a single event, the event lasting a matter of hours. It is further understood that the impulse to make a contribution or gift for the group of card holding contributor or gift givers or gift givers at the single event is captured in time and space.

The request for authorization or verification, authorization step, verification step, or combination thereof, is optionally decoupled from each respective contribution or gift at the time the entry of a respective contributor's or gift giver's respective card information and contribution or gift amount information is entered, immediately recorded, or combination thereof, into a electronic contributions or gifts management terminal 100 or peripheral 100.

It will be further understood that a plurality of contributions and gifts can be accepted in a short amount of time utilizing this procedure and mode of operation of terminal 100 or peripheral 100 and that contributions and gifts that are later found to be unauthorized can be discarded and only authorized contributions and gifts are then credited to a fund-raiser's or gift recipient's account 1033 and debited to a contributor's or gift giver's account 1035. It is also possible to store the group of unauthorized transactions so that the contributors or gift givers making these contribution or gift transactions can be contacted to resubmit their respective contributions and gifts.

The dispersion, circulation, or combination thereof, of a plurality of terminals 100 or peripherals 100 among a group of prospective contributors or gift givers for the immediate recordation of contributions or gifts is preferred in the method of the present invention. Dispersion, circulation, or the combination thereof, of a plurality of terminals or peripherals 100 increases the speed within which a multiplicity of contributions or gifts are recorded on the terminals, and allows for a significant improvement in the immediacy and interplay between a fund raiser and a prospective gift giver and contributor, thus increasing the impulse to make a contribution of gift. This results in an increase of the size of the average contribution of gift made by a contributor or gift giver, and an increase in the total number of contributions or gifts made by a group of prospective gift givers or contributors.

At or near an entrance or exit, as shown in FIG. 1, of a place of where a fund-raising event or social event 800 is held, there can be located a receipt generator 820. The receipt generator 820 produces a receipt for an individual contribution or gift or a plurality of respective individual contributions and gifts. In a variant the gifts and contributions management terminal 100 or peripheral 100 transmits card information and contribution or gift amount information to receipt generator 820 via a wireless communication link for successive contributors or gift givers who elect to obtain a receipt for their contribution or gift at or near the time their respective contribution or gift was entered onto electronic contributions or gifts management terminal 100 or peripheral 100. In a variant, receipt generator 820 is located at a remote location from electronic contributions or gifts management terminal 100 or peripheral 100, and is a portable electronic battery operated unit. The location of the receipt generator 820 at a location remote from terminals 100 or peripherals 100 increases the speed within which contributions or gifts are made and immediately recorded on terminals 100 or peripherals 100. This is desirable given the short amount of time generally allocated to contribution or gift sessions.

The receipt 830 is used to substantiate a contribution or a plurality of successive contributions made by a single contributor or gift giver over a period of time, or by a plurality of successive contributors or gift givers made over a period of time. Substantiation may be required to receive a tax benefit from a governmental taxing authority, e.g. the Internal Revenue Service, or a state or local taxing or tax processing body. By way of example, computer 3397 (FIG. 230) records the contributions or gifts made by contributor or gift maker X over a period of time, e.g. one year, 6 months. Computer 3397 has a mode of operation that automatically selects, categorizes, and determines whether or not a specific data set comprised of a contribution, gift, or portion thereof, qualifies for a charitable contribution or gift deduction. If a specific contribution, gift, or portion thereof, qualifies for a charitable contribution thereof the data set it is automatically added to a register of contributions or gifts of contributor or gift maker X, and/or correlated with a data set comprised of an appropriate designation. If a specific contribution, gift, or portion thereof, does not qualify for a charitable contribution deduction, this contribution, gift, or portion thereof, is added to another register of contributor or gift giver X storing this type of gift or contributions, and/or associated with a data set comprised of this designation. After a period of time, contributions or gifts made by gift maker X are automatically processed by computer 3397 in its mode of operation, e.g. an expert software scheme, and contributor or gift giver X is sent an acknowledgment acknowledgment, corroboration, affirmation, or recognition by way of printer 3396 listing contributions that are in the register that qualifies for a charitable contribution deduction, and optionally, listing contributions, gifts, or portions thereof that do not so qualify. It is understood that contributions or gifts made by contributor X to a multiplicity of recipients of gifts or contributions can be easily processed in this manner. Further, it is understood that a multiplicity of contributors or gift givers can have contributions and gifts that are made to a multiplicity of recipients of contributions or gifts assembled, processed and acknowledged this way. One of the benefits of the automated acknowledgment process revolves developing contributor or gift giver loyalty to a particular gift or contribution recipient, and substantially decreased effort on the part of the contributor or gift maker in assembling records needed for justification of charitable contribution deductions made to a plurality of gift or contribution recipients. Further, the data sets comprised of contributions optionally have data sets representative of which portion of a contribution or gift qualifies for a charitable contribution or gift deduction correlated thereto. This assists in the processing of the contributions or gifts by computer 3397. Data sets described herein are optionally entered, made, and/or sequentially, in series, continuously, consecutively, as a chain, and/or as a string. Further data sets described herein optionally consist essentially of contributor or gift giver identity information, contributor or gift giver numerical contribution or gift amount information, cause information, tax deductibility status of a gift or contribution information, candidate information, gift recipient information, or combination thereof.

Electronic contributions or gifts management terminal 100 or peripheral 100 can communicate via a communication link, preferably an RF (radio frequency) communication link or an infra-red communication link, with the receipt generator 820. Electronic contributions or gifts management terminal 100 or peripheral 100 can instead communicate contribution or gift and contributor or gift giver information, via a communication link to a fund-raiser's or gift recipient's terminal or peripheral 120. Fund-raiser's or gift recipient's terminal or peripheral 120 then communicates the contributor or gift giver and contribution or gift information to a receipt generator 820. The communication consists of information about the contributor or gift giver, the contribution or gift, the date, the special fund or intention for which the contribution or gift was given, data sets comprised of whether or not the contribution or gift qualifies for a charitable contribution deduction, and the like. The communication consists of the same type of information wherein card information and contribution or gift information is associated for each respective contributor or gift giver where a large group of contributor or gift givers or gift givers makes contributions and gifts via electronic contributions or gifts management terminal 100 or peripheral 100 prior to transmitting the information to a card account processor 1031.

Upon receipt of the communication, the receipt generator 820 processes the information about the contributor or gift giver, the contribution or gift, or the data sets comprised of the status of the contribution or gift in terms of whether or not is qualifies for a charitable contribution deduction to generate a receipt 830. The receipt 830 may be generated automatically by the receipt generator 820 to be picked up by the contributor or gift giver or attender of a fund raising or social event after a fund-raising or social event or solicitation of a contribution or gift, or may be generated at the request of the contributor or gift giver or attender after the event as the contributor or gift giver is leaving the place of contribution or gift, or may be generated for mailing or faxing to the contributor or gift giver or attender. A contributor or gift giver may desire the receipt 830 for tax purposes or for determining if the contributor or gift giver is meeting a contribution or gift quota.

The present invention also contemplates optionally locating the receipt generator 820 on an electronic contributions or gifts management terminal 100 or peripheral 100, and generating receipt 830 at electronic contributions or gifts management terminal 100 or peripheral 100.

In yet another embodiment of the method of the invention a record of the contribution or gift is generated at a card account processor 1031, a bank, or combination thereof, and forwarded to a contributor or gift giver. A receipt for a contribution or gift appears on a contributor's or gift giver's monthly credit card statement, bank statement, or combination thereof. Optionally, an annual, or after some other appropriate time period, a statement is forwarded to a respective contributor or gift giver itemizing all contributions and gifts given, e.g. to charitable organizations, for tax purposes, or otherwise. The format of the statement can be such that a tax processing entity, e.g the IRS, will accept the information for substantiating the contribution or gift or group of contributions and gifts at issue, and/or grant a charitable contribution or gift deduction. It will be understood that records of the contribution or gift transactions made by tens of hundreds of cardholder contributor or gift givers or gift givers can easily be processed and forwarded to each respective contributor or gift giver of the tens of hundreds of contributor or gift givers or gift givers for meeting contribution or gift quotas and for substantiating charitable contribution or gift deductions and the like given at a plurality of fund-raising management terminals 100.

Security for fund-raising or social events is provided by a theft deterrent 540 located at or near an entrance or exit of a fund-raising event 800 to deter the theft of the electronic contributions or gifts management terminal 100 or peripheral 100. Theft deterrents are well known in the art. Security systems used in retail stores can be used, for example, the present invention contemplates that the electronic contributions or gifts management terminal 100 or peripheral 100 can contain a detectable element that can be detected by the theft deterrent 540. As such, if someone attempts to unlawfully take the electronic contributions or gifts management terminal 100 or peripheral 100 through an entrance or exit of a place of a fund-raising event 800 or past a sensor, an audible or visible alarm signal, or the like, will be generated. A homing device can be placed on the terminal 100 or peripheral 100 to allow tracking of the terminal 100 or peripheral 100, e.g a system comparable to systems used to trace stolen automobiles.

The present invention includes provision for an optional tallier service routine S480, a set of software routines which run on a electronic contributions or gifts management terminal 100 or peripheral 100, fund-raiser's or gift recipient's terminal or peripheral 120, at a card account processor 1031, or combination thereof, to tally a plurality of successive contributions and gifts. In an alternate embodiment, service routine S480 is located within the fund-raiser's or gift recipient's terminal or peripheral 120. The service routine S480 tallies a credit card 145 contribution or gift, a debit card 150 contribution or gift, a cash contribution or gift 143, an envelope 600 containing a cash contribution or gift, and combinations thereof. Moreover, service routine S480 performs a number of arithmetic functions including but not limited to addition, subtraction, multiplication, division, as well as a statistical calculation on the successive contributions and gifts. Service routine S480 is connectable to commercially available accounting programs in such is desired.

In conjunction with a printer, electronic contributions management terminal 100 or electronic gift management peripheral 100, fund-raiser's or gift recipient's terminal or peripheral 120, or combination thereof, are used to generate a report commonly used for accounting purposes, including but not limited to a summary of total contributions and gifts generated, a monthly statement, a histogram, a contribution or gift average per contributor or gift giver, sub-group of contributor or gift givers or gift givers, or group of contributor or gift givers or gift givers.

Figure 1A:
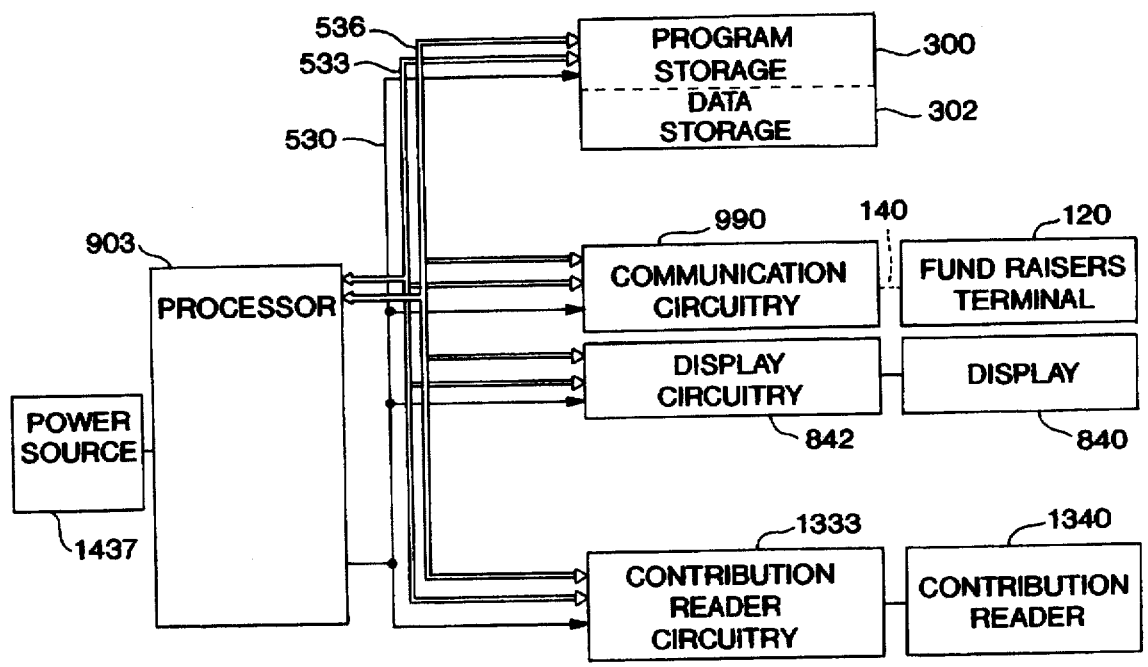
FIG. 1a is a general schematic block diagram of an embodiment of an exemplary contributions and gifts management terminal system according to the present invention.

The fund-raising terminal network of the present invention, which includes a hand-held electronic gifts management terminal 100 or electronic contributions management peripheral 100, a fund-raiser's or gift recipient's terminal or peripheral 120, a card account processor 1031, or combination thereof, collects, analyzes, and visually displays statistical information associated with an individual contribution, successive contributions or gifts immediately recorded thereon, a tally of individual contributions and gifts, or combination thereof. The electronic contributions or gifts management terminal 100 or peripheral 100 contains an optional statistical information collecting routine S500, a set of software routines which run on processing circuitry 903 (FIG. 1a). In a variant, the statistical information collecting routine S500 is located in the fund-raiser's or gift recipient's terminal 120 or peripheral 120. The statistical information collecting routine S500 collects contribution or gift data from the contribution or gift reader 1340 and associated circuitry 1333 (FIG. 1a), and communicates it to storage 302 (FIG. 1a). A statistical information analyzing routine S520, a set of software routines which run on a electronic contributions or gifts management terminal 100 or peripheral 100 located within the electronic contributions or gifts management terminal 100 or peripheral 100 in one embodiment, or in the fund-raiser's or gift recipient's terminal or peripheral 120 in an alternate embodiment, then retrieves contribution or gift data from data storage 302 and performs arithmetic and statistical calculations thereon.

FIG. 1a is a general schematic block diagram of a terminal 100 or peripheral 100 of an embodiment of the present invention which includes a contribution or gift reader 1340, contribution or gift reader circuitry 1333, a power source 1437, and optional communication circuitry 990. Although display circuitry 842 is shown in this general embodiment of the invention, display 842 is optional.

In the present embodiment, processing circuitry 903 includes a microprocessor. However, multiple microprocessors, or a plurality of dedicated microprocessors can also be used. Processing circuitry 903 and associated circuitry are powered through a power source 1437. Processing circuitry 903 interfaces with associated circuitry via an address bus 536, data bus 533, and a control bus 530. Specifically, upon detection by the contribution or gift reader 1340 that a contribution or gift is being made, the contribution or gift reader circuitry 1333 interrupts the processing circuitry 903. The circuitry 903 responds to the interrupt by reading the buffered contribution or gift information. Circuitry 903 then immediately records and stores the contribution or gift information in storage 302. The reading and immediate recording of contributions and gifts is accomplished for successive or consecutive contributions or gifts. In one embodiment, circuitry 903 also adds the new contribution or gift information to a running total of contribution or gift information stored in the storage 302. Terminal 120 or peripheral 120 can also have the same type of configuration as that described for as electronic contributions or gifts management terminal 100 or peripheral 100 above.

A variety of links and associated circuitry are used in the present invention. By way of example, the link 140 is a serial link and associated circuitry in one embodiment, an RS-232 link and associated circuitry in another embodiment, modem circuitry in communication with the circuitry 990 in yet another embodiment, an RF or infra-red link and associated circuitry, or combination thereof.

A variety of additions, not shown, can be added to the embodiment of the processing circuitry 903 illustrated in FIG. 1a. By way of example, a currency reader and associated circuitry, a keyboard and associated circuitry, a touch sensitive screen and associated circuitry, a bar code reader and associated circuitry, an optical character recognition reader and associated circuitry, an electronic signature line and associated circuitry, a fingerprint scanner and associated circuitry, a card reader 307 and associated circuitry 309, a coin reader and associated currency, and a bill dispenser and associated currency, and combinations thereof can be added.

The fund-raiser's or gift recipient's terminal or peripheral 120 drives a printer in one embodiment to produce a hard copy of a report representing data or information sent to terminal 120 via the communication circuitry 990 located in an electronic contributions or gifts management terminal 100 or peripheral 100. In another embodiment, optional service routine S1200 (FIG. 1b), runs on processing circuitry 903 located in electronic contributions or gifts management terminal 100 or peripheral 100. Processing circuitry 903 communicates successive contributor or gift giver and contribution or gift information to communication circuitry 990 which drives a printer to print out data via a wired link, for example, an RS-232 cable. Similarly, electronic contributions or gifts management terminal 100 or peripheral 100 can use a serial link to drive a printer directly via communication circuitry 990.

Display circuitry 842 includes a buffer and LED drive circuitry which processing circuitry 903 can write information into in one embodiment. Display circuitry 842 responds to data written into the buffer by displaying that information via a control bus 530.

Contribution reader 1340 (FIG. 1a) and associated circuitry 1333 optionally includes a credit card processor, a debit card processor, a currency validator, a currency discriminator, a currency acceptor, a coin discriminator, a coin validator, a bar code scanner, or a combination thereof.

Moreover, power source 1437 is a battery power source in one embodiment, and can be a portable rechargeable power source in another embodiment. Preferably, the battery is a rechargeable power source, and is located on the electronic contributions or gifts management terminal 100 or peripheral 100 so as to be easily accessible during replacement or recharging thereof. The power source 1437 can include a hardwired power supply. The present invention also contemplates use of a light responsive energy source such as a photo-cell. In such an embodiment, not shown, the battery life of electronic contributions or gifts management terminal 100 or peripheral 100 can be enhanced in that energy is obtained from sources of light such as the sun or indoor lighting. The light responsive energy source can be used to supplement the power source 1437. In a variant, software routines on electronic contributions or gifts management terminal 100 or peripheral 100 assist in conserving electrical energy from power source 1437 by deactivating the circuitry or portions thereof, e.g. the display, of electronic contributions or gifts management terminal 100 or peripheral 100. Circuitry of electronic contributions or gifts management terminal 100 or peripheral 100 is reactivated once there is card information detected by reader 307 and associated circuitry, or combination thereof. In yet a further variant, a back-up power source is provided to power source 1437. In yet a further variant, contribution or gift transaction data is semi-permanently stored for future off-loading in data storage 302 in the event there is a loss of power from power source 1437.

Figure 1B:
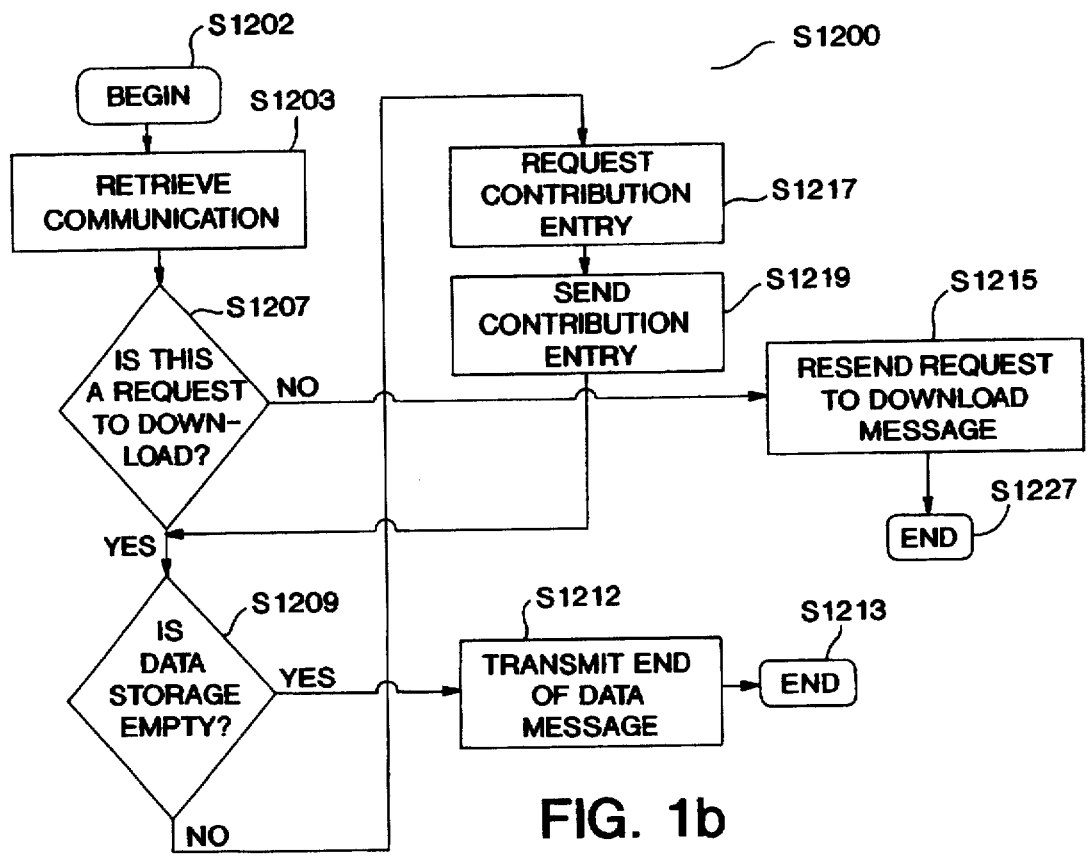
FIG. 1b is a flow chart illustrating the functionality of optional donation communication servicing software and associated hardware of an exemplary fund-raising contributions and gifts management terminal according to the present invention.

FIG. 1b is a flow chart illustrating the functionality of an optional contribution communication servicing software and associated hardware of an exemplary fund-raising terminal of the present invention. Optional contribution or gift communication circuitry servicing routine S1200 is a set of software programs which run on electronic contributions or gifts management terminal 100 or peripheral 100. Routine S1200 is entered when a communication is received by communication circuitry 990 in one embodiment. Upon entering this routine (S1202), communication circuitry 990 enters a retrieve the communication routine S1203 to retrieve the communication. The communication consists of a request for successive contribution or gift information in one embodiment. By way of example, the request includes a request for a cash contribution or gift entry, an envelope contribution or gift entry, a bar code data entry, a card entry, a contribution or gift entry, or combinations thereof. The request can include a request for a fingerprint entry, a contribution or gift entry, or a combination thereof. In another embodiment, the communication is a request to download. The circuitry 990 then tests to determine if this is a request to download by executing routine S1207. If "yes," then a test to determine if the data storage is empty using routine S1209 is conducted. If "yes," an end of data message using routine S1212 is sent, and routine S1200 is concluded (S1213).

If there was a "no" in response to routine S1207, routine S1215 is executed. Routine S1215 transmits a please resend request to download message, and then ends (S1227) routine S1200. The request to download can include a security code or other security information. Furthermore, the circuitry 990 may test to see if the proper security code is present within the request to download before downloading any information.

If there was a "no" in response to routine S1209, routine S1217 is executed to obtain the contribution or gift entry. The contribution or gift entry can come from the cash contribution or gift acceptor 320, the envelope contribution or gift acceptor, card contribution or gift processor 160,240, or coin contribution or gift acceptor 1100, or storage 302. Routine S1219 to send the contribution or gift entry is entered. Routine S1219 loops around to routine S1209 until there is no more data to be communicated. Routine S1200 is entered when there is communication between electronic contributions or gifts management terminal 100 or peripheral 100 and fund-raiser's or gift recipient's terminal or peripheral 120 in one embodiment. In an alternate embodiment, routine S1200 is entered when there is communication between electronic contributions or gifts management terminal 100 or peripheral 100 and a printer. Provision can be made in another embodiment, routine S1200 is entered when there is communication with a card account processor, e.g. a third party card processor, a bank, VISA, and the like.

In an embodiment, a plurality of successive contribution or gift data sets, comprising card information from an information bearing card and associated numerical contribution or gift amount information, are immediately recorded on terminal 100 or peripheral 100 and grouped together. The grouped information is then transmitted to a card account processor. The card account processor authorizes a subgroup of contribution or gift data for further processing. The authorized and unauthorized contribution or gift data sets can be transmitted to a electronic contributions or gifts management terminal 100 or peripheral 100, fund-raiser's or gift recipient's terminal or peripheral 120, a fund-raising organization or gift recipient's database, or combination thereof, for exclusion of the authorized contribution or gift data sets. The unauthorized contribution or gift data sets can be deleted if desired at a card account processor. The unauthorized contribution or gift data sets are excluded from the group, and the authorized contribution or gift data, e.g. card information and contribution or gift amount information, are re-transmitted to the card account processor. Means responsive to information sent via a transferring means enters a debit representative of the contribution or gift amount information to an account of the contributor or gift giver. Means responsive to information sent via the transferring means enters a credit representative of the contribution or gift amount information to an account of a fund-raising organization or recipient of the contribution or gift. The contribution or gift data set is further processed and a record of the contribution or gift for substantiating a contribution or gift is forwarded to a contributor, gift giver, fund-raiser, recipient of a contribution.

Figure 1C:
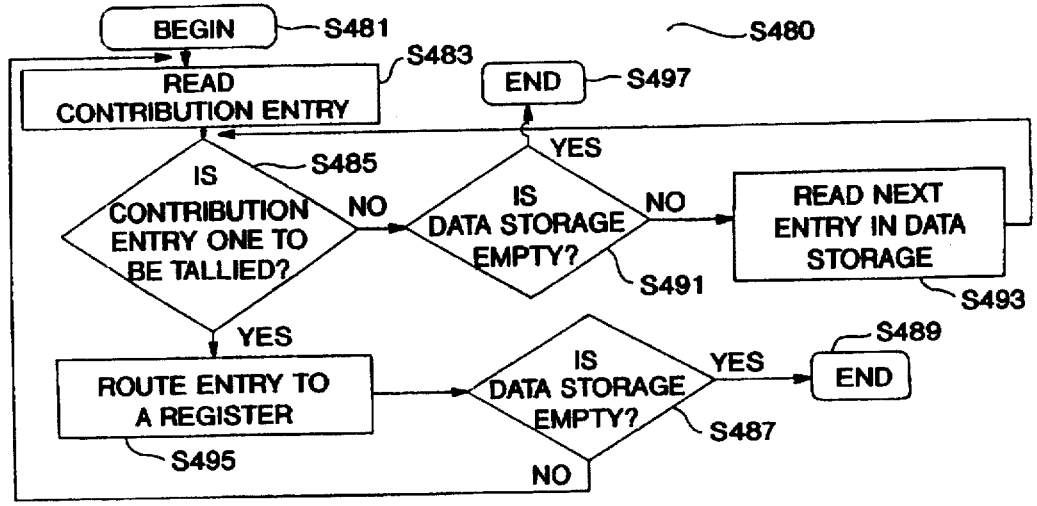
FIG. 1c is a flow chart illustrating the functionality of optional tallier servicing software and associated hardware of an exemplary contributions and gifts management terminal according to the present invention.

FIG. 1c is a flow chart illustrating the functionality of an optional tallier servicing routine S480 and associated hardware of an embodiment of an fund-raising terminal of the present invention. Routine S480 is entered (S481) in order to tally a plurality of successive contributions and gifts, which can be stored in the data storage 302 along with associated contributor or gift giver information. An entry is read from storage 302 via routine S183. The entry is then tested to determine if the entry is a contribution or gift to be tallied by a routine S485. Contributions and gifts that are tallied can include cash contributions and gifts 143, envelope contributions and gifts 600, credit card 145, and debit card 150 contributions and gifts. If a yes is given in response to the routine S485, then the entry is added to a register by routine S495. In one embodiment, routine S495 contains subroutines that pigeon hole a cash contribution 145 entry into one register, an envelope 600 contribution entry into another register, a credit card 145 contribution entry into yet another register, and a debit card 150 contribution entry into yet another register. Each respective register has a particular type of entry added, or a combination thereof, and then routine S487 is executed in one embodiment.

It is possible that there is only one register to which each type of entry is added, then routine S487 is executed. Routine S487 tests to determine if the data storage is empty or if the last data entry has been read. If yes, routine S480 ends (S489). If "no," there is a loop back and routine S483 reads the next entry. If "no" is the answer to routine S485, routine S491 tests to see if the data storage is empty. If "yes,"

routine S480 is concluded (S497). If "no," routine S493 reads the next entry in data storage 302 and loops back to routine S485.

Figure 1D:
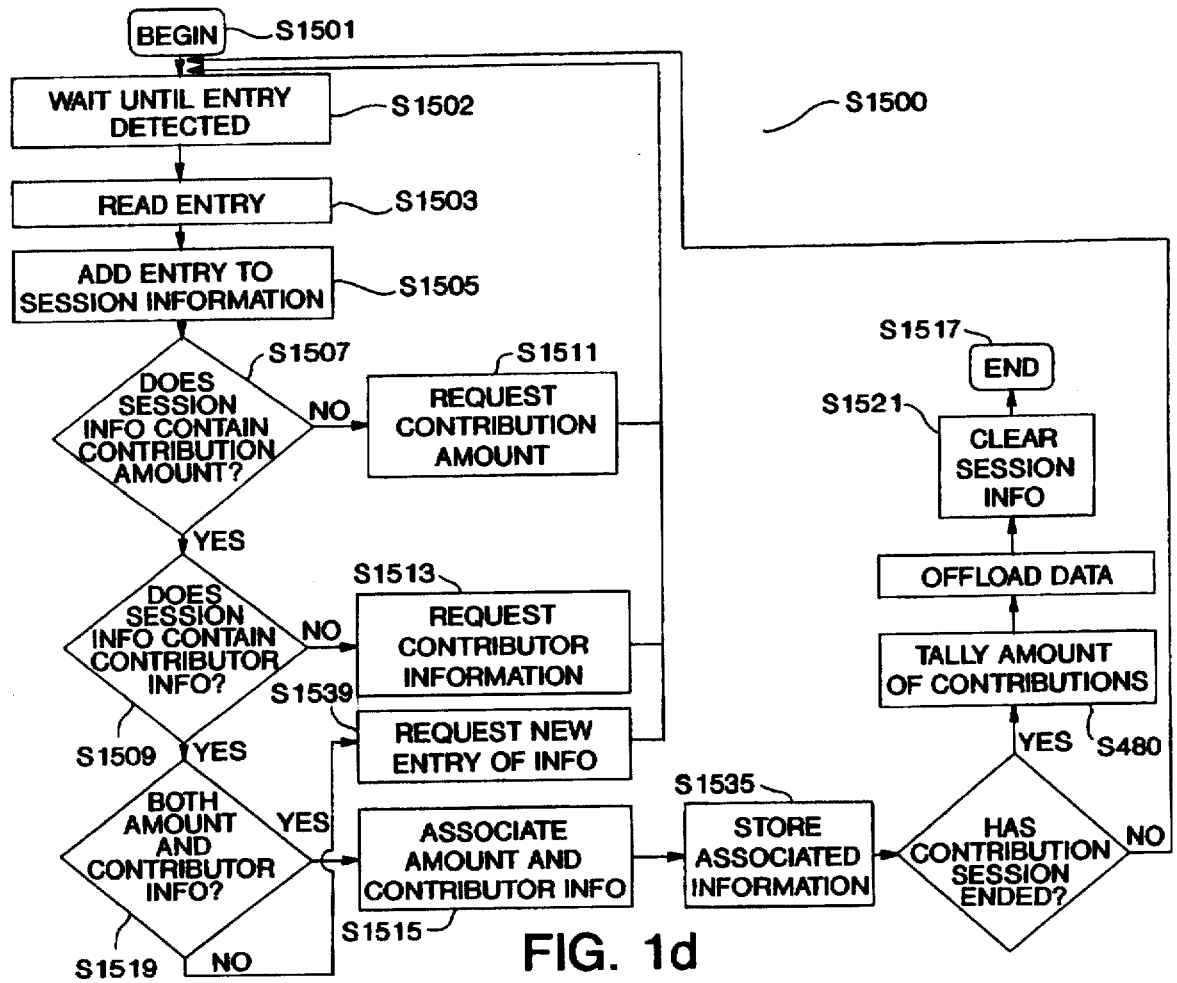
FIG. 1d is a flow chart illustrating the functionality of optional tallier servicing software and associated hardware for executing an optional donation session according the present invention.

FIG. 1d is a flow chart illustrating the functionality of optional software and associated hardware for executing a optional contribution or gift session. For example, optional routine S1500 can be entered (S1501) whenever a contribution or gift, or contributor or gift giver information, is detected by contribution or gift reader 1340 (FIG. 1a) by any other addition, e.g. keyboard 107 or a touch sensitive screen, or combinations thereof. Routine S1502 waits until an entry is detected by a reader or addition. Routine S1503 reads the entry. Routine S1505 adds the entry to session information. Routine S1507 tests to determine if the session information contains a contribution or gift amount. Exemplary contribution or gift amounts are a cash contribution or gift 143 entry indicating the denomination of a bill, keyboard 107 entry indicating a contribution or gift amount, a bar code 630 (FIG. 2) entry indicating a contribution or gift amount, a coded envelope entry indicating a contribution or gift amount, a coded card entry indicating a contribution or gift amount, or a combination thereof. If no, routine S1511 requests a contribution or gift amount and S1511 loops around to Routine S1502. In a variant, routine S1511 displays a message for a time out period. Routine S1511 can involve a single screen or multiple screen display depending on the type of entry device used. If the test of routine S1507 results in a "yes," routine S1509 is executed. Routine S1509 determines if the session information contains contributor or gift giver information. By way of example contributor or gift giver information includes a contributor or gift giver bar code 620 (FIG. 2), a code associated with a contributor or gift giver entered via keyboard 107, contributor or gift giver information on a coded envelope, contributor or gift giver information on a card, a fingerprint of a contributor or gift giver, or a combination thereof. If no, routine S1513 requests contributor or gift giver information and loops back to routine S1502. If "yes;" Routine S1519 is executed and determines if the session information contains both contributor or gift giver and contribution or gift information. If "yes," routine S1515 associates the contributor or gift giver and contribution or gift information. In another variant, Routine S1535 stores the associated contributor or gift giver and contribution or gift information. In another variant, optional tallier service routine S480 is executed. Routine S1521 clears the session information. Routine S1500 ends (S1517). If the result of routine S1519 is "no," routine S1539 requests contribution or gift amount and contributor or gift giver information and loops back to before Routine S1502. Again, this routine may involve single or multiple screens depending on the input device.

In another variant, the routine on terminal 100 or peripheral 100, immediately records information read from information bearing cards correlated to numerical contribution or gift amounts for successive contributions or gifts made by a plurality of successive contributors or gift givers without need for input of other information. The correlation of the numerical amount of an order inducing the making of a monetary gift or contribution is made automatically with successive contributor information bearing card information in one variant. In anther variant there is a correlation of variable contribution or gift numerical contributions amounts with successive contributor or gift giver card information, and optionally a pre-programmed fixed numerical contribution or gift amount of an order inducing the making of a contribution or gift with successive contributor or gift giver card information.

Provision can be made for optional service routine S480 to communicate information regarding the total amount of cash contributions and gifts 143 gathered via communication link 140, preferably an RF (radio frequency) communication link or an infra-red communication link, to the fund-raiser's or gift recipient's terminal or peripheral 120 for further processing as will be discussed below.

Where a keyboard (FIG. 4) is used, keyboard circuitry 109 scans keyboard 107 to determine if a key has been activated. Keyboard 107 refers to both keypad 890 and entry key 920, or combination thereof. Key board 107 might include a cancel key, and keys with other alpha-numeric text. The keyboard 107 can have a key that represents a specific denomination amount, e.g. five dollars ($5) or ten dollars ($10). Demonination amounts will be of an order for inducing the making of a monetary contribution or gift. Processing circuitry 903 interfaces with keyboard 107 and associated circuitry 109 via an address bus 536, data bus 533, and control bus 530. Once a key has been activated on the keyboard 107, that key information is moved into a buffer and interrupts the processing circuitry 903 to communicate that the key is ready. Circuitry 903 responds to the interrupt by reading the buffered keyboard information. Circuitry 903 then stores the keyboard information in a storage 302 if necessary. The keyboard information can consist of a contribution or gift amount, an account number of a contributor or gift giver, an authorization code, and the like. Key board inputs of successive contributions or gifts are made on terminal 100 or peripheral 100.

FIG. 2 is a perspective view of an embodiment of an electronic contributions or gifts management terminal 100 or peripheral 100 with an envelope contribution acceptor 380. A contributor or gift giver feeds an envelope 600 containing a cash contribution into a slot 381 of the envelope contribution acceptor 380. As used in relation to this embodiment the term "cash contribution" also includes a contribution by check. The envelope contribution acceptor 380 takes in the envelope 600 containing a cash currency contribution. This can be accomplished by pulling in envelope 600 containing a cash contribution in by a transport mechanism such as that commonly used in vending machines, and as previously described. Alternatively, a contributor or gift giver may manually insert the envelope 600 containing a cash contribution through slot 381.

A contribution or gift associator allows a contributor or gift giver's or gift giver's account to be properly credited for the contribution or gift. For example, the present invention contemplates that a contribution or gift associator for associating an envelope containing a cash contribution or gift with an account of a contributor or gift giver may take on several forms, including but not limited to a bar code, e.g. 620 on the envelope, and bar code reader 640 and associated circuitry, an optical character recognition reader and associated circuitry, or a combination thereof. The present invention further contemplates that a reader that reads a coded envelope can be provided.

The envelope 600 containing a cash contribution or gift can have thereon a contributor or gift giver bar code 620 that is associated with information about a contributor or gift giver's account. The envelope 600 containing a cash contribution or gift may also contain a bar code representing a cash denomination 630, and/or a collection bar code 635. A collection bar code 635 is used to designate the specific collection to which a contribution or gift is made if there are multiple collections during a religious service. The contributor or gift giver bar code 620 can be associated with the contributor's or gift giver's account.

The fund-raising organization may choose to give a contributor or gift giver an envelope containing only a contributor or gift giver bar code 620 imprinted on the envelope 600. The present invention contemplates that the contributor or gift giver can then add an adhesive label containing a bar code representing a cash denomination 630 to envelope 600. Moreover, on the occasion of a special gathering of contributions and gifts, a contributor or gift giver can add an adhesive label containing a collection bar code 635 which can be affixed onto envelope 600. Other information can be associated with a bar code which can be affixed on an envelope 600.

If bar codes are used on an envelope 600, a bar code reader 640 reads the contributor or gift giver bar code 620, and communicates information to bar code reader circuitry 648 where it is stored. A bar code reader 640 reads information from a collection bar code 635 and a bar code associated with a cash denomination 630. A bar code reader 640 and bar code reader circuitry 648 communicate this information to the fund-raiser's or gift recipient's terminal or peripheral 120 via communication circuitry 990 and communication link 140 or to processor 903 for processing, e.g. via service routine S480. The fund-raiser's or gift recipient's terminal or peripheral 120 can communicate this information via a communication link 1030 to a central database where a plurality of contributions and gifts can be processed from individual fund-raising organizations. Numerous bar code readers are commercially available from vendors. A bar code reader can be an ordinary pen-type bar code reader. Since the construction and operation of types of bar code readers are well known, a detailed description is omitted.

Although the exemplary described embodiment incorporates a pen type bar code reader, the electronic contributions or gifts management terminal 100 or peripheral 100 can incorporate any type of data gathering device equipped with a bar code reader.

Figure 5:
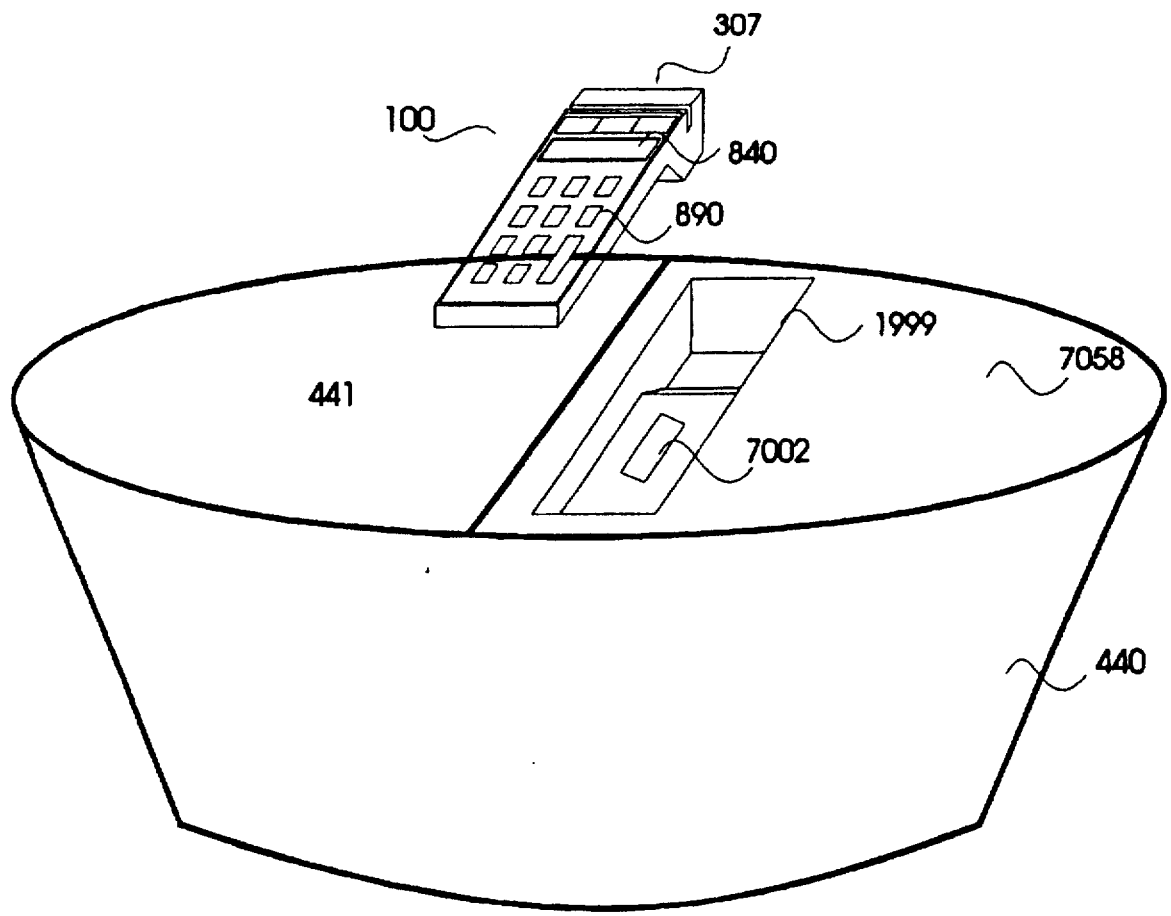
FIG. 5 is a perspective view of a hand held portable fund-raising terminal or peripheral according to the invention.

FIGS. 3 and 5 are perspective views of embodiments of a electronic contributions or gifts management terminal 100 with a card processor. A card processor can be a credit card processor 160 and a debit card processor 240, e.g. processor 160/240. The present invention contemplates that electronic contributions or gifts management terminal 100 might only contain a credit card processor 160. Alternatively, the present invention also contemplates that a electronic contributions or gifts management terminal 100 can only contain a debit card processor 240. A variant embodiment can provide a credit card processor 160 and a debit card processor 240 can be located on electronic contributions or gifts management terminal 100 at different physical positions thereon.

Electronic contributions or gifts management peripheral 100 does not include a card processor 160/240. Rather, it is appreciated that electronic contributions or gifts management peripheral is lighter in weight and less costly to manufacture than electronic contributions and gifts management terminal 100 due to decreased circuitry contained therein. In one variant, it is further appreciated that peripheral 100 consists essentially of a card reader 307, data storage 302, a program storage, circuitry 903, a communication port for off-loading information from the peripheral, a self-contained source of electrical power; and, a software routine for immediately recording, capturing, and/or seizing successive inputs of contributor or gift giver card information, a software routine for immediately recording, capturing, and/or seizing successive inputs of contributor or gift giver card information correlated to a pre-programmed contribution or gift numerical amount, a software routine for immediately recording, capturing, and/or seizing, successive inputs of contributor or gift giver card information correlated to variable contribution or gift numerical amount information, or combination thereof. Optionally, a display and keys are added thereto.

A card processor 160/240 includes a card slot. A contributor or gift giver swipes, enters, or passes a credit card 145 through the card slot or port of a credit card processor 160. Alternatively, a contributor or gift giver swipes, enters, or inserts a debit card 150 through a card slot of a debit card processor 240.

In a preferred embodiment, electronic contributions or gifts management terminal 100 has both a credit card processor 160 and a debit card processor 240 utilizing a single processor that discriminates between the type of contribution or gift made. An exemplary credit and debit card processor 160/240 is disclosed in U.S. Pat. No. 5,012,077.

The card processor 160/240 communicates with key pad 890 on the face of a hand-held electronic contributions or gifts management terminal 100. Upon receiving the communication that a card contribution is to be given, the key pad 890 reveals a key associated with a cash denomination. By way of example, the key associated with a cash denomination can appear to disclose a one, five, ten or twenty dollar symbol as described below. The contributor or gift giver presses the key associated with a cash denomination that is the preferred amount of his contribution, and presses entry key 920.

In a variant of terminal 100 or peripheral 100, a cardholder contributor or gift giver passes through or inserts his information bearing card 145/150 on card reader 307 for reading thereof. Information regarding the type of card read is detected, e.g. a determination is made whether a premium card has been read such as a "GOLD CARD" versus some other type of card ("A CLASSIC CARD or VISA BUSINESS CARD"), or whether other indicia regarding a contributor or gift giver's or gift giver's credit worthiness, credit limits, or affluence are present. It will be appreciated that cardholders with high credit limits or bearing a premium card such as a gold card can be more affluent individuals tending to contribute larger contribution or gift amounts. If a premium card is detected or if other information indicative of the cardholder's credit worthiness or affluence is detected, recommended contribution or gift amounts appear on key pad 890. These recommended contribution or gift amounts can be larger recommended contribution or gift amounts. By way of example, when contributor or gift giver$_A$ passes his information bearing credit card that is a VISA® GOLD Card through card reader 307. The information indicative of the type of card that contributor or gift giver$_A$'s card is, is processed via software routines and a single or a plurality of recommended contribution or gift amount keys appear on electronic contributions or gifts management terminal 100 or peripheral 100's touch screen interface, e.g. $100, $150, $500. In a variant, when contributor or gift giver$_B$ passes his information bearing credit card that is a VISA® CLASSIC Card through card reader 307. The information indicative of the type of card that contributor or gift giver$_B$'s card is processed via software routines and a single or a plurality of recommended contribution or gift amount keys appear on electronic contributions or gifts management terminal 100 or peripheral 100's touch screen interface, e.g. $10, $15, $20. It will be seen that the cumulative amount of a group of respective contribution or gift transactions that are received from a group of cardholder contributor or gift givers or gift givers in a single fund-raising event will be maximized utilizing this apparatus and method.

Successive made credit card contributions or gifts made on terminal 100 or peripheral 100 do not require an authorization, or verification of authorization by signature or numeric code. This is due to the unique nature of a contribution or gift in that it is a one way giving. If a contribution or gift does not ultimately get consummated, the recipient of the gift or contribution has no risk of loss that would normally be associated with a two way exchange. Consequently, the present invention contemplates that successive contributors or gift givers will simply need to swipe or insert their respective information bearing cards 145/150 through, or into, the electronic contributions or gifts management terminal 100 or peripheral 100, as required, and enter the amount of their contributions or gifts by pressing keys associated with a cash denomination of an order inducing the making of a contribution in making their contributions or gifts on the key pad 890. The first contributor or gift giver passes electronic contributions or gifts management terminal 100 or peripheral 100 to a subsequent contributor or gift giver who repeats the contribution or gift step by depressing a key as to the amount given by him. The same steps are optionally performed by a plurality of contributor or gift givers or gift givers each choosing his or her monetary amount to be given. The card information and contribution or gift information is then post processed. Post processing includes transmitting the card information and contribution or gift information to a card account processor to request a verification or authorization, for crediting and debiting of the appropriate accounts, or combination thereof. The present invention contemplates that a contributor or gift giver will have pre-authorized the fund-raising organization to collect a contribution or gift amount. Pre-authorization can include an agreement with the organization that a contributor or gift giver authorizes the contribution or gift of a given amount once a certain action takes place, i.e. the contributor or gift giver swipes card 145/150 through electronic contributions or gifts management terminal 100 or peripheral 100. The pre-authorized contribution or gift amount and the contributors' or gift givers' card information are correlated, and forwarded to a card account processor for post-processing.

By way of further example, a contributor or gift giver 1 (FIG. 13) enters into an arrangement with a fund-raising organization or gift recipient. The arrangement is that fund-raising organization or gift recipient will associate a preferred contribution or gift amount with the contributor's or gift giver's card information each time the contributor or gift giver enters his respective card information into electronic contributions or gifts management terminal 100 or peripheral 100. It will be appreciated that this method allows for contributor or gift giver 1 to simply enter his card information in the terminal to make a contribution or gift. Less time is spent by the contributor or gift giver 1 focusing on the financial aspects of the transaction. That is, there is an automatic correlation with a predesignated contribution or gift numerical contribution amount with a respective contributor's or gift giver's card information on entered on terminal 100 or peripheral 100.

In the case of a debit card 150 contribution or gift via a electronic contributions or gifts management terminal 100 or peripheral 100, the contributor or gift giver can authorize the fund-raising organization or gift recipient to use a secret identification number associated with his debit card account in order to allow the organization to automatically obtain the contribution or gift without seeking subsequent authorization from the contributor or gift giver. Alternatively, the contributor or gift giver may enter his personal identification number (PIN) into electronic contributions or gifts management terminal 100 or peripheral 100, terminal 120, or combination thereof, and electronic contributions or gifts management terminal 100 or peripheral 100, 120, or combination thereof, stores the PIN in an encrypted form for later processing. In this scenario, the contributor or gift giver need only perform the action of swiping or inserting, as required, card 150 through processor 160/240 on electronic contributions or gifts management terminal 100 or peripheral 100 to make a contribution or gift. The secret identification number is associated or correlated with the card information, contribution or gift amount information, or combination thereof, and forwarded to a card account processor for post processing. In this scenario post processing includes obtaining appropriate authorizations, and crediting and debiting the contributor or gift giver's account and the fund-raising organizations account, or combination thereof, as required.

The present invention also makes provision that a contributor or gift giver need not disclose a contributor's or gift giver's card 145/150 account authorization code to the fund-raising organization or gift recipient for security reasons but still may wish to make a card 145/150 contribution or gift. In this case, the present invention contemplates that the fund-raiser's or gift recipient's terminal 120 or peripheral 120, electronic contributions or gifts management terminal 100 or peripheral 100, or combination thereof, has an input 307 that allows for entry of the contributor's or gift giver's card 145/150 account authorization code so that it is encrypted and only decipherable and usable by the fund-raiser's or gift recipient's terminal 120 or peripheral 120, electronic contributions or gifts management terminal 100 or peripheral 100, a card account processor, or combination thereof, for processing the card 145/150 contribution or gift. An advantage of this feature is added security for the contributor or gift giver. The present invention also contemplates using a touch sensitive screen, not shown, to input, a contributor or gift giver's name, credit card and/or debit account information, the collection for which the contribution or gift is made if there are multiple collections, and the like.

A plurality of successive associated card 145,150 contributions and gifts is immediately recorded and stored in data storage 302. A set of software routines associates or correlates successive contributors' or gift givers' card account information with respective contribution or gift amounts. The contributor or gift giver has made a number of card contributions and gifts within a specified time period which are immediately recorded, stored and tallied by a set of software routines. Optional small contribution or gift service routine downloads a plurality of a contributor's or gift giver's card contributions and gifts once a card contribution or gift amount threshold is reached.

The electronic contributions or gifts management terminal 100 or peripheral 100 can adopt pen-based input or touch sensitive screen input. A pen and screen provide a contributor or gift giver a substitute for key pad 890. By way of example, a contributor or gift giver may use a pen to write in the amount of contribution or gift or other alpha-numeric text on a screen, not shown. Alternatively, a symbolic key associated with a cash denomination might appear on a screen. The contributor or gift giver then uses a finger to touch the symbolic key associated with a cash denomination and designates the contribution or gift amount. If a contributor's or gift giver's signature is required, a pen can also be used with a screen as an electronic signature line. The contributor's or gift giver's signature entered on a screen can be collected, stored, and/or transmitted by card processor 160/240 along with contribution or gift information to a third party card processor via a communication link 1030. Alternatively, this information might be sent to fund-raiser's or gift recipient's terminal 120 or peripheral 120 via a communication link 140 for further processing, storage, and/or transmittal via communication link 1030.

FIG. 3 is a perspective view of an embodiment of an electronic contributions or gifts management terminal 100 or peripheral 100 with a card reader 307. In a variant, a container 440 supports a credit card processor 160, a debit card processor 240, or combination thereof. The present invention contemplates that both a credit card processor 160 and a debit card processor 240 can be located on electronic contributions or gifts management terminal 100 at different physical locations.

A contributor or gift giver can drop a cash contribution or gift 143 or an envelope 600 containing a cash contribution or gift into a container 440. Container 440 has an open area 441 on its top surface of a side surface. Area 441 is of a size for receiving a cash contribution or gift 143 or envelope 600. The cash contribution or gift 143 or envelope 600 containing a cash currency contribution or gift might then be processed using manual post processed cash oblation. Alternatively, a contributor or gift giver can make a contribution or gift using credit card 145 or a debit card 150 as previously described.

The present invention contemplates that container 440 may be constructed from any material suitable to collect cash contributions and gifts or envelope contributions and gifts. Preferably, container 440 is constructed from a woven material, or a metal. Container 440 is of a size and weight permitting a contributor or gift giver pass it and the electronic contributions or gifts management terminal 100 or peripheral 100 to another contributor or gift giver.

Figure 9:
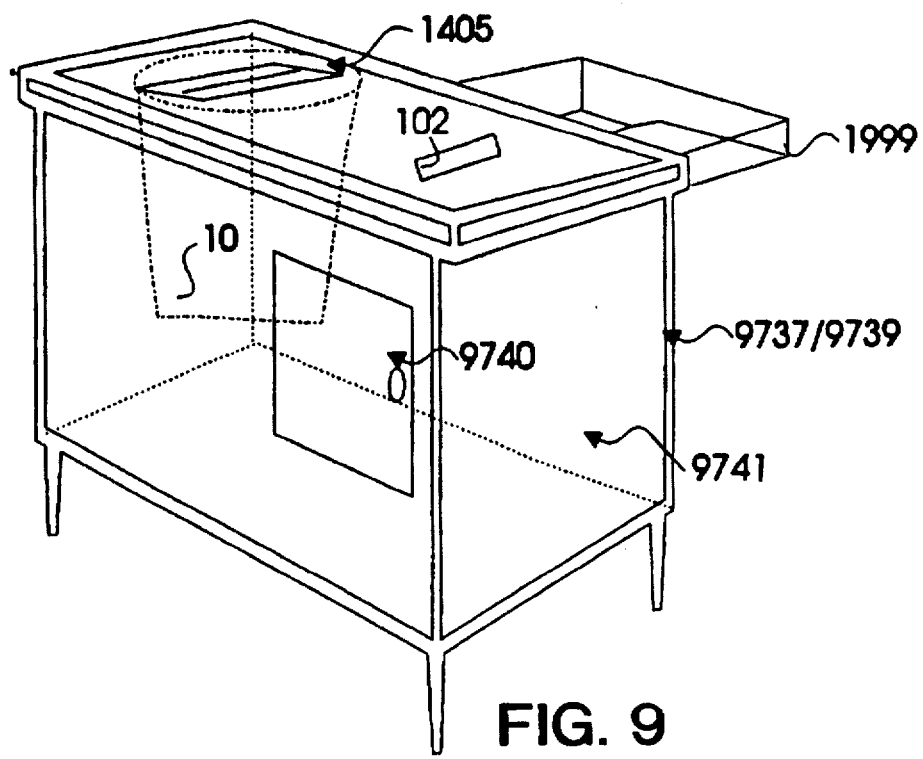
FIG. 9 is a perspective view of an envelope/deposit box.

Container 440 can comprise an envelope box 9737 with a locking cash drawer 9740 or a deposit box 9739 (FIG. 9). The envelope box 9737 and deposit box 9739 have a slot 102 disposed thereon for the deposit of cash 143 and envelope contributions and gifts 600 and an inner storage volume 9741. Deposit box 9739 can have the addition of an opening baffle 1405 for security, a locked cabinet door 9740 for access said cash contributions and gifts, and a removable bag 10 for retaining a cash contribution or gift 143 (not shown). In one embodiment, envelope box 9737 and deposit box 9739 comprise docking station 1999, an electronic contributions or gifts management terminal 100 or peripheral 100, or combination thereof. Optionally, envelope box 9737 and deposit box 9739 comprise a lock means for lockably securing electronic contributions or gifts management terminal 100 or peripheral 100 thereto. The combination of envelope box and electronic contributions or gifts management terminal 100 or peripheral 100, and/or deposit box and electronic contributions or gifts management terminal 100 or peripheral 100 are optionally on an a fund-raising terminal network.

Figure 4:
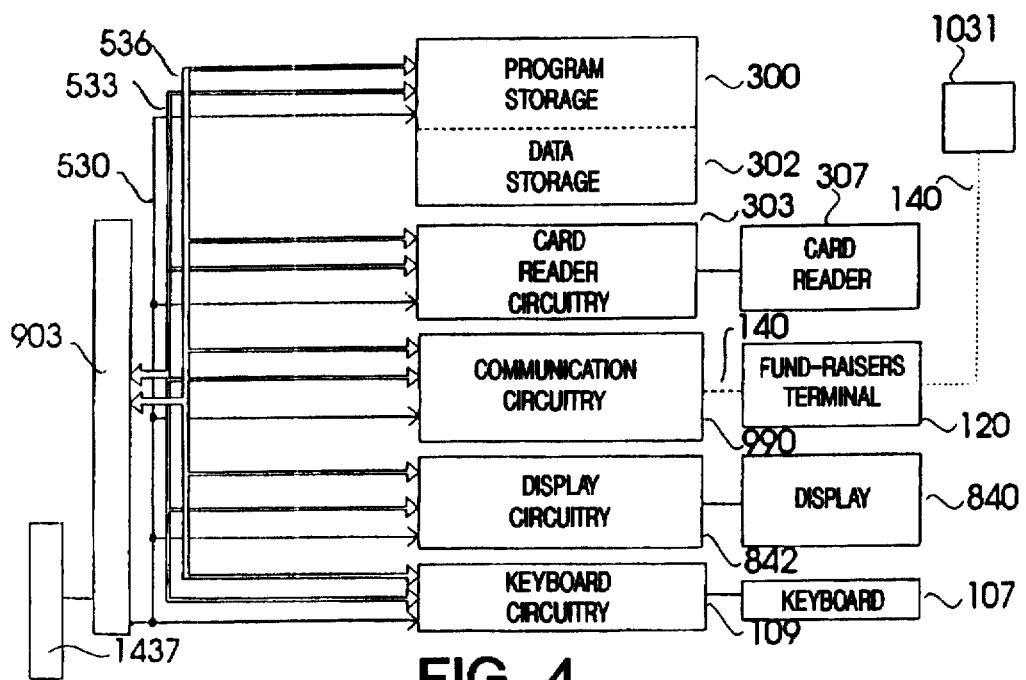
FIG. 4 is a schematic block diagram of an electronic contributions and gifts management terminal or peripheral with various additions.

FIG. 4 is a schematic block diagram of a fund-raising terminal of the present invention, a card reader 307 and related circuitry 303 addition, and a key board 107 and related circuitry 109 addition. In this embodiment, electronic contributions or gifts management terminal 100 acts as a stand alone unit for accepting card 145, 150, cash 143, envelope 600 contributions and gifts, or combinations thereof. For example, in FIG. 3 communication link can be a wireless communication link. Terminal 100 or peripheral 100 immediately records successive contributions or gifts made thereon. Further, in one embodiment, data storage 302 stores in the range of 10 to 1000+ contributions or gifts, including card information and associated contribution or gift information, the particular storage requirements being dictated by the number of contributor or gift givers or gift givers expected to use electronic contributions or gifts management terminal 100 or peripheral 100. Preferably, data storage can store approximately 200 transactions.

The present invention also contemplates that in other embodiments swiping a credit card 145 or debit card 150 might not be required. As used herein, the term "swiping" or "passing" refers to any method for communicating information on an information bearing card to a card reader 307. The invention has the features enumerated above in FIG. 1, with the addition of a receipt generator 820 at electronic contributions or gifts management terminal 100 or peripheral 100. By way of example as with programmable IC cards. A contributor or gift maker can pre-program his or her information bearing card to off-load a pre-determined contribution or gift from his or her respective card onto terminal 100 or peripheral 100. Again, it is understood that the making of contributions or gifts by a plurality of successive contributors or gift givers is greatly accelerated where IC cards are used. Here the successive contributors or gift givers simply insert the IC card into a communication port on terminal 100 or peripheral 100. The IC card off-loads a contribution or gift from itself onto the terminal 100 or peripheral 100. The terminal 100 or peripheral 100 immediately records the off-loaded contributions or gifts from a plurality of successive contributors. There is no need for the entry of a contribution or gift numerical amount onto terminal 100 or peripheral 100 as the IC card has been pre-programmed with a numerical contribution or gift amount.

In yet a further variant the IC card is pre-programmed to recognize terminal 100 or peripheral 100. Hence, IC card recognizes terminal 100 or peripheral 100, and then automatically off-loads a pre-programmed contribution or gift from the IC card onto terminal 100 or peripheral 100. The present invention also provides an improved IC (Integrated circuit or smart) card in which an improvement comprises a pre-programmed contribution or gift thereon.

A contributor or gift giver may wish to obtain a receipt 830 directly after he has made a contribution or gift. After entering his contribution or gift, a cash contribution or gift 143, display 840 displays a message asking the contributor or gift giver if he wishes a receipt for his contribution or gift. The contributor or gift giver presses a key representing yes on keypad 890. Receipt generator 820 prints receipt 830 for the contributor or gift giver. The receipt contains information stored initially in the electronic contributions or gifts management terminal 100 or peripheral 100, e.g. the contributor's or gift giver's name, the amount of the contribution or gift, the date of the contribution or gift, and/or the collection for which the contribution or gift was given. Preferably, the generation of the receipt(s) is made remote from terminal 100 or peripheral 100 so as not to decelerate the making of sequential contributions on terminal 100 or peripheral 100.

Figure 8:
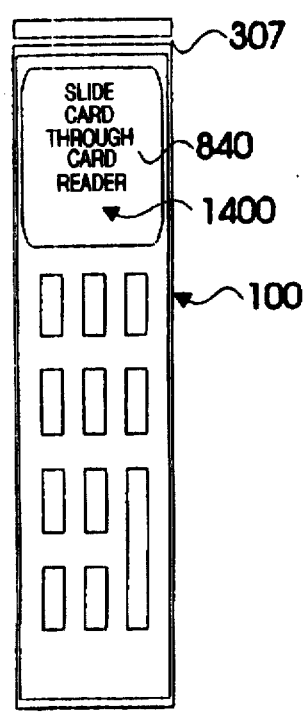
FIGS. 8, 8a and 8b are top plan views of terminals or peripherals having various prompts for use with the corresponding contributions and gifts management terminals or peripherals.
Figure 8A:
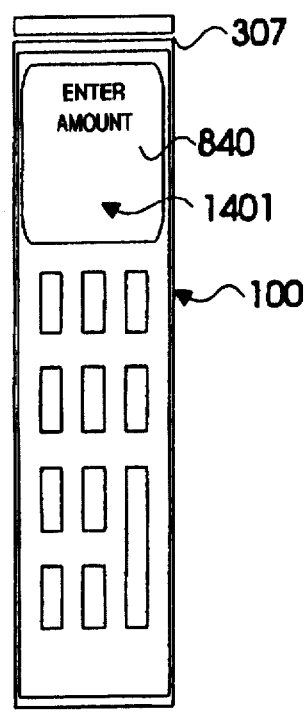
Figure 8B:
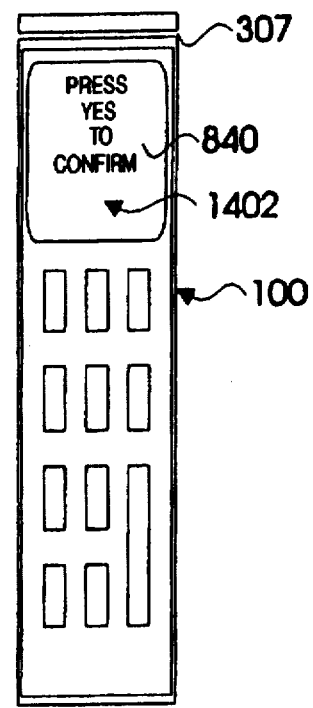

As shown in FIGS. 8, 8a, and 8b, electronic contributions or gifts management terminal 100 or peripheral 100 is used to induce, facilitate, and solicit successive monetary contributions or gifts made by a plurality of contributors or gift givers. The contribution or gift is made by an information bearing card, e.g. such as a credit card 145, or debit card 150. A method comprises the steps of prompting a cardholder contributor or gift giver to pass his information bearing card, e.g. through a card reader 307; prompting a contributor or gift giver to manually enter information representative of a contribution or gift amount; and, optionally prompting the contributor or gift giver to verify information representative of a contribution or gift amount. Verification may include a prompt to press a key representative of a "YES," "NO," "ENTEL," or other type of key(s). Prompting is accomplished by visually displaying an alpha-numeric message on display 840. Optionally prompting may be accomplished by providing alpha-numeric text disposed on electronic contributions or gifts management terminal 100 or peripheral 100, offering station 7000, or combination thereof. Further optional visual prompts may include a prompt appearing on a display 840 requesting additional identification information of a contributor or gift giver, e.g. the address of an contributor or gift giver, a prompt requesting a special intention, or combination thereof. Further an optional message prompt may include the following text portions: "SLIDE CARD THROUGH CARD READER 1400," "ENTER CONTRIBUTION OF GIFT AMOUNT 1401," "PRESS YES 1402," "ENTER OFFERING AMOUNT," "ENTER CONTRIBUTION OR GIFT," a variation on the themes of the text, or combination thereof. In a variant, electronic contributions or gifts management terminal 100 or peripheral 100 audibly prompts a contributor or gift giver to make a contribution or gift by way of an information bearing card.

FIG. 5 is a perspective view of a portable electronic contributions or gifts management terminal 100 or peripheral 100, a docking station 1999 for portable electronic contributions or gifts management terminal 100 or peripheral 100, and a container 440 for gathering cash and envelope contributions and gifts.

Docking station 1999 allows for a electronic contributions or gifts management terminal 100 or peripheral 100 to be docked or received therein. Electronic contributions or gifts management terminal 100 or peripheral 100 is disposed in the docking station 1999 to allow information from an information bearing card and/or contribution or gift amount information to be transmitted via docking station 1999 to, by way of example, terminal 120 (via communication link 140), to a card account processor 1031 directly via communication link 140 (FIG. 4), to another electronic contributions or gifts management terminal 100 or peripheral 100, or a combination thereof. It is possible to have a plurality of docking stations 1999 networked on a fund-raising or gift giving terminal network.

Docking station 1999 can also be used to communicatively dispose a card reader 307, related circuitry 303 (FIG. 4), means for entering a contribution or gift amount, means for automatically storing successive contribution or gift amount information, means for automatically storing successive card information from an information bearing card, means for transmitting data sets comprised of successive contribution information from terminal 100 or peripheral 100, or combination thereof, to a container 440 (FIGS. 5 and 8) for collecting cash contributions and gifts, envelope contribution or gifts and gifts, or combination thereof. Moreover, a electronic contributions or gifts management terminal 100 or peripheral 100 or docking station 1999 may also be located on the interior or exterior of a building and/or a permanently mounted to an envelope collection box (FIG. 8). In such an embodiment, docking station 1999 provides a means for energizing electronic contributions or gifts management terminal 100 or peripheral 100. Optionally, docking station 1999 has a port 7778 for recharging a power supply on electronic contributions or gifts management terminal 100 or peripheral 100. Port 7778 is optionally used for communicatively attaching electronic contributions or gifts management terminal 100 or peripheral 100 to a fund-raising terminal network, where the fund-raising terminal network facilitates that transmittal of contribution or gift information and card information to a card account processor.

Figure 6:
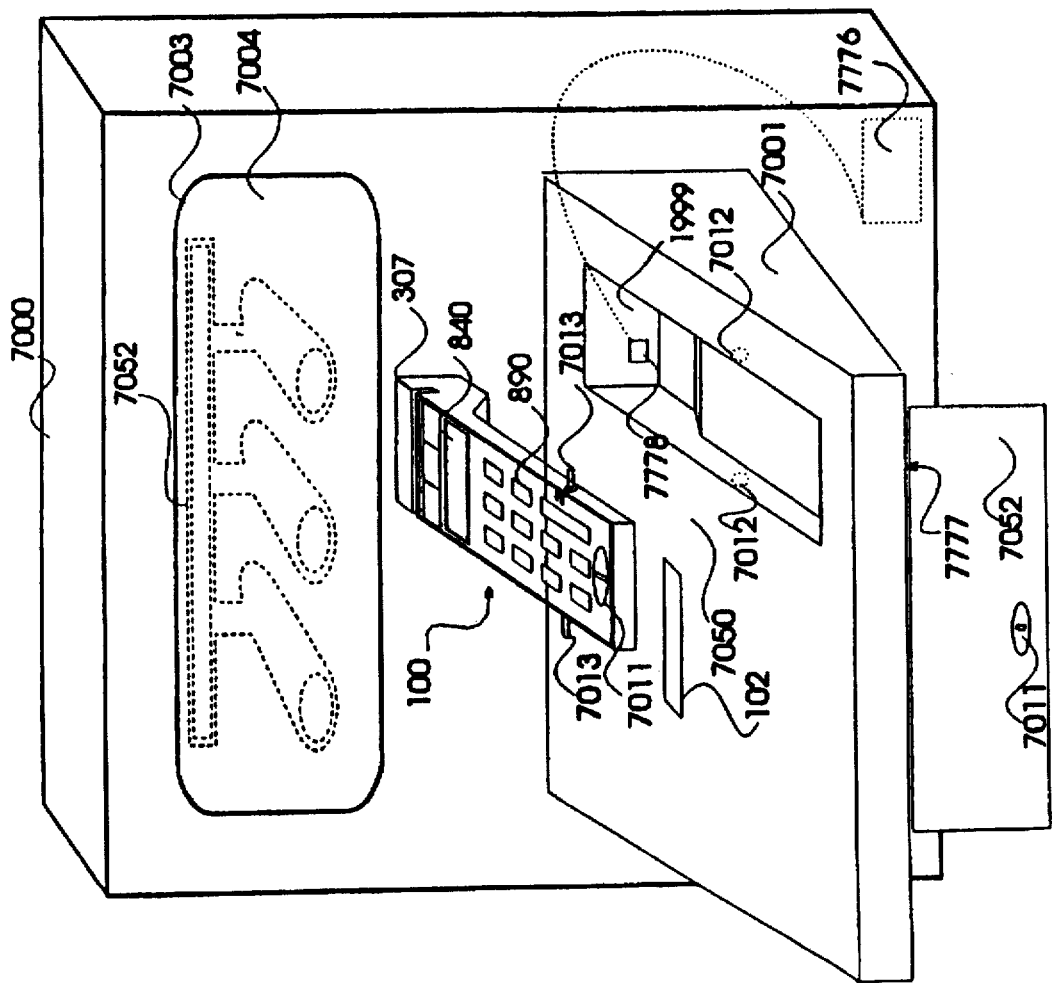
FIG. 6 is a perspective view of another embodiment of a portable contributions and gifts management terminal or peripheral.

In another embodiment docking station 1999 includes a slide in mounting unit (not pictured) onto which electronic contributions or gifts management terminal 100 or peripheral 100 is connected to container 440 (FIG. 5) or offering station 7000 (FIG. 6). In an embodiment, Electronic contributions or gifts management terminal 100 or peripheral 100 slides into docking station 1999 (FIGS. 5 or 6), and plugs into the docking station 1999, e.g. into port 7778 (FIG. 6). In an alternate embodiment, docking station 1999, and/or electronic contributions or gifts management terminal 100 or peripheral 100 contain a base mount (not shown). The base mount includes a plate on the bottom or side of electronic contributions or gifts management terminal 100 or peripheral 100. The plate is offset from the bottom of electronic contributions or gifts management terminal 100 or peripheral 100. The plate allows electronic contributions or gifts management terminal 100 or peripheral 100 to slide into docking station 1999. A plurality of docking stations 1999 are removably connected to allow for a plurality of terminals 100 or peripherals 100 to be carried thereon, and to allow for ease of transportation. Further a single docking station 1999 optionally has a plurality of bays thereon in which terminals 100, peripherals 100, or combinations thereof rest, down load information, and/or recharge.

In a variant, electronic contributions or gifts management terminal 100 or peripheral 100 is permanently mounted in a docking station 1999. Optionally, docking station 1999 has a surface 7058 (FIG. 5) or surface 7050 (FIG. 6) on which a portable card processor 160/240 rests without an electrical connection. Terminal 100 or peripheral 100 is taken from the docking station 1999 surface 7050, 7058 after a plurality of successive contributions or gifts are made thereon, e.g. 10 to 1000% and linked to a card account processor database 1031 via communication link 140. In one embodiment, docking station 1999 can be integrally molded into the body of container 440, the docking station 1999 comprises an optional indentation of a size and shape to retain electronic contributions or gifts management terminal 100 or peripheral 100 on a surface 7058, container 440, or a combination thereof. The electronic contributions or gifts management terminal 100 or peripheral 100, and docking station 1999 contain complementary electrical connectors (not shown), the connection of which provides sufficient connection to provide a communication link to transmit data or information. Numerous communication links discussed above can also be used to provide connections to move data.

In various embodiments, docking station 1999, terminal 120, electronic contributions or gifts management terminal 100 or peripheral 100, card account processor 1031, or a combination thereof, are on the same network. Downloading information from the devices on the network is directed to a terminal 120 in one embodiment, to a modem in another embodiment, or to a card account processor database in yet another embodiment. Docking station 1999 (FIGS. 5 and 6) is constructed of plastic, metal, wood, or any other material appropriate to create a surface on which a Electronic contributions or gifts management terminal 100 or peripheral 100 can rest. Docking station 1999 is fastened to the side of container 440 via a fastening means (not pictured). By way of example, a fastening means includes adhesive, rivets, snaps, velcro, screws, or combination thereof.

Optional hook and loop fastener 7002 comes into contact with a sister hook and loop fastener (not pictured) disposed on the underside of electronic contributions or gifts management terminal 100 or peripheral 100 to releaseably connect electronic contributions or gifts management terminal 100 or peripheral 100 to docking station 1999 (FIGS. 5 and 6), surface 7058 (FIG. 5), or surface 7050 (FIG. 6).

FIG. 6 is a perspective view of an fund-raising contribution or gift station 7000 comprising electronic contributions or gifts management terminal 100 or peripheral 100, optional docking station 1999, optional container 7001 for collecting cash and envelope contributions and gifts, and an optional means for lockably securing an electronic contributions or gifts management terminal 100 or peripheral 100 to docking station 1999, or surface 7050.

Fund-raising contribution or gift station 7000 has a surface 7050. The fund-raising contribution or gift station has optional aperture 7003 through which light source 7052 radiates light. Lens 7004 is interposed between the aperture 7003 and source 7052. Lens 7004 has alpha-numeric text disposed thereon in one embodiment, e.g. the name of a fund-raising organization. Electronic contributions or gifts management terminal 100 or peripheral 100 rests on surface 7050 removably attached with a hook and loop fastener as described in FIG. 5 or lockably disposed in docking station 1999 by way of a locking mechanism 7011. Pins 7013 retract or enter apertures 7012 in response to locking mechanism 7011 being locked or unlocked. A variety of locking mechanisms and assemblies for lockably securing electronic contributions or gifts management terminal 100 or peripheral 100 are known in the art. The present invention contemplates that electronic contributions or gifts management terminal 100 or peripheral 100 is optionally lockably disposed on the surface 7050. These locking assemblies may be used when electronic contributions or gifts management terminal 100 or peripheral 100 is secured to the container 440 (FIG. 5), an envelope collection container (FIG. 8) or combination thereof. Mechanical and electronic locking assemblies are used to lockably secure electronic contributions or gifts management terminal 100 or peripheral 100. These may include a lock and key combinations, padlocks, and the like. Port 7778 is used with a complimentary port on a fund-raising contribution or gift station 100, a communication link 140, or combination thereof, to energize electronic contributions or gifts management terminal 100 or peripheral 100 via the optional power supply 7776.

Figure 7:
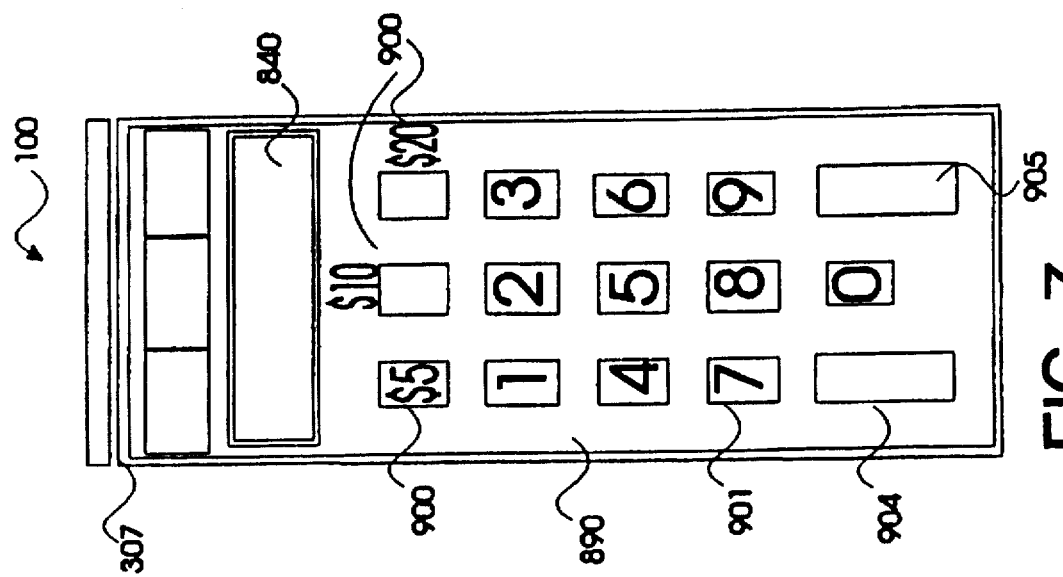
FIG. 7 is a top plan view of a terminal face with which a user interfaces.

FIG. 7 is a plan view of a face of a electronic contributions or gifts management terminal 100 or peripheral 100. A card reader 307 for reading card information from an information bearing card, and display 840 are disposed on the electronic contributions or gifts management terminal 100 or peripheral 100. A manually activated means for entering contribution or gift monetary amount information comprises, a key representative of a fixed contribution or gift amount 900, e.g. a key representative of ten dollars, a key representative of a single digit integer 901, a confirmation key 904, a negation key 905, or combination thereof. Key 904 may represent a "yes" key. Key 905 may represent a "no" key. It will be understood that key 900 allows for a contributor or gift giver to make a monetary contribution or gift amount rapidly. Key 900 can have optional information representative of two or more currencies of different countries.

Figure 10:
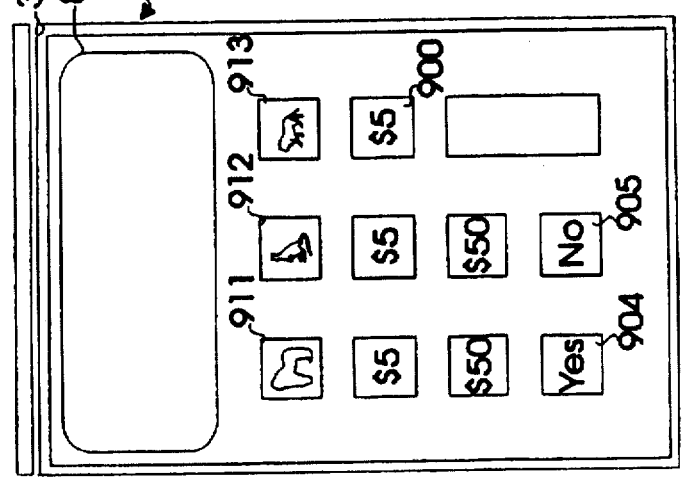
FIG. 10 is a plan view of a face on a terminal or peripheral for soliciting contributions and gifts for a plurality of fund-raising organizations or gift recipients, a plurality of causes within a fund-raising organization or gift recipients, or combination thereof.

FIG. 10 illustrates a face of electronic contributions or gifts management terminal 100 or peripheral 100 used for simplifying and inducing the giving of contributions and gifts by contributor or gift givers or gift givers to a plurality of fund-raising organizations, gift recipients, or causes, e.g. American Heart Association, American Diabetes Association, Jane and John's Wedding, Bill and Josie's Shower Party, Save the Apes, Save the Kangaroos Fund, and Save the Lions Fund. Optionally, electronic contributions or gifts management terminal 100 or peripheral 100, with a face, is used to induce, solicit, facilitate, and receive contributions and gifts for a plurality of causes within a specific fund-raising organization or gift recipient. The terminal 100 or peripheral 100 face used with electronic contributions or gifts management terminal 100 or peripheral 100 is used in method of simplifying and inducing the giving of contributions and gifts, receiving and immediately recording, capturing, and/or seizing thereof upon receipt.

The method as described in this specification comprises the steps disclosed herein comprising:

providing; circulating; dispersing; spreading; seeding; distributing; disseminating; dispensing; diffusing; or combination thereof, among; between; in the midst of; in dispersion through; amidst; amid; or combination thereof, a crowd; an assembly; a meeting; a conclave; a caucus; a parley; a council; a conference; a band; a congregation; a junction; a gathering; a throng; a swarm; a flock; a convention; a synod; a horde; a social gathering; or combination thereof, of contributors or gift givers making monetary contributions and/or gifts with a portable electronic contributions or gifts management terminal 100 or a portable electronic contributions or gifts management peripheral 100. Preferably, the terminal 100 or peripheral 100 held in a palm of the hand, for making of record information of the contribution or gift, e.g. card information and numerical contribution or gift amount information. The electronic contributions or gifts management terminal 100 or peripheral 100 has its own source of electric power 1437 (FIG. 1a) and a plurality of entry keys manually operable or activated for entering the amount of the contribution or gift to be given (or a touch sensitive screen input). The terminal or peripheral also has a reader 307 on the electronic contributions or gifts management terminal 100 or peripheral 100 for reading an information bearing card having indicia thereon identifying the cardholder who is the contributor or gift giver giving the monetary contribution or gift and an optional visual display 840. Display 840 displays the amount entered by manual operation of entry keys for entering the designated monetary amount contributed. Electronic contributions or gifts management terminal 100 or peripheral 100 has means therein for immediately recording, capturing, and/or seizing successive amounts of contributions or gifts including means for immediately storing the amount correlated to the indicia read on an information bearing card of the corresponding contributor or gift giver. The correlated amount and indicia read by the reader are for eventual off-loading thereof. Electronic contributions or gifts management terminal 100 or peripheral 100 has means for associating or correlating the amount correlated to the indicia read on the record of the corresponding contributor or gift giver with information representative of a particular cause, fund-raising organization, account within a fund raising organization, recipient of a gift, or combination thereof. There is also an association or correlation with a respective contributor's or gift giver's information bearing card information, respective contributor's or gift giver's numerical contribution or gift information, and a particular cause, fund-raising organization, account within a fund raising organization, or combination thereof. The correlation is immediate in one variant.

By way of further example, electronic contributions or gifts management terminal 100 or peripheral 100 has a key associated with indicia representative of a particular a particular a cause, fund-raising organization, account within a fund raising organization, a recipient of a gift, a wish list item of a gift recipient, a particular goal to which a gift will be given, or combination thereof. The key 911 represents a key (or portion of a touch sensitive screen) that designates contribution or gift to a "Save the Apes" fund or account, key 912 represents a key the designates a contribution or gift to a "Save the Kangaroos" fund or account, and key 913 represents a key the designates a contribution or gift to a "Save the Lions" fund or account. A contributor or gift giver designates which fund he wishes his contribution or gift to go to, e.g. by pressing key 912 "Save the Kangaroos" fund or account; key 913 represents a key which designates a contribution or gift to a "Save the Lions" fund or account; or, key 911 represents a key the designates a contribution or gift to a "Save the Apes" fund or account. The contributor's or gift giver's card information and designated contribution or gift monetary amount is associated with his cause designation.

In the example of a social event such as a wedding, keys represent designations of a gift to "a new house fund," "a new car fund," a "new baby fund," "a fund to pay for the wedding reception." In the case of a funeral, keys represent designations of a gift to "pay for the funeral expenses fund," a "contribution to a medical research society, e.g. American Lung Association, American Heart Association, etc." a "children of the deceased fund." In the case of a graduation party social event, keys represent designations of a gift to "a college fund," "a spring break vacation fund," and the like. It is understood that keys on terminal 100 or peripheral 100 have representations appropriate to the social event.

Electronic contributions or gifts management terminal 100 or peripheral 100 immediately stores the associated and designated information for eventual off-loading thereof. Off-loading is to fund-raiser's or gift recipient's terminal 120 or peripheral 120, a card account processor 1031, a funds processing network, a personal computer, the Internet, or combination thereof. The contributor's or gift giver's associated card information, contribution or gift amount and designation is then routed to a particular account. An account can be a separate account within a fund-raising organization group of accounts, a host database of accounts located at a remote location, an account of a particular fund-raising organization within a group of fund-raising organization accounts, or combination thereof. In a variant, all of the designated contribution or gift monetary amounts are funneled to a single account.

As an added safety measure terminals 100 or peripherals 100 are initialized for use from a remote computer. Initialization includes transferring data sets activating the software on terminal 100 or peripheral 100, data sets instructing the terminal 100 or peripheral 100 to correlate a group of contributions or gifts with data sets representative of a particular recipient of the group of contributions, and the like.

Provision can be made for a prompt on display 840 that prompts a contributor or gift giver to enter his card information. A contributor or gift giver enters his card information which is read by a reader 307. Another prompt on display 840 prompts the contributor or gift giver to select a particular cause to which he wishes make a contribution or gift. For example, the contributor or gift giver selects key 911 representing a "Save the Apes fund or account." The contributor or gift giver is prompted to enter a numerical contribution or gift amount. For example, the contributor or gift giver selects $50. The contributor's or gift giver's selection of a numerical contribution or gift amount, e.g. $50, and selection of, e.g. "The Save the Apes Fund," are associated or correlated with the contributor's or gift giver's card information from his respective information bearing card, and stored in the electronic contributions or gifts management terminal 100 or peripheral 100 data storage. A plurality of contributors or gift givers make their subsequent selections. The associated information, e.g. card information from each respective contributor or gift giver, contribution or gift information from each respective contributor or gift giver, and designation of cause, fund, or account, are then stored in data storage for eventual off-loading from electronic contributions or gifts management terminal 100 or peripheral 100. Off-loading can be to a fund-raiser's or gift recipient's terminal or peripheral 120, a card account processor 1031, a fund-processing data base, a bank, or combination thereof, for further processing. It will be appreciated further post contribution or gift processing can include preparation of a record substantiating the contribution or gift that is then forwarded to the contributor or gift giver for tax purposes and the like.

The keys 911, 912, and 913 can represent organizations such as the American Red Cross, American Cancer Society, American Diabetes Society, or other fund-raising organizations or gift recipients. As will be appreciated contributions and gifts can be gathered at funeral homes, wedding receptions, hospitals, charitable balls, concerts, and the like, for these various causes.

Figure 11:
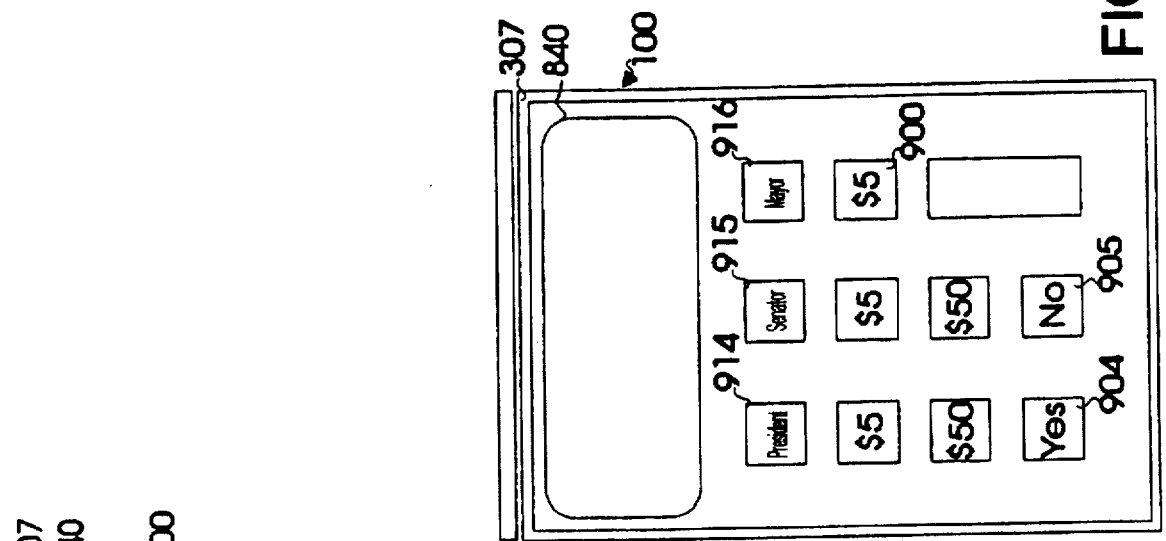
FIG. 11 is a plan view of a face of a terminal or peripheral for soliciting contributions and gifts for a plurality of political candidates.

FIG. 11 illustrates a face of a electronic contributions or gifts management terminal 100 or peripheral 100 used for simplifying and inducing the giving of political contributions and gifts by contributor or gift givers. The face is used on a electronic contributions or gifts management terminal 100 or peripheral 100 and used in method the of simplifying and inducing the giving of political contributions and gifts by contributor or gift givers vying for political office, receiving and immediately recording thereof upon receipt. The method comprises the steps disclosed herein comprising providing the contributor or gift givers or gift givers making monetary contributions and gifts with a portable (optionally hand-held) electronic contributions or gifts management terminal 100 or peripheral 100 for making of record information of the contribution or gift transaction, e.g. cardholder information and numerical contribution or gift amount information. The electronic contributions or gifts management terminal 100 or peripheral 100 has its own source of electric power 1437 and a plurality of entry keys manually operable for entering the amount of the contribution or gift to be given. The terminal also has a reader 307 on the electronic contribution or gifts or gifts management terminal 100 or peripheral 100 for reading an information bearing card having indicia thereon identifying the contributor or gift giver giving the monetary contribution or gift and an optional display 840. Display 840 displays the amount entered by manual operation of entry keys. Electronic contributions or gifts management terminal 100 or peripheral 100 has means for immediately recording the amount of the contribution or gift including means for immediately storing the amount correlated to the indicia read on an information bearing card of the corresponding contributor or gift giver. The correlated amount and indicia read by said reader are for eventual off-loading thereof. Electronic contributions or gifts management terminal 100 or peripheral 100 has means for associating the amount correlated to the indicia read on the record of the corresponding contributor or gift giver with information representative of a particular candidate for political office. These means include, by way of example, software routines that make the association.

By way of further example, electronic contributions or gifts management terminal 100 or peripheral 100 has a key associated with indicia representative of a particular candidate for political office, e.g. Ronald Regan or Dan Quayle, a particular political office, e.g. President, Mayor, Senator, Representative, Judge, political party committeeman, or combination thereof. By way of example, a contributor or gift giver designates which candidate, party, and/or political office he wishes his contribution or gift to go to. The contributor's or gift giver's card information and contribution or gift amount is associated with his designation. The contributor's or gift giver's associated card information, contribution or gift amount and designation is then routed to a particular account.

Provision can be made for a prompt on a display 840 which prompts a contributor or gift giver to enter his card information. A contributor or gift giver enters his card information which is read by the card reader 307. Another visual prompt on the display 840 prompts the contributor or gift giver to select a particular candidate to which he wishes make a contribution or gift for. By way of example, the contributor or gift giver selects key 914 representing a candidate for President. Other keys include a key representing a Senator or Senate seat 915, and a key for Mayor 916. Keys can include designations for national state, and local political offices, candidates, politicians, officeholders, office seekers, legislators, congressmen, and/or politicos. The contributor or gift giver is prompted to enter a numerical contribution or gift amount. Assume the contributor or gift giver selects $50. The contributor's or gift giver's selection of a numerical contribution or gift amount, e.g. $50, and selection of, e.g. President, are associated with the contributor's or gift giver's card information from his respective information bearing card, and stored in electronic contributions or gifts management terminal 100 or peripheral 100 data storage. A plurality of contributor or gift givers or gift givers make their subsequent selections sequentially. The associated information, e.g. card information, contribution or gift information and designation of candidate or political office, are then stored in data storage for eventual off-loading thereof. Off-loading can be to fund-raiser's or gift recipient's terminal or peripheral 120, a card account processor 1031, a fund-processing data base, a bank, or combination thereof, for further processing. The process is repeated for a plurality of successive contributors or gift givers.

FIG. 12 illustrates a face of a electronic contributions or gifts management terminal 100 or peripheral 100 used for simplifying and inducing the giving of contributions and gifts by contributors or gift givers to causes within a religious organization, e.g. First collection, Second Collection, and Cardinal's Appeal. This face is used with a electronic contributions or gifts management terminal 100 or peripheral 100 and used in the method of simplifying and inducing the giving of contributions and gifts, receiving and immediately recording thereof upon receipt. The method comprises the steps disclosed herein comprising providing the contributor or gift givers or gift givers making monetary contributions and gifts with a portable hand-held electronic contributions or gifts management terminal 100 or peripheral 100 for making of record data of the contribution or gift transaction, e.g. cardholder card information and numerical contribution or gift amount information. The electronic contributions or gifts management terminal 100 or peripheral 100 has its own source of electric power 1437 and a plurality of entry keys manually operable for entering the amount of the contribution or gift to be given in one embodiment. The electronic contributions or gifts management terminal 100 or peripheral 100 as illustrated in FIGS. 10-12 is a type of terminal accepting transactions by way of information bearing cards. Preferably, electronic contributions or gifts management terminal 100 or peripheral 100 is a portable hand-held terminal. This terminal or peripheral also has a reader 307 on the electronic contributions or gifts management terminal 100 or peripheral 100 for reading an information bearing card having indicia thereon identifying the contributor or gift giver making the monetary contribution or gift and an optional display 840. Display 840 displays the amount entered by manual operation of entry keys. Electronic contributions or gifts management terminal 100 or peripheral 100 has means for recording the amount of the contribution or gift including means for storing the amount correlated to the indicia read on an information bearing card of the corresponding contributor or gift giver. The correlated amount and indicia read by said reader are for eventual off-loading thereof. Electronic contributions or gifts management terminal 100 or peripheral 100 has means for associating the amount correlated to the indicia read on the record of the corresponding contributor or gift giver with information representative of a particular cause, account within a religious organization, or combination thereof. It is also possible to make an association or correlation with a respective contributor's or gift giver's information bearing card information, respective contributor's or gift giver's numerical contribution or gift information, and a particular cause within a religious organization.

Provision can be made wherein a religious organization designates to which collection, or cause, a sub-group of contribution or gift transactions within a group of contribution or gift transactions made during a session. Electronic contributions or gifts management terminal 100 or peripheral 100 provides for the designation or grouping of a sub-group of contributions or gifts for a particular collection, cause, or recipient of a contribution or gift. Electronic contributions or gifts management terminal 100 or peripheral 100 has a key, or code that is entered by, associated with indicia representative of a particular collection. Where a code representative of a particular collection is used, the code is associated or correlated with a group of respective contributions or gifts. The code is entered by an individual prior to a particular portion of a contribution or gift session. In a variant the code is correlated to a chronological time period during a portion of the contribution or gift session, and as such the terminal or peripheral 100 enters different modes of operation for the Association of a particular group of contributions or gifts with a particular recipient of the gift or contribution.

A key 911 represents designation of a contribution or gift to the "First Collection" fund or account, a key 912 represents a key the designates a contribution or gift to a "Second Collection" fund or account, and key 913 represents a key that designates a contribution or gift to a "Cardinal's Appeal" fund or account. A contributor or gift giver designates which fund he wishes his contribution or gift to go to, e.g. by pressing the key 912, key 913 or, key 911. The contributor's or gift giver's card information and contribution or gift amount is associated with his designation. Electronic contributions or gifts management terminal 100 or peripheral 100 immediately records and stores the associated and designated information in data storage for eventual off-loading thereof. Off-loading is to fund-raiser's or gift recipient's terminal or peripheral 120, a card account processor 1031, a funds processing network, or combination thereof. The contributor's or gift giver's associated card information, contribution or gift amount and designation is then routed to a particular account. Such an account can be a separate account within a religious organization, an account of a cause within a group of religious organization accounts, a particular recipient of a gift, or combination thereof.

Furthermore, a prompt on a display 840 prompts successive contributors or gift givers to enter card information. A contributor or gift giver enters his card information which is read by reader 307. Another prompt on display 840 prompts the contributor or gift giver to select a particular cause to which he wishes make a contribution or gift for. Assume the contributor or gift giver selects the key 911 representing the "First Collection." Collections include, by way of example, a capital improvement fund collection, a school fund collection, a Cardinal's appeal collection, a collection for the missions overseas, or combination thereof. The contributor or gift giver is prompted to enter a numerical contribution or gift amount. Assume the contributor or gift giver selects $50. The contributor's or gift giver's selection of a numerical contribution or gift amount, e.g. $50, and selection of a cause are associated with the contributor's or gift giver's card information from his respective information bearing card, and immediately recorded, and stored in electronic contributions or gifts management terminal 100 or peripheral 100 data storage. A plurality of contributor or gift givers or gift givers make their subsequent selections which are also immediately recorded. The associated information, e.g. card information from each respective contributor or gift giver, contribution or gift information from each respective contributor or gift giver, and designation of cause, fund, or account, are then stored in data storage for eventual off-loading from electronic contributions or gifts management terminal 100 or peripheral 100. Off-loading is to fund-raiser's or gift recipient's terminal or peripheral 120, a card account processor 1031, a fund-processing data base, a bank, or combination thereof, for further processing. As will be appreciated further processing can include preparation of a record substantiating the contribution or gift that is then forwarded to the contributor or gift giver for tax purposes and the like.

FIG. 13 illustrates a method of obtaining contributions and gifts. The method simplifies the way a contribution or gift is given and induces the giving of a contribution or gift. A portable hand held electronic contributions or gifts management terminal 100 or peripheral 100 is provided for receiving and immediately recording a contribution or gift given. The contribution or gift is made by use of card information from an information bearing card 145/150. As described above, information bearing card 145/150 is a credit card 145, debit card 150, or combination thereof.

A first contributor or gift giver 1 is handed a portable electronic contributions or gifts management terminal 100 or peripheral 100 for making of record data sets of a contribution or gift. The contribution or gift is made the contributor or gift giver using an information bearing card such as a credit card 145, debit card 150, or combination thereof. Preferably electronic contributions or gifts management terminal 100 or peripheral 100 has its own source of electric power 1437 and a plurality of optional keys (as described above) manually operable for entering the amount of the monetary contribution or gift to be given, designate a cause, etc. In a preferred embodiment, electronic contributions or gifts management terminal 100 or peripheral 100 has a case dimensioned for being held in the palm of contributor or gift giver 1's hand 1R. The electronic contributions or gifts management terminal 100 or peripheral 100 has a reader 307 disposed on electronic contributions or gifts management terminal 100 or peripheral 100 for reading a card record medium, e.g. an information bearing card. The card record medium has indicia identifying a contributor or gift giver 1 making a given monetary contribution or gift. The terminal has means for making a visual display 840 of the amount entered by manual operation of entry keys. Electronic contributions or gifts management terminal 100 or peripheral 100 also has means for recording the amount of the contribution or gift, e.g. data storage 302, including means for storing the amount of the contribution or gift correlated to the indicia read on the record medium, e.g. information bearing card, of the corresponding contributor or gift giver 1. The correlated amount and indicia read by reader 307 are for eventual off-loading from the electronic contributions or gifts management terminal 100 or peripheral 100. A plurality of terminals 100 or peripherals 100 are circulated, or dispersed among a group of prospective contributors.

Contributor or gift giver 1 is handed a electronic contributions or gifts management terminal 100 or peripheral 100 of the plurality of terminals 100, peripherals 100, or combination thereof. By way of example, contributor or gift giver 1 is provided electronic contributions or gifts management terminal 100 or peripheral 100 by a card account processor, a bank, a fund-raising organization, a manufacturer, third party account processor, or a combination thereof. The contributor or gift giver 1 holds the electronic contributions or gifts management terminal 100 or peripheral 100 in hand 1R. Contributor or gift giver 1 enters is card information by way of card reader 307 disposed on electronic contributions or gifts management terminal 100 or peripheral 100. The contributor or gift giver 1 takes his information bearing card, e.g. a credit card 145, debit card 150 or combination thereof, with his fingers on hand 1L, and passes it through card reader 307 disposed on electronic contributions or gifts management terminal 100 or peripheral 100. The reader 307 reads information on contributor or gift giver 1's information bearing card and stores it in a data storage. Contributor or gift giver 1 then uses his fingers on hand 1L and enters a contribution or gift amount, a designation for a particular cause the contribution or gift is for, or combination thereof. The contributor or gift giver 1 can press a single key disposed on electronic contributions or gifts management terminal 100 or peripheral 100, e.g. a $5 key, to enter a contribution or gift monetary amount. The contributor or gift giver 1 can press a combination of keys on a keyboard disposed on the electronic contributions or gifts management terminal 100 or peripheral 100 to designate a contribution or gift amount, e.g. $35.71. Contributor or gift giver 1's contribution or gift amount and respective card information are immediately correlated, and immediately stored in a data storage on electronic contributions or gifts management terminal 100 or peripheral 100. Contributor or gift giver 1 can enter card information with a single information bearing card or with multiple information bearing cards.

Contributor or gift giver 1 then passes the electronic contributions or gifts management terminal 100 or peripheral 100, as indicated by phantom line 11, to second contributor or gift giver 2. The second contributor or gift giver 2 receives electronic contributions or gifts management terminal 100 or peripheral 100 from contributor or gift giver 1 in his hand 2R. Contributor or gift giver 2 enters his respective card information by way of card reader 307 disposed on the electronic contributions or gifts management terminal 100 or peripheral 100.

The contributor or gift giver 2 takes his information bearing card, e.g. a credit card 145, debit card 150 or combination thereof, with his hand 2L, and passes it through card reader 307 disposed on electronic contributions or gifts management terminal 100 or peripheral 100. The card reader 307 reads information on contributor or gift giver 2's respective information bearing card, immediately records the information, and stores it in a data storage. Contributor or gift giver 2 then uses his hand 2L and enters a contribution or gift amount, a designation for a particular cause the contribution or gift is for, or combination thereof. The contributor or gift giver 2 can press a single key disposed on electronic contributions or gifts management terminal 100 or peripheral 100, e.g. a $10 key, to enter a contribution or gift amount (FIGS. 10, 11). Optionally, contributor or gift giver 2 can press a combination of keys on a keyboard disposed on electronic contributions or gifts management terminal 100 or peripheral 100 to designate a contribution or gift amount, e.g. $77.73. Contributor or gift giver 2's contribution or gift amount and respective card information are correlated, immediately recorded, and stored in a data storage on electronic contributions or gifts management terminal 100 or peripheral 100.

The process is repeated for each respective subsequent contributor or gift giver. For example, contributor or gift giver 2 passes electronic contributions or gifts management terminal 100 or peripheral 100, as indicated by phantom line 1N, to contributor or gift giver N. Contributor or gift giver N receives electronic contributions or gifts management terminal 100 or peripheral 100 from contributor or gift giver 2 in his hand NR. Contributor or gift giver N enters his respective card information by way of card reader 307 disposed on electronic contributions or gifts management terminal 100 or peripheral 100.

Contributor or gift giver N takes his respective information bearing card, e.g. a credit card 145, debit card 150 or combination thereof, with his fingers on hand NL, and passes it through card reader 307 disposed on electronic contributions or gifts management terminal 100 or peripheral 100. The reader 307 reads information on contributor or gift giver N's respective information bearing card, immediately records the information, and stores it in a data storage. Contributor or gift giver N then uses his hand NL and enters a contribution or gift amount, a designation for a particular cause the contribution or gift is for, or combination thereof. The contributor or gift giver N may press a single key disposed on electronic contributions or gifts management terminal 100 or peripheral 100, e.g. a $50 key, to enter a contribution or gift amount. Optionally, contributor or gift giver N may press a combination of keys on a keyboard disposed on electronic contributions or gifts management terminal 100 or peripheral 100 to designate a contribution or gift amount, e.g. $99.73. Contributor or gift giver N's contribution or gift amount and respective card information are correlated, immediately recorded, and stored in a data storage on electronic contributions or gifts management terminal 100 or peripheral 100.

For example, several hundred contribution or gift transactions ("L" contribution or gift transactions) can be made sequentially in the manner on a first electronic contributions or gifts management terminal 100 or peripheral $100_1$. A plurality of terminals 100, e.g. electronic contributions or gifts management terminal 100 or peripheral $100_1$ . . . through electronic contributions or gifts management terminal 100 or peripheral $100_Z$ are circulated or dispersed among a group of prospective contributors or gift givers. Each respective electronic contributions or gifts management terminal 100 or peripheral 100 can collect "L" contributions or gifts. The result is that "L" contributions or gifts times "Z," the number of electronic contributions and gifts management terminals 100 and/or peripherals 100, gives (Q) total contributions or gifts received. L*Z=Q. In one variant of the invention, it will be understood that (Q), e.g. tens of hundreds of contributions or gifts, have been received before interposing a request for verification or authorization, authorization step, verification step, or a combination thereof, between two respective contributions or gifts within the group of contributions or gifts (Q) during a contribution or gift session.

In the scenario where contributor or gift giver 1 has contributed contributor or gift giver 1's respective contribution or gift amount of $5.00, and his respective card information with immediate recordation thereof; where contributor or gift giver 2 has contributed his respective contribution or gift amount of $10.00 and his respective card information with immediate recordation thereof; and, where contributor or gift giver 3 has contributed his respective contribution or gift amount of $50.00 and his respective contribution or gift amount with immediate recordation thereof; and, contributor or gift giver N has contributed his respective contribution or gift amount of $100.00 and his respective card information with immediate recordation thereof, data storage in electronic contributions or gifts management terminal 100 or peripheral 100 stores the following:

Contributor or gift giver 1's card information $5.00
Contributor or gift giver 2's card information $10.00
Contributor or gift giver 3's card information $50.00
Contributor or gift giver N's card information $100.00

Subsequently, electronic contributions or gifts management terminal 100 or peripheral 100 transmits, communicates or off-loads:

Contributor or gift giver 1's card information and associated $5.00
Contributor or gift giver 2's card information and associated $10.00
Contributor or gift giver 3's card information and associated $50.00
Contributor or gift giver N's card information and associated $100.00 to fund-raiser's or gift recipient's terminal or peripheral 120 via docking station 1999. That is a communication link is established between electronic contributions or gifts management terminal 100 or peripheral 100 and remote terminal 120 for the transmission or communication of the information above. Terminal 120 receives, and immediately stores the information:

Contributor or gift giver 1's card information and associated $5.00
Contributor or gift giver 2's card information and associated $10.00
Contributor or gift giver 3's card information and associated $50.00
Contributor or gift giver N's card information and associated $100.00

Terminal 120 then communicates and/or transmits the information, including optional correlated information identifying a fund-raising organization, an account of a fund raising organization, or combination thereof, via communication link 1030, by way of example a telephone line, to card account processor 1031 or a funds processing network.

Optionally, an authorization is obtained at card account processor 1031 for each contribution or gift transaction at terminal 120 or peripheral 120. By way of example, information designating each contribution or gift transaction as authorized or unauthorized may be added to each respective contribution or gift:

Contributor or gift giver 1's card information and associated $5.00—unauthorized
Contributor or gift giver 2's card information and associated $10.00—authorized
Contributor or gift giver 3's card information and associated $50.00—authorized
Contributor or gift giver N's card information and associated $100.00—authorized The authorized contributions or gifts are then processed further. Processing includes debiting or charging, as appropriate, an account of a contributor or gift giver for the amount of the authorized contribution or gift. By way of example, Contributor or gift giver 2's account is debited $10.00;
Contributor or gift giver 3's account has a charge added to it of $50.00; and,
Contributor or gift giver N's account has a debit entered to it of $100.00.

An account of a fund-raising organization or gift recipient is augmented the amount of the authorized contributions and gifts. By way of example, fund-raiser's or gift recipient's account 1033 would be augmented for the $10.00 received from contributor or gift giver 2, for the $50.00 received from contributor or gift giver 3, and for the $100.00 received from contributor or gift giver N.

Contributor or gift giver 1's contribution or gift was unauthorized. As an unauthorized contribution or gift it may be reported to the fund raising organization or recipient of the gift or contribution. The fund raising organization or gift recipient may choose to follow up with Contributor or gift giver 1 to determine if the contributor or gift giver would like to make a subsequent contribution or gift. Optionally, contributor or gift giver 1's card information and respective contribution or gift amount of $5.00 may be discarded. It is understood that the unique nature of a contribution or gift in that it is a one way giving allows for authorization or verification of authorization at a point in time remote and space from the time and location at which the contributions or gifts are made on the terminals 100 or peripherals 100. A one way giving allows for contributions and gifts to be immediately recorded on terminals 100 and peripherals 100 without verification of authorization. Contributors and gift givers are free to leave terminals 100 and peripherals 100 upon recordation of gifts or contributions thereon. The gift recipient or fund-raising organization does not have a risk of loss for an exchanged tangible in the event a contribution or gift is not consummated.

Optionally, as each contributor or gift giver, e.g. 1,2, ... N, enters his respective card information and respective contribution or gift amount on electronic contributions or gifts management terminal 100 or peripheral 100, the contributions or gifts are immediately and successively recorded thereon, electronic contributions or gifts management terminal 100 or peripheral 100 transmits or communicates each respective card information and respective contribution or gift amount for each successive contributor or gift giver to terminal 120, which is remote from electronic contributions or gifts management terminal 100 or peripheral 100. Terminal 120 then stores a back-up copy of data sets of each contribution or gift, e.g. respective contributor or gift giver contribution or gift amount information and card information in a data storage. Optionally, each respective contributor's or gift giver's card information and numerical information of a monetary contribution or gift amount is temporarily stored in terminal 120 in a group for eventual transmission thereof to a card account processor 1031 via communication link 1030. Optionally, electronic contributions or gifts management terminal 100 or peripheral 100 transmits card information and contribution amount information after a certain minimum threshold value has been reached. By way of example, electronic contributions or gifts management terminal 100 or peripheral 100 transmits this information after a threshold contribution or gift level of, for example, $500.00 or $1000.00 has been reached. Optionally, every time a threshold amount has been reached a transmission via a communication link to fund-raiser's or gift recipient's terminal or peripheral 120, card account processor 1030, a bank, or combination thereof is made. As described previously, a communication link can include a mobile telephone cellular link, a communication link incorporating pager technology, a communication link to a satellite, and the like.

In yet a further embodiment, a group of contribution or gift transactions are forwarded from electronic contributions or gifts management terminal 100 or peripheral 100 to terminal 120, terminal 120 makes a copy of the contributions or gifts and then automatically initiates upon activation thereof of a downloading procedure to card account processor 1030, a bank, a fund processing network, or combination thereof.

It is appreciated that this back-up feature will decrease the risk of loss of card information and contribution or gift amount information in the event that electronic contributions or gifts management terminal 100 or peripheral 100 is accidentally damaged or malfunctions.

By way of example, in the scenario where contributor or gift giver 1 has entered his respective contribution or gift, electronic contributions or gifts management terminal 100 or peripheral 100 transmits contributor or gift giver 1's respective contribution or gift transaction to terminal 120 (which is remote from the vicinity of where terminals 100 are used with group 4000 (FIG. 17) in this example) via a wireless communication link 140. Terminal 100 or peripheral 100 optionally immediately records the contribution or gift thereon. Terminal 120 immediately records and stores contributor or gift giver 1's contribution or gift in a data storage for eventual transmission to card account processor 1031. Electronic contributions or gifts management terminal 100 or peripheral 100 retains a record of contributor or gift giver 1's contribution or gift. Terminal 120 retains a copy of contributor or gift giver 1's contribution or gift. It is understood that having two copies of the contribution or gift, e.g. one copy retained on terminal 100 and peripheral 100 and one copy on terminal 120 or peripheral 120, decreases the risk of loss the contribution or gift. This feature is especially preferred where a multiplicity of successive contributions or gifts are made on the terminal 100 or peripheral 100. There is a significant decrease in the risk of loss of the multiplicity of contribution information where one or more record copies are made by the methods and devices described herein.

Optionally, the copy of contributors' or gift givers' data sets comprised of contributions or gifts immediately recorded in electronic contributions or gifts management terminal 100 or peripheral 100's data storage are optionally compared to the copy of data sets comprised of contributions in terminal 120's data storage. Comparison is made to determine if there has been a corruption of data sets on either peripheral 100 or terminal 100, or on terminal 120 or peripheral 120.

Contributor or gift giver 2 enters his contribution or gift. The data sets comprised of the contribution or gift are immediately recorded on terminal 100 or peripheral 100. Electronic contributions or gifts management terminal 100 or peripheral 100 transmits contributor or gift giver 2's respective data sets comprised of a contribution or gift to terminal 120 (which is remote in this example) via a wireless communication link 140. Terminal 120 immediately records and stores contributor or gift giver 2's data sets comprised of a contribution or gift in a data storage for eventual transmission to card account processor 1031. Electronic contributions or gifts management terminal 100 or peripheral 100 retains a record of contributor or gift giver 2's data sets comprised of a contribution or gift. Terminal 120 retains a copy of contributor or gift giver 2's data sets comprised of the contribution or gift. Optionally, the copy of contributor or gift giver 1's data sets comprised of the contribution or gift in electronic contributions or gifts management terminal 100 or peripheral 100's data storage is compared to the copy in terminal 120's data storage. Optionally, contributor or gift giver 1's and contributor or gift giver 2's contribution or gift data sets are grouped together for eventual transmission to card account processor 1031.

If the electronic contributions or gifts management terminal 100 or peripheral 100 is accidentally damaged as it makes its way to contributor or gift giver N so that it is no longer operational and so that it has lost the contribution or gift data sets in data storage 302. It will be appreciated that since a "copy" of the contribution or gift data sets of contributor's or gift giver's 1 and 2 are retained in terminal 120, these contribution or gift data sets can still be submitted to card account processor 1031 for processing, whereas lack of this back up feature would have resulted in the loss of the contribution or gift data sets made by contributor's or gift giver's 1 and 2. It will be understood that this feature will provide a great deal of security in the event there are thousands of dollars of contribution or gift data sets received by electronic contributions or gifts management terminal 100 or peripheral 100 and electronic contributions or gifts management terminal 100 or peripheral 100 is lost, damaged, or stolen.

A method of reducing the risk associated with the damage to data storage of a portable electronic contributions or gifts management terminal 100 or peripheral 100, the loss, or theft of electronic contributions or gifts management terminal 100 or peripheral 100, and the loss of data sets comprised of successive contributions and gifts immediately recorded on terminal 100 or peripheral 100, is also provided. A contributor or gift giver 1 enters his contribution or gift data sets into portable a electronic contributions or gifts management terminal 100 or peripheral 100 for immediate recordation thereof or optionally for immediate real time communication thereof to a remote terminal 120 or peripheral 120. A record of the contribution or gift transaction is retained in electronic contributions or gifts management terminal 100 or peripheral 100. A single contribution or gift transaction, or a preferably a plurality of successive made contributions or gifts, are transmitted or communicated to terminal 120 via communication link 140, preferably a wireless communication link. Terminal 120 stores a "copy" of the single contribution or gift data sets, or a "copy" of a plurality of the successively made contribution or gift data sets in a data storage. Eventually, terminal 120 transmits a single contribution or gift data sets or a group of contribution or gift data sets to a card account processor 1031 for processing.

In another variant of peripheral 100, self-powered peripheral 100 consists essentially of card reader 307; optional program storage having routines for reading information from successive contributors' or gift givers' information bearing cards, and routines for immediately communicating the information read from successive contributors' or gift givers' record bearing cards to a remote terminal or peripheral, e.g. terminal 120 and peripheral 120, and communication circuitry. In this variant, operation of peripheral 100 is as follows: a contributor or gift giver 1 enters a contribution data sets or data sets comprised of information identifying the contributor or gift giver on peripheral 100. The information is automatically read by reader 307. Peripheral 100 immediately communicates contributor or gift giver 1 contribution data sets or data sets comprised of information identifying the contributor or gift giver to a remote terminal 120 or peripheral 120. Terminal 120 or peripheral 120 immediately records the contribution data sets or data sets comprised of information identifying the contributor or gift giver thereon for eventual off-loading thereof. It is appreciated that a plurality of successive contribution data sets made by successive contributors are immediately communicated from peripheral 100 to remote terminal of peripheral 120 as they are made on peripheral 100. It is further appreciated that the data sets are optionally encrypted for transmission from peripheral 100 to peripheral 120, and that there is no risk of loss of data sets if peripheral 100 is damaged since immediate recordation of respective data sets is accomplished at remote peripheral 120 or terminal 120.

Optionally, the original single contribution or gift data set, or plurality of successively made contribution or gift data sets, are transmitted to terminal 120 from electronic contributions or gifts management terminal 100 or peripheral 100 and no record copy of the transaction is retained in electronic contributions or gifts management terminal 100 or peripheral 100 data storage. It will be understood that the transmission of contribution or gift transaction data to remote terminal 120 from electronic contributions or gifts management terminal 100 or peripheral 100, as electronic contributions or gifts management terminal 100 or peripheral 100 is being used in the field for gather contribution or gift transactions, allows for memory 302 to be cleared and freed up for additional contribution or gift transactions to be made on electronic contributions or gifts management terminal 100 or peripheral 100. This method allows for electronic contributions or gifts management terminal 100 or peripheral 100 to gather a multiplicity of contribution or gift data sets with limited memory and allows for a terminal to be manufactured with limited memory requirements. The peripheral 120 or terminal 120 also optionally transmits a data set to peripheral 100 to notify a contributor or gift giver that communication of data sets therebetween is being executed properly.

Figure 20:
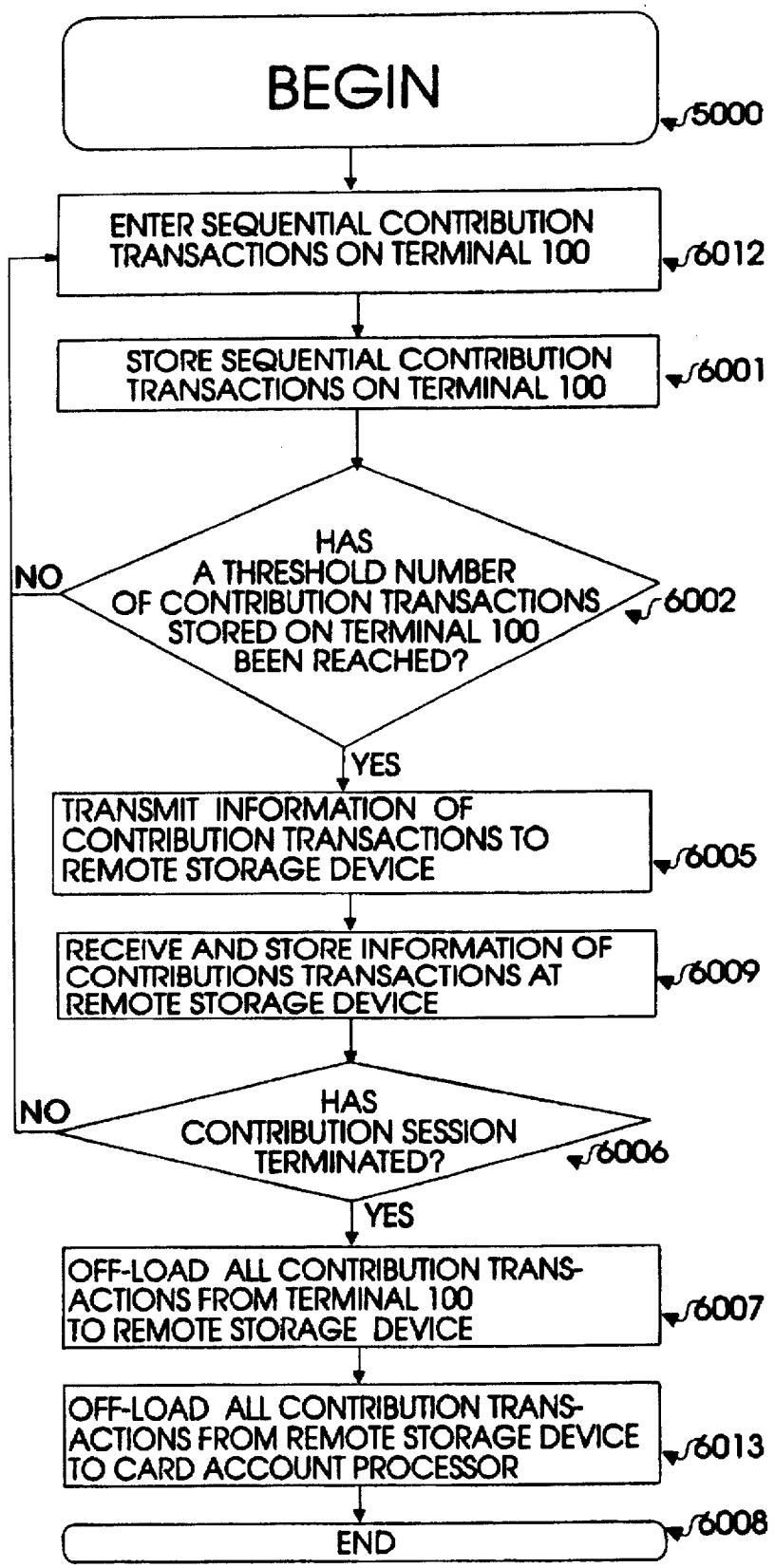
FIG. 20 is a diagram illustrating a method of safeguarding and limiting the risk of loss of a multiplicity of contributions or gifts made on contribution or gift management terminals or peripherals.

As illustrated in FIG. 20, a variant provides a method of safe-guarding and minimizing the risk of loss of contribution or gift data sets from electronic contributions or gifts management terminal 100 or peripheral 100 via a software routine and associated hardware. Routine 6001 begins the method or routine. Routine 6000 stores sequential contribution or gift data sets on electronic contributions or gifts management terminal 100 or peripheral 100. A multiplicity of contribution or gift data sets are successive made on terminal 100 or peripheral 100. Routine 6002 determines if the number of sequential cumulative contribution or gift data sets stored on electronic contributions or gifts management terminal 100 or peripheral 100 has reached a minimum or maximum threshold value, e.g. 50 contributions or gifts data sets, 100 contributions or gifts data sets, 200 contributions or gifts data sets, etc. In a variant routine 6002, determines if the dollar value of the sequential cumulative contributions or gifts has reached a threshold value. If yes, electronic contributions or gifts management terminal 100 or peripheral 100 transmits information of the sequential, cumulative contributions or gifts to a remote terminal or peripheral, e.g. fund raiser's or gift recipient's terminal 120 or peripheral 120, or to another electronic contributions or gifts management terminal 100 or peripheral 100, for storage. It will be understood that identical or substantially identical records of contribution or gift data sets are immediately recorded and stored in both electronic contributions or gifts management terminal 100 or peripheral 100 and the remote terminal. Routine 6006 determines if the contribution or gift session has ended. If yes, routine 6004 is executed to download the record of the contribution or gift data sets in electronic contributions or gifts management terminal 100 or peripheral 100 to a remote terminal. If no, routine 6001 is executed to continue storing sequential contribution or gift data sets on electronic contributions or gifts management terminal 100 or peripheral 100. In a variant, the contribution or gift data sets downloaded after the termination of the contribution or gift session is compared to the record copy of the contribution or gift transaction data that was sequentially transmitted for storage to the remote terminal for accuracy.

FIG. 14 illustrates a variation of the method of receiving a contribution or gift of FIG. 13. The method simplifies the way a contribution or gift is given and induces the giving of a contribution or gift. Electronic contributions or gifts management terminal 100 or peripheral 100 is provided for receiving and immediately recording the contribution or gift. The contribution consists of card information from an information bearing card 145/150. As described above, information bearing card 145/150 is a credit card 145, debit card 150, or combination thereof.

A contributor or gift giver N is provided for making of a monetary contribution or gift with a portable electronic contributions or gifts management terminal 100 or peripheral 100 for making of record data of a contribution or gift by an agent 4 of a fund-raising organization or gift recipient of agent thereof. As used herein, the term agent refers to a volunteer, employee, principle or any individual acting on behalf of a fund-raising organization, a cause or a gift recipient. The contribution or gift is made by contributor or gift giver N by way of information bearing card 145/150. Preferably electronic contributions or gifts management terminal 100 or peripheral 100 has its own source of electric power 1437 and a plurality of optional entry keys manually operable for entering the amount of the monetary contribution or gift to be given. In a preferred embodiment, electronic contributions or gifts management terminal 100 or peripheral 100 has a case dimensioned for being held in the palm of contributor or gift giver N's band NR. Electronic contributions or gifts management terminal 100 or peripheral 100 has a reader 307 disposed on electronic contributions or gifts management terminal 100 or peripheral 100 for reading a record medium, e.g. an information bearing card. The record medium has indicia thereon identifying a contributor or gift giver N making a given monetary contribution or gift. The terminal has optional means for making a visual display 840 of the amount entered by manual operation of entry keys. Electronic contributions or gifts management terminal 100 or peripheral 100 also has means for immediately recording the amount of successive contributions or gifts, e.g. data storage 302, including means for storing the amount of the contribution or gift correlated to the indicia read on the record medium, e.g. information bearing card, of the corresponding contributor or gift giver N. The correlated amount and indicia read by reader 307 are for eventual off-loading from electronic contributions or gifts management terminal 100 or peripheral 100.

Contributor or gift giver N is provided electronic contributions or gifts management terminal 100 or peripheral 100 or agent 4 holds the terminal in hand 5R. By way of further example, contributor or gift giver N holds electronic contributions or gifts management terminal 100 or peripheral 100 in hand NR. Contributor or gift giver N enters card information by way of card reader 307 disposed on electronic contributions or gifts management terminal 100 or peripheral 100 or agent 4 enters the contributor's or gift giver's card information. The contributor or gift giver N, or agent 4, takes contributor or gift giver N's information bearing card, e.g. a credit card 145, debit card 150, or combination thereof, with hand NL or the agent's hand, and passes it through card reader 307 disposed on electronic contributions or gifts management terminal 100 or peripheral 100. Reader 307 reads information on contributor or gift giver N's information bearing card and stores it in a data storage. Contributor or gift giver N or agent 4 then uses his hand NL or the agent's hand and enters a contribution or gift amount, a designation for a particular cause the contribution or gift is for, or combination thereof. By way of further example, contributor or gift giver N or agent 4 may press a single key disposed on electronic contributions or gifts management terminal 100 or peripheral 100, e.g. a $5 key, to enter a contribution or gift amount. Optionally, contributor or gift giver N or agent 4 may press a combination of keys on a keyboard disposed on electronic contributions or gifts management terminal 100 or peripheral 100 to designate a contribution or gift amount, e.g. $35.71. Contributor or gift giver N's contribution or gift amount and respective card information are correlated, and stored in a data storage on electronic contributions or gifts management terminal 100 or peripheral 100. Contributor or gift giver N or agent 4 may enter card information with a single information bearing card or with multiple information bearing cards. The same procedure is effected for a plurality of contributors or gift givers.

Figure 15:
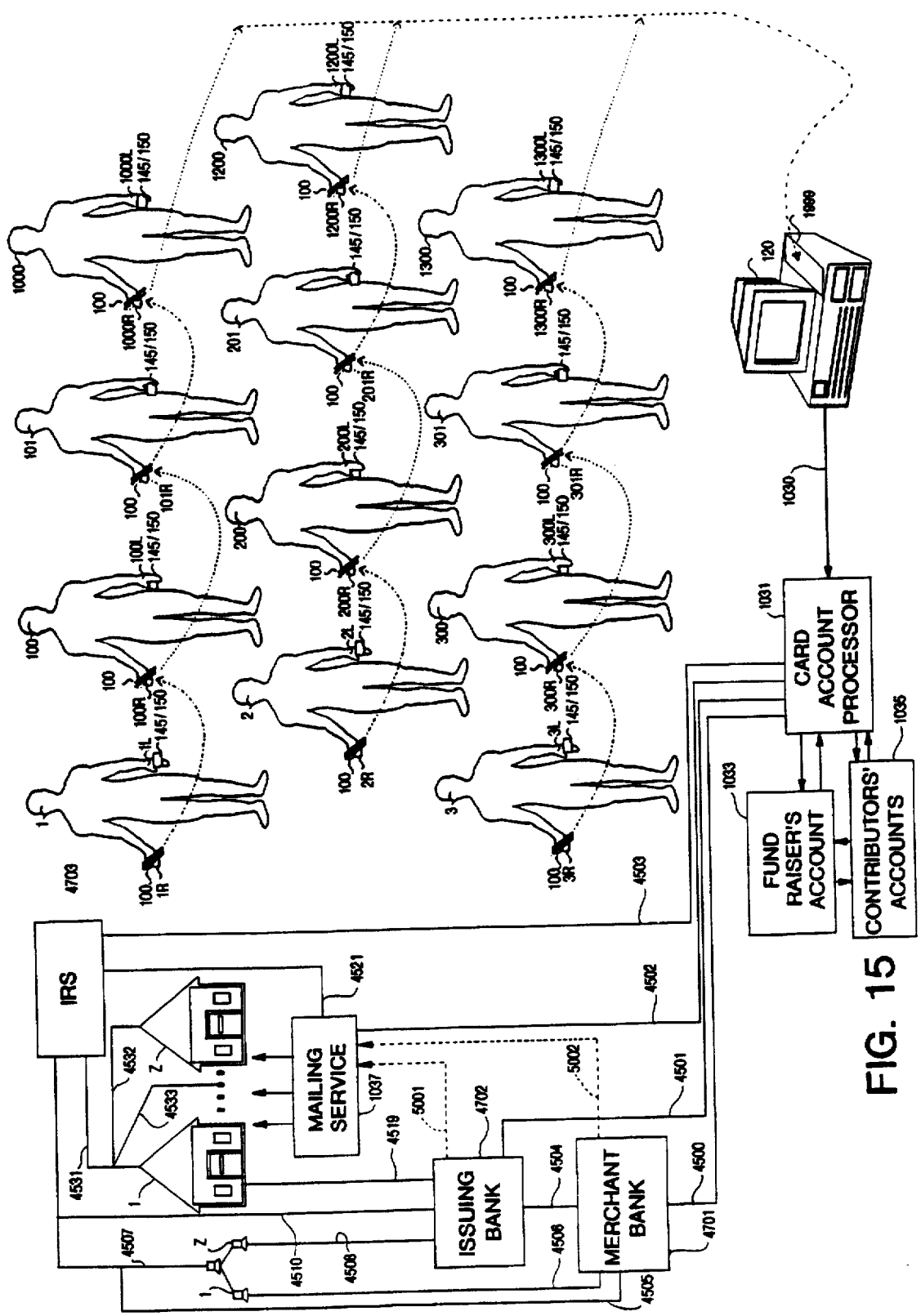
FIG. 15 is a diagram of a method of substantiating contributions and gifts to a fund-raising organization or gift recipient.

FIG. 15 is a diagram of a method of substantiating a contribution or gift. The method also is used for substantiating a charitable contribution or gift deduction. The contribution or gift is made by way of an information bearing card including self-authenticating, and self-authorizing record bearing cards. It is understood that the method described herein provides for ubiquitous contribution or gift making and substantiation. Ubiquitous contribution or gift making and substantiation involves the making of a contribution or gift anywhere, or anyplace there is a terminal 100 or peripheral 100 provided, and being provided a record that consolidates the contributions or gifts made at different remote locations ubiquitously, and to disparate fund-raising organizations or gift recipients.

Figure 23:
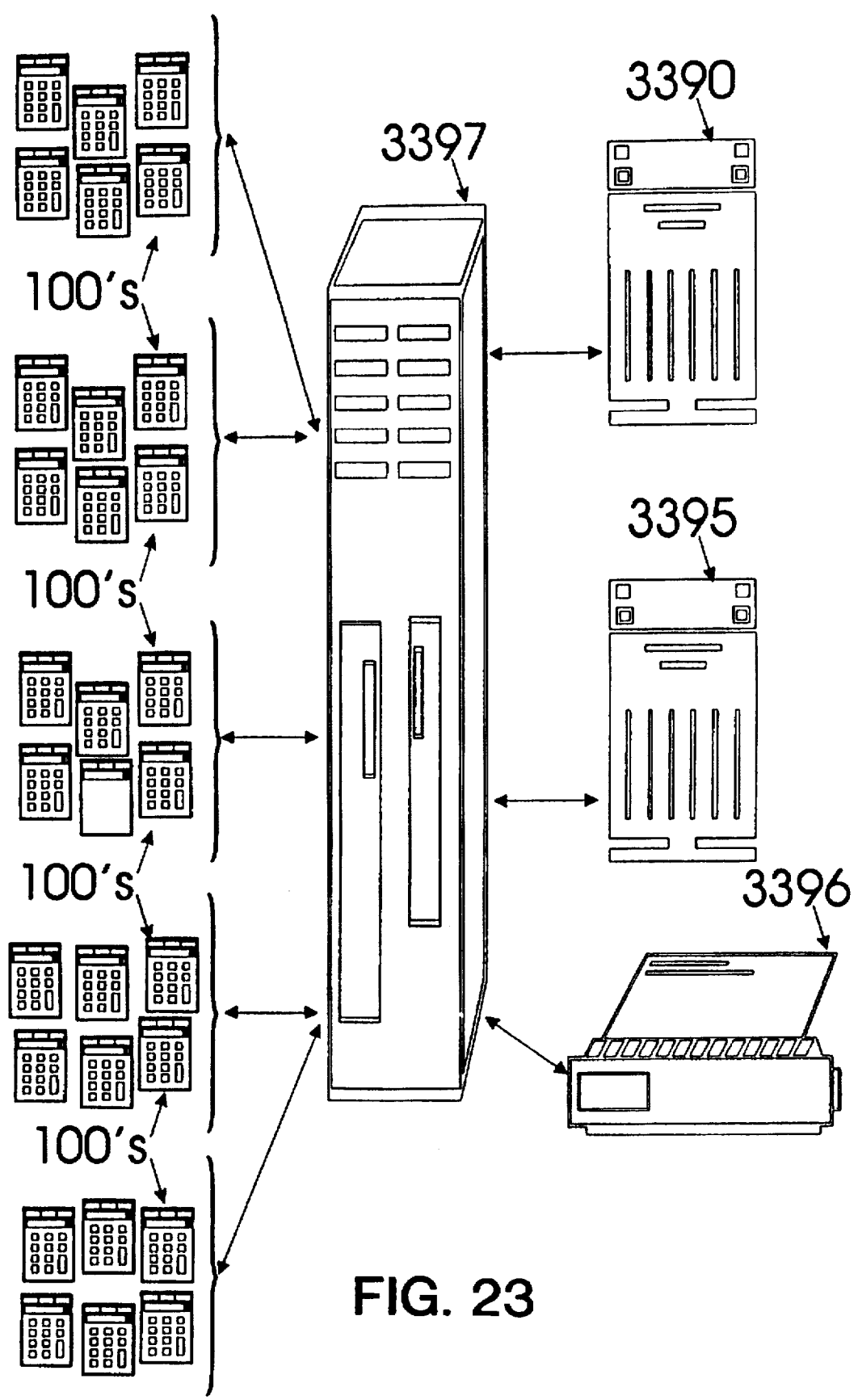

By way of example, contributor or gift giver α makes contributions to gift recipient or fund-raising organization β (contribution β), gift recipient or fund-raising organization δ (contribution δ), gift recipient or fund-raising organization γ (contribution γ), gift recipient or fund-raising organization δ (contribution δ), and gift recipient or fund-raising organization ε (contribution ε) respectively on terminals 100 or peripherals 100 and/or a personal computer at a remote location, e.g. at home. Terminals 100, peripherals 100, or personal computers are located at remote locations at different times. The contributions or gifts are immediately entered and/or recorded on the terminals 100, peripherals 100, and/or personal computers. The respective contributions or gifts are communicated from the respective terminals 100, peripherals 100, or personal computers by way of a communication link(s) to a remote contributions and gift management terminal, peripheral or computer 3397 (FIG. 23).

In one variant, routines on computer 3397 correlate data sets comprising address information from data base 3390 with contributors' or gift givers' respective card record information entered on terminals 100 or peripherals 100. Data base 3390 comprises address information of a multiplicity of contributors or gift givers (FIG. 23). Of course, data base 3390 comprises a single or a plurality of databases. By way of example, card record information for contributor or gift giver α are associated with data sets comprising contributor or gift giver α's address information resident on database 3390 and the respective contributions or gifts made by the contributor or gift giver. An acknowledgment is prepared from the associated information comprising the following information by way of printing means 3396:

contributor or gift giver α's address information gift recipient or fund-raising organization β—contribution β
gift recipient or fund-raising organization θ—contribution θ
gift recipient or fund-raising organization γ—contribtuon γ
gift recipient or fund-raising organization δ—contribution δ
gift recipient or fund-raising organization ε—contribution ε

It is understood that the acknowledgment, or ratification of a multiplicity of contributions or gifts made by multiplicity of contributors or gifts at remote locations is greatly streamlined using the modes of operation and methods described herein. Contributors or gift makers are further induced to make contributions or gifts by way of information bearing cards since they are optionally provided a single unitary acknowledgment of all contributions made anywhere, any place to any gift recipient on terminals 100, peripherals 100 or personal computers 100.

In a variant of the present invention, a record bearing medium of a respective contributor or gift giver comprises the contributors' or gift givers' address information in storage. In this variant, remote terminals 100, peripherals 100, or personal computers communicate the following information to computer 3397:

contributor or gift giver α's address information—gift recipient or fund-raising organization β—contribution β
contributor or gift giver α's address information—gift recipient or fund-raising organization θ—contribution θ
contributor or gift giver α's address information—gift recipient or fund-raising organization γ—contribtuon γ
contributor or gift giver α's address information—gift recipient or fund-raising organization δ—contribution δ
contributor or gift giver α's address information—gift recipient or fund-raising organization ε—contribution ε

The other method steps are then executed.

Routines on terminal or computer 3397 also optionally directly correlate a charitable contribution deduction status to the respective contribution or gift or portion thereof:

Contribution or gift β—100% of contribution or gift tax deductible
Contribution or gift θ—50% of the contribution or gift tax deductible
Contribution or gift γ—0% of the contribution or gift tax deductible
Contribution or gift δ—75% of the contribution or gift tax deductible
Contribution or gift ε—100% of the contribution or gift tax deductible Correlation is accomplished by the use of routines on computer 3397 that include expert system software. The contributions or gifts and their respective status are immediately recorded on computer or terminal 3397. An acknowledgment or status report is prepared and forwarded to contributor α. The acknowledgment or status report, electronic or hard copy comprises the following data:

Contibution or gift β—100% of contribution or gift tax deductible
Contribution or gift θ—50% of the contribution or gift tax deductible
Contribution or gift δ—75% of the contribution or gift tax deductible
Contribution or gift ε—100% of the contribution or gift tax deductible Total of contributions or gifts that are tax deductible:

Contibution or gift β+Contribution or gift θ/2+Contribution or gift ¾ δ+Contribution or gift ε

It is appreciated that a multiplicity of the respective contributions or gifts both for a single contributor or gift giver and or a plurality of contributors' or gift givers' are processed in rapid succession with a minimization in time, a maximization of speed and throughput. It is further appreciated that the same method an system is applied to contributors or gift givers ζ, η, θ, . . . I, K, λ, μ, ν, . . . ξ, O, π, ρ, σ, ς, T, U, φ, X, ψ, and . . . ω. The method and system greatly simplifies the substantiation of the status of charitable contributions for a multiplicity of contributors and gift givers by making contributions or gifts with the contributors and gift givers record bearing cards.

Routines on computer 3397 automatically optionally assemble contributor or gift giver α's respective contributions from remote terminals 100, peripherals 100 or remote but networked personal computers having charitable contribution status data sets correlated therewith upon entry or recordation of the respective contributions.

That is, charitable contribution status data sets are correlated on remote terminals 100, peripherals 100, or personal computers to respective contributions or gifts. For example, the following correlations are made:

Contribution or gift β—100% of contribution or gift tax deductible
Contribution or gift θ—50% of the contribution or gift tax deductible
Contribution or gift δ—75% of the contribution or gift tax deductible
Contribution or gift ε—100% of the contribution or gift tax deductible The correlated data is then forwarded to remote computer 3397, and the other modes of operation and methods described herein are also executed.

A contributor or gift giver making a monetary contribution or gift is provided with a portable electronic contributions or gifts management terminal 100 or peripheral 100 for making of record information of the contribution or gift data set. The contribution or gift data sets comprising card information from a respective contributor's or gift giver's information bearing card, contribution or gift amount information, a designation of a particular cause for which the contribution or gift is made, contribution or gift routing information, a designation of the tax deductibility of a particular contribution or gift transaction, or a combination thereof. In one embodiment, electronic contributions or gifts management terminal 100 or peripheral 100 has its own source of electric power and optionally a plurality of entry keys manually operable for entering the amount of the contribution or gift to be given, a designation of a particular cause for which the contribution or gift is to be made, or combination thereof. In an alternate embodiment, electronic contributions or gifts management terminal 100 or peripheral 100 has the features described above. A reader 307 on electronic contributions or gifts management terminal 100 or peripheral 100 reads information from a respective contributor's or gift giver's information bearing card having indicia thereon identifying the contributor or gift giver giving the monetary contribution or gift. The same is done for a plurality of successively made or consecutive contributions or gifts. Electronic contributions or gifts management terminal 100 or peripheral 100 has optional means for making a visual display of the amount entered by manual operation of entry keys, and the terminal having means for recording the amount of the contribution or gift including means for storing the amount correlated to the indicia read on the information bearing card of the corresponding contributor or gift giver, correlated to a contributor's or gift giver's designation of a cause, or correlated to a combination thereof. The contribution or gift data is retrieved from electronic contributions or gifts management terminal 100 or peripheral 100, and downloaded to fund-raiser's or gift recipient's terminal 120 or peripheral 120, card account processor 1031, a bank 1043, a funds processing network, e.g. VISA Net, or a combination thereof. Terminals 100 or peripherals 100 are used by different organizations and at different locations, e.g. a plurality of terminals 100 or peripherals are used by the American Red Cross, another plurality of terminals 100 or peripherals are used by the Roman Catholic Church, and yet another plurality of terminals or peripherals are used by the American Heart Association. A contributor or gift giver makes contributions or gifts on terminals 100 or peripherals 100 to each respective organization. Data of the contributions or gifts made ubiquitously at the different organizations, e.g. where ever, there are terminals 100 or peripherals 100, and communicated to a remote location for processing thereof, including the provision of a single contribution or gift report.

Processing of the retrieved data of the contributions or gifts occurs as described above. Processing includes by way of example, electronically associating an address data set, e.g. a postal address data set, electronic mail address data set, e.g. e-mail address data set, with a contributor or gift giver, and/or preparing a record of the contribution or gift. The record of the contribution or gift is forwarded to said contributor or gift giver. The record may be a hard copy print out of the contribution or gift forwarded to a mailing service 1037. The mailing service 1037 then forwards the record of the contribution or gift to the contributor or gift giver.

By way of example, contributor or gift giver N makes a contribution and gift transaction as described above on electronic contributions or gifts management terminal 100 or peripheral 100. Electronic contributions or gifts management terminal 100 or peripheral 100 downloads or off-loads the contribution or gift transaction data to terminal 120 via docking station 1999 and communication link 140, card account processor 1031 via communication link 1030, a bank 1043 (FIG. 15a), a network, or combination thereof. The contribution or gift data is processed. Processing includes routing data sets representative of funds from and to appropriate accounts 1033, 1035, debiting and crediting respective accounts, and preparing records of these contributions or gifts. Processing can also include grouping contribution or gift data sets with other contribution or gift data sets that qualify for a charitable contribution or gift deduction for a single cardholder that is a contributor or gift giver, or a plurality of cardholders that are contributor or gift givers. Processing also can include grouping contribution or gift data sets made by a single contributor or gift giver to a particular fund-raising organization or gift recipient, e.g. a church, the American Red Cross, or particular type of fund-raising organization, a newly wed couple, a health related fund-raising organizations, arts related fund-raising organizations, etc. Processing can also include grouping contributions or gifts data sets.

By way of example, assume, contributor or gift giver$_1$ makes contribution or gifts 1 through 100 during a specified time period, e.g. one week, one month, one year, one taxable time period. Contributions or gifts 1 through 100 are grouped into authorized and unauthorized. Assume contributions or gifts 95 through 100 are unauthorized, and contributions or gifts 1 through 94 are authorized. Contributions or gifts 1 through 94 are grouped into contributions or gifts that qualify for a charitable contribution or gift deduction and those that do not qualify for a charitable contribution or gift deduction. Assume that contributions or gifts 1 through 50 qualify for a charitable contribution or gift deduction and that contributions or gifts 51 through 94 do not qualify for a charitable contribution or gift deduction. Contributions or gifts 1 through 50 are then be forwarded to a contributor or gift giver, e.g. by mailing a record of the contributions or gifts or electronically forwarding signals representative of the contributions or gifts to a contributor or gift giver, tax processing body, e.g. the IRS, a fund-raising organization, e.g. a church, or a combination thereof. It will be understood that data sets comprised of contributions or gifts 1 to 100, data sets comprised of an accounting report, or a combination thereof, are sent to a fund-raising organization or gift recipient from a card account processor, settling bank, issuing bank, merchant bank, or a combination thereof, via a communication link. The process is repeated for successive contributors or gift givers, e.g. contributor or gift giver$_1$ through contributor or gift giver$_N$. It will be understood that a large number of contributions or gifts are substantiated and accorded the status of a charitable contribution or gift deduction, and a substantial amount of costs saved which would have to expended for substantiating charitable contribution or gifts and gifts made by card holders to fund-raising organizations or other gift recipients by employing electronic contributions or gifts management terminal 100 or peripheral 100 and methods of ubiquitous contribution and gift making and substantiation referred to herein.

A record of a contribution or gift data sets or a group of data sets is routed to a mailing service 1037, e.g. the U.S. Post Office, a private mail courier, or the like. The mailing service 1037 delivers the record of the contribution or gift to a mailing address of contributor or gift giver 1039. The record of the contribution or gift is used by the contributor or gift giver to substantiate the contribution or gift made to the fund-raising organization or gift recipient. Substantiation may be made to a national, state, or local taxing body, e.g. the Internal Revenue Service. It will be understood that the costs associated with and the speed of providing substantiation for charitable contribution or gift deductions, and the like, for a plurality of cardholders who are contributor or gift givers or gift givers will be reduced by utilization of the above method.

In an alternate method, the method comprises the step of forwarding a record of the contribution or gift to contributor or gift giver N by electronically mailing, e.g. e-mailing, a record of the contribution or gift to contributor or gift giver N using a communication link, e.g. phone lines. By way of example, a periodic statement regarding contributions and gifts is sent to a contributor or gift giver via a network of computers, e.g. Prodigy, America On line, and the like, to a contributor's or gift giver's home computer terminal via a communication link, e.g. a telephone hook up.

The record of the contribution or gift is forwarded by a bank 1043, a card account processor 1031, by way of example, Card establishment Services of Melville, N.Y., or VISA Merchant Bank Services of San Mateo Calif., MasterCard, a fund-raising organization, an issuing bank, a processing bank, a merchant bank, recipient of a contribution or gift, or combination thereof to contributor or gift giver N. It is understood that a plurality of ubiquitously made contributions or gifts made by a plurality of different contributors or gift givers is processed, acknowledged at a great speed and in a minimal amount of time.

In yet another embodiment of the method, a record of the contribution or gift, or a plurality of contributions or gifts made by a contributor or gift giver, are electronically forwarded, mailed, or combination thereof, to a governmental tax processing body, e.g. the Internal Revenue Service. It will be appreciated that the method disclosed herein has a number of benefits, including the reduction of the work and resources associated with preparing tax returns and claiming charitable contribution or gift deductions, reducing the amount of fraud associated with claiming charitable contribution or gift deductions, reducing the amount of work a governmental tax processing authority has to do when processing charitable contribution or gift deductions.

The method provided above can also include the step of associating with charitable contribution or gift data with a tax identification number of a contributor or gift giver, e.g. a social security number of a contributor or gift giver and the like, a tax return for a contributor or gift giver, or a combination thereof. It will be appreciated that the association of the tax identification number associated with a contributor or gift giver, a tax return of a contributor or gift giver, and a contribution or gift or plurality of contribution or gift for a contributor or gift giver, and the direct forwarding of the contribution or gift information to a tax processing governmental body will greatly simplify the processing of charitable contribution or gift deductions and the like.

The present invention further contemplates forwarding a record of contributions or gifts to a fund-raising organization, a contributor or gift giver, or to a contributor or gift giver on behalf of a fund-raising organization from a card account processor 1031, a bank, or combination thereof. As will be appreciated utilization of this method provides the benefits of streamlining the process for fund-raising organizations involved with substantiating contributions and gifts made by contributors or gift givers.

The method further optionally includes the step of providing a contemporaneous, or subsequent, written acknowledgment or record of the contribution or gift by the fund-raising organization or gift recipient. The acknowledgment or record substantiating a contribution or gift optionally comprises the following information, or combination thereof:

(1) The amount of cash or equivalent card information and numerical contribution or gift amount contributed;

(2) Whether the fund-raising organization provided any goods or services in consideration, in whole or in part, in exchange for the cash contributed; and, (3) A description and good faith estimate of the value of any goods or services referred to in (2) above of, if such goods or services consist solely of intangible religious benefits a statement to that effect.

The term intangible religious benefit refers to any intangible religious benefit which is provided by an organization organized exclusively for religious purposes and which generally is not sold in a commercial transaction outside the donative context. An acknowledgment is considered contemporaneous if the contributor or gift giver taxpayer obtains the acknowledgment on or before the earlier of (1) the date on which a taxpayer files a return for the taxable year in which the contribution or gift is made, or the due date (including extensions) for filing such a return. By way of example, such substantiation is provided by portable hand-held electronic contributions or gifts management terminal 100 or peripheral 100, fund-raising terminal 120, a printer, a portable hand-held electronic contributions or gifts management terminal 100 or peripheral 100, wherein portable hand-held electronic contributions or gifts management terminal 100 or peripheral 100 has its own source of electrical power and an integral printer, a card account processor 1030, a bank, a fund-raising organization, or combination thereof. The acknowledgment is a periodic statement reflecting information bearing card account balances and the like, in one embodiment.

In yet another embodiment of the method, such substantiation is optionally provided by a standard information bearing card 145/150, electronic contributions or gifts management terminal 100 or peripheral 100, a printer, a card account processor 1030, a bank, a fund-raising organization, or combination thereof. Preferably, the acknowledgment is provided remote of the entry of contributions or gifts on terminal 100 or peripheral 100.

The method also includes the optional step of a fund-raising organization or a card account processor 1031 providing direct substantiation of a contribution or gift to a tax processing governmental body, e.g. the Internal Revenue Service, on a hard copy of a tax return or electronically by transmitting data sets Comprised of the contribution(s) or gift(s) correlated to data sets comprised of the charitable deductibility status of the contribution(s) or gift(s). The substantiation and record thereof, includes, by way of example, (1) The amount of cash, card information and numerical contribution or gift amount contributed by a respective contributor or gift giver, or a group of contributor or gift givers;

(2) Whether the fund-raising organization or gift recipient provided any goods or services in consideration, in whole or in part, in exchange for the cash contributed; and, (3) A description and good faith estimate of the value of any goods or services referred to in (2) above of, if such goods or services consist solely of intangible religious benefits a statement to that effect.

Electronic contributions or gifts management terminal 100 or peripheral 100, terminal 120, card account processor 1030, a bank, a fund-raising organization, or combination thereof, optionally associate to a contribution or gift, e.g. including card information and numerical contribution or gift amount information for a single contributor or gift giver or a plurality of contributor or gift givers or gift givers, a designation regarding the tax deductibility status of the contribution or gift transaction. By way of example, the status may include whether or not the contribution or gift is or is not tax deductible, or whether the organization to which the contribution or gift is made fails under a certain category of taxable organization, or combination thereof.

Figure 15A:
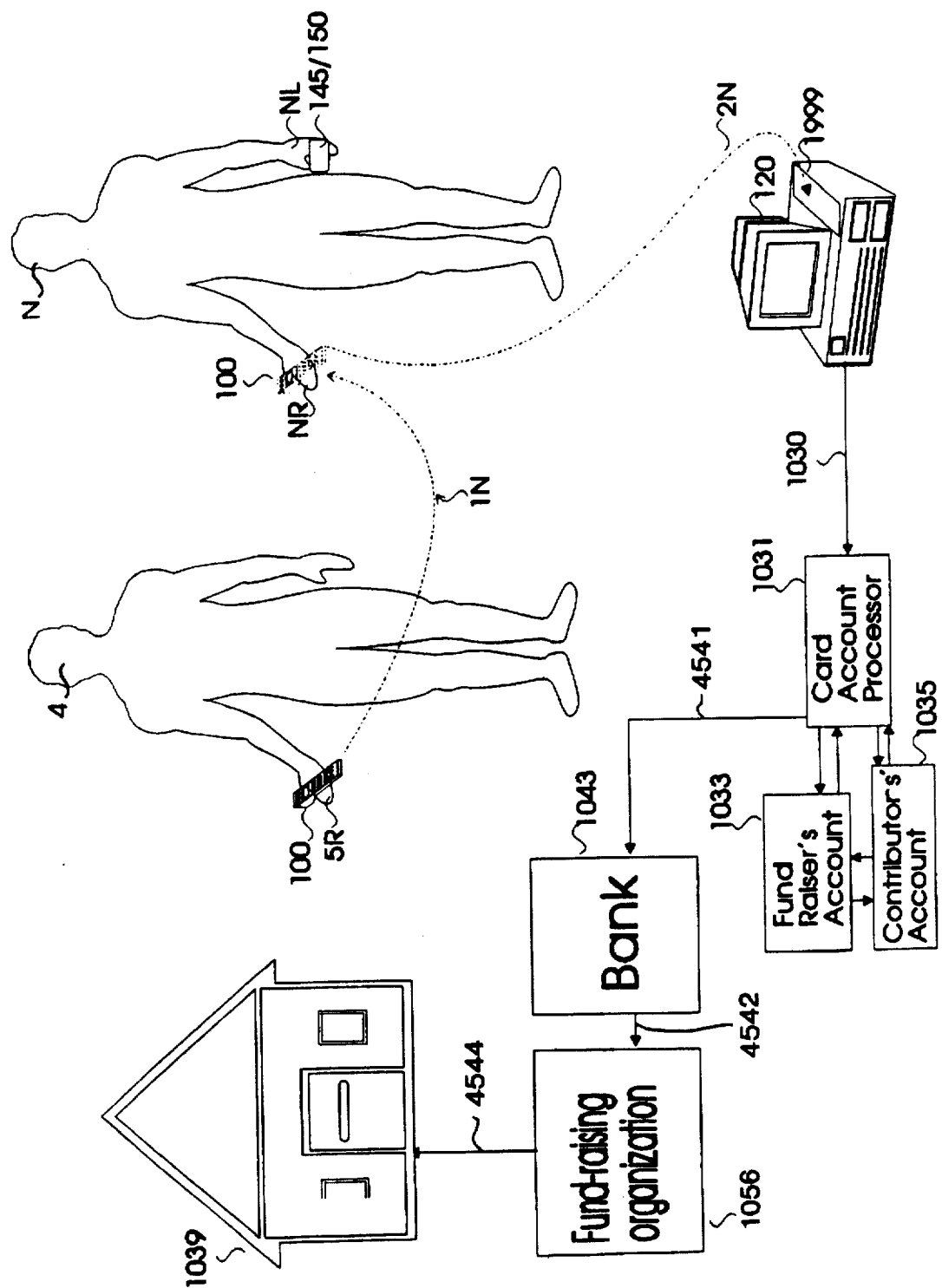
FIG. 15a is another embodiment of a method of FIG. 15 for substantiating contributions and gifts to a fund-raising organization or gift recipient.

As illustrated in FIGS. 14–15a, the cover or case of a electronic contributions or gifts management terminal 100 or peripheral 100 is optionally constructed so as to fit easily in the palm of hand of a contributor or gift giver. Preferably, the case is of a size and shape to aid in the transfer of the terminal from one contributor or gift giver to another contributor or gift giver. The case is optionally molded to include on the sides thereof corrugations or indentations for the fingers and palm of a contributor or gift giver. Alternately, electronic contributions or gifts management terminal 100 or peripheral 100 can include a handle that is fixed to the electronic contributions or gifts management terminal 100 or peripheral 100 or is rotatably fixed to electronic contributions or gifts management terminal 100 or peripheral 100 to assist in passing or transfer of the terminal or peripheral from one contributor or gift giver to another contributor or gift giver.

FIG. 15 illustrates a method of dispersing; spreading; dispensing; dispersing, disseminating; diffusing; advancing; or combination thereof, of a multiplicity of self-powered terminals 100 and/or peripherals 100 for making a multiplicity of contributions or gifts, amidst; between; in the midst of; in dispersion through; and/or amid an assemblage; gathering; crowd; or throng of prospective contributors or gift givers.

Contributor or gift giver 1 enters a contribution or gift on electronic contributions or gifts management terminal 100 or peripheral 100 dispersed into a crowd of prospective contributors or gift givers.

Contributor or gift giver 1 transfers the first electronic contributions or gifts management terminal 100 or peripheral 100 sequentially to subsequent contributors or gift givers, e.g. the next contributor or gift giver through contributor or gift giver 1000, e.g. the 1000th contributor or gift giver in this first group further dispersing the terminal amidst the group of prospective contributors or gift givers. This first group of contributor or gift givers or gift givers makes sequential contributions or gifts on a first electronic contributions or gifts management terminal 100 or peripheral 100.

Contributor or gift giver 2 transfers the second electronic contributions or gifts management terminal 100 or peripheral 100 sequentially to subsequent contributors or gift givers, e.g. the next contributor or gift giver through contributor or gift giver 1200, e.g. the 1200th contributor or gift giver in this second group, thereby further difussing the terminal or peripheral amidst the group of prospective contributors or gift givers. The second group of contributors or gift givers makes sequential, consecutive contributions or gifts on the second electronic contributions or gifts management terminal 100 or peripheral 100.

Contributor or gift giver 3 transfers the third electronic contributions or gifts management terminal 100 or peripheral 100 sequentially to subsequent contributor or gift givers or gift givers, e.g. the next contributor or gift giver through contributor or gift giver 1300, e.g. the 1300th contributor or gift giver in this third group, distributing the terminal 100 or peripheral 100 among this group of contributors or gift givers. The third group of contributors or gift givers makes consecutive contributions or gifts on the third electronic contributions or gifts management terminal 100 or peripheral 100.

The sequential contributions or gifts made by the three groups, respectively, on the first electronic contributions or gifts management terminal 100 or peripheral 100, the second electronic contributions or gifts management terminal 100 or peripheral 100, and the third electronic contributions or gifts management terminal 100 or peripheral 100 are optionally uninterrupted by requests for authorization or verification of the respective contributions or gifts. The first electronic contributions or gifts management terminal 100 or peripheral 100, second electronic contributions or gifts management terminal 100 or peripheral 100, and third electronic contributions or gifts management terminal 100 or peripheral 100 is brought back to docking station 1999 after the contribution or gift session, and the multiplicity of sequentially made contribution or gift information is down loaded or off-loaded from each respective electronic contributions or gifts management terminals 100 or peripherals 100 to terminal 120 via a communication link, to a card account processor 1031 via communication link 1030, or a combination thereof.

FIG. 15 also illustrates communication links that are used in a system and methods of the invention. Communication links (analogous to links 140, 1030) are used to transmit a single or a group of contribution or gift information units, e.g. correlated cardholder and contribution or gift amount information; correlated cardholder, contribution or gift amount, and tax deductibility status of a particular contribution or gift amount; correlated cardholder, contribution or gift amount, and cause information; an electronic record of contribution or gift transactions made at a single contribution or gift session or a group of contribution or gift sessions for a single contributor or gift giver or group of contributor or gift givers or gift givers; charitable contribution or gift deduction substantiation paper records and electronic records; electronic records for substantiating contribution or gift transactions made at a single contribution or gift session or a group of contribution or gift sessions for a single contributor or gift giver or group of contributors or gift givers; or combination thereof. These information units are transmitted to a merchant bank 4701; an issuing bank 4702; home computers 1' through Z' of respective contributors or gift givers; homes or mailing addresses 1' to Z' of respective contributors or gift givers (where Z' is an integer); mailing service 1037; the Internal Revenue Service 4703 (or other taxing processing entity) or a combination thereof.

For example, card account processor 1031 transmits information representative of the information units, electronic records, other information referred to above, or a combination thereof, to merchant bank 4701 via communication link 4500, e.g. a telephone link or dedicated line, to issuing bank 4702 via communication link 4501, to a mailing service 1037 via communication link 4502. Issuing bank 4702 has a communication link 4504 with merchant bank 4701. Merchant bank 4701 has a communication link 4505 with the Internal Revenue service 4703. Merchant bank 4701 has a communication link 4506 with the networked home computers of 1' through Z' of respective contributors or gift givers. Home computers of 1' through Z' of respective contributors or gift givers have a communication link 4507 with the tax processing body 4703. Issuing bank 4702 has a communication link 4510 with the Internal Revenue Service 4703. Issuing bank 4702 has a communication link 4508 with the networked home computers of 1' through Z' of respective contributors or gift givers. Merchant bank 4701, issuing bank 4702, card account processor 1031, or a combination thereof, routes records of correlated contributions or gifts and charitable contribution or gift deduction substantiations and other paper or electronic records in a variant to mailing service via routes 5002, and 5001 respectively. Mailing service 1037 then distributes the records to each respective contributor's or gift giver's home 1' through Z' as indicated by the arrows in FIG. 15. Issuing bank 4702, merchant bank 4701, or a combination thereof, also has a communication link 4519 to respective contributor or gift givers or gift givers homes 1' through Z'. Mailing service has communication link 4521 with IRS 4703. Links 4531, 4532, 4533 represent communication links with the respective contributor or gift givers or gift givers' homes and the IRS 4703. It will be understood that the various communication links illustrated are used in the methods and systems described herein and facilitate, simplify, and lower transaction costs for the substantiation of charitable contribution or gift deductions given by a multiplicity of cardholder contributor or gift givers or gift givers on a multiplicity of terminals 100.

FIG. 15a illustrates the flow of correlated contribution or gift information made on electronic contributions or gifts management terminal 100 or peripheral 100 as described. Electronic contributions or gifts management terminal 100 or peripheral 100 transmits a multiplicity of contribution or gift information to terminal 120 when electronic contributions or gifts management terminal 100 or peripheral 100 is communicative linked to docking station 1999 via link 2N after a contribution or gift session with a plurality of contributor or gift givers or gift givers. Terminal 120 transmits the correlated information via link 1030 to a card account processor 1031. Card account processor 1031 processes the information. Card account processor 1031 transmits the correlated and processed information to bank 1043 via communication link 4541. Bank 1043 transmits the correlated and processed information via link 4542 to fund-raising organization 1056. Fund-raising organization or gift recipient then transmits the correlated and processed information by route 4544 to a mailing address 1039 of a respective contributor or gift giver.

Figure 16:
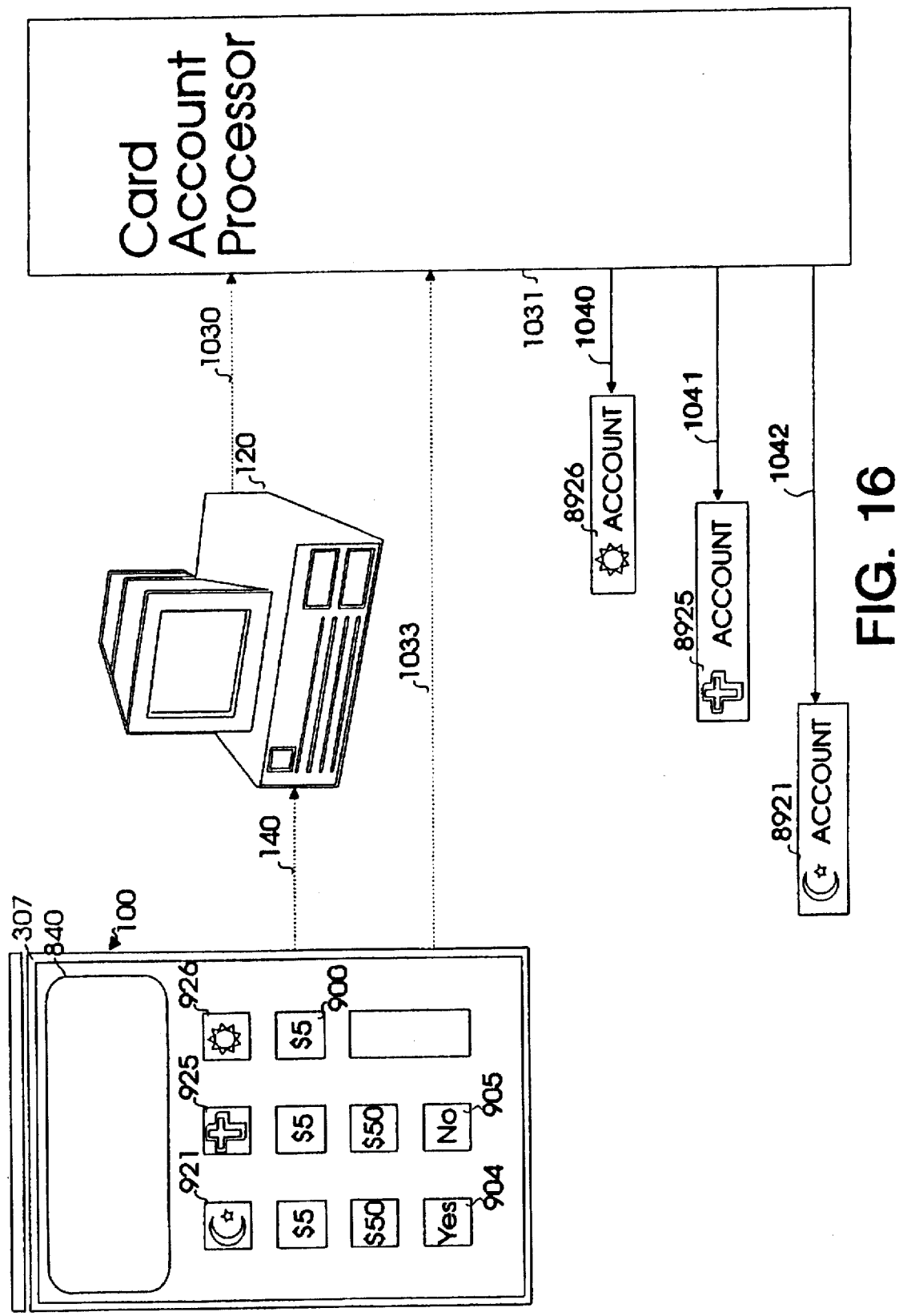
FIG. 16 is a diagram of a method of soliciting contributions and gifts for a plurality of causes and a method of processing the contributions and gifts collected.

FIG. 16 illustrates a method of simplifying and inducing the giving of monetary contributions and gifts by contributor or gift givers or gift givers (Contributor or gift givers or gift givers, include individuals) as described above and illustrates a method or routing and system for routing contribution or gift transactions correlated with different fund-raising organizations or different accounts of fund-raising organizations. The method includes receiving and immediately recording a multiplicity of contribution or gifts and gifts made by use of an information bearing card on electronic contribution or gifts or gifts management terminal 100 or peripheral 100.

The method consists of providing; dispersing among; spreading amidst; circulating among; or, interspersing amid the contributors or gift givers making monetary contribution or gifts a portable, hand-held electronic contributions or gifts management terminal 100 or peripheral 100 for making of record data of the contributions or gifts. In one embodiment, electronic contributions or gifts management terminal 100 or peripheral 100 has its own source of electric power and a plurality of entry keys manually operable for entering the amount of the contribution or gift to be given. Electronic contributions or gifts management terminal 100 or peripheral 100 has a face as described in FIGS. 10–12. In another embodiment, electronic contributions or gifts management terminal 100 or peripheral 100 is an information bearing card terminal or peripheral. A card reader 307 is disposed on electronic contributions or gifts management terminal 100 or peripheral 100 for reading an information bearing card having indicia thereon identifying the contributor or gift giver making the monetary contribution or gift. Electronic contributions or gifts management terminal 100 or peripheral 100 has optional means for making a visual display of the monetary contribution or gift amount entered by manual operation of entry keys. Electronic contributions or gifts management terminal 100 or peripheral 100 has means for recording the amount of the contribution or gift including means for storing the amount correlated to the indicia read on the information bearing card of the corresponding contributor or gift giver. The correlated amount and indicia read by the card reader from the information bearing card are for eventual off-loading from electronic contributions or gifts management terminal 100 or peripheral 100 as described above. Off-loading, e.g. downloading, of the associated cause information, respective contribution or gift amount information, and card information from a respective contributor or gift giver, is to a fund-raiser's or gift recipient's terminal or peripheral 120, fund processing network, e.g. VISA Net, a bank, or a combination thereof, via communication links 140, 1030, 1033, or combination thereof. The card account processor 1031, fund processing network, e.g. VISA Net, a bank, or combination thereof, route the associated card information, contributor or gift giver information, and account designation to an account of a single fired-raising organization, to a plurality of accounts of a single fund-raising organization associated with the cause for which the contributor or gift giver designation was made, or a combination thereof.

For example, key 921 represents a first cause 921, key 925 represents a second cause, and key 926 represents a third cause. A first contribution or gift is correlated with information representative of first cause 921. A second contribution or gift is correlated with information representative of second cause 925. A third contribution or gift is correlated with information representative of third cause 926. The correlated information is transmitted to terminal 120 via link 140, then to card account processor 1031. In a variant correlated contributions or gifts are transmitted to card account processor 1031 via link 1033.

The method and system includes routing the respective contribution or gifts to causes 921, 925, 926 to each respective account of each respective cause. The information of the first correlated contribution or gift is routed to account 8921 via communication link 1042. The information of the second correlated contribution or gift is routed to account 8925 via communication link 1041. The information of the third correlated contribution or gift is routed to account 8926 via communication link 1040.

As will be understood contribution or gift information can be routed to a plurality accounts, that include by way of example, a plurality of accounts within a single fund-raising organization, accounts for a plurality of fund-raising organizations, accounts for a plurality of causes, gift recipient, or combination thereof.

As mentioned above, the use of electronic contributions or gifts management terminal 100 or peripheral 100 as it is passed from one contributor or gift giver to another contributor or gift giver; or dispersed, diffused, advanced, or spread among a group of prospective contributors or gift givers, will increase the risk of electronic contributions or gifts management terminal 100 or peripheral 100 being damaged by being accidentally dropped. Optionally, the electronic contributions or gifts management terminal 100 or peripheral 100 also comprises a shock-absorbing material surrounding the case of electronic contributions or gifts management terminal 100 or peripheral 100 (not pictured). Shock absorbing material can be located around the exterior to electronic contributions or gifts management terminal 100 or peripheral 100 to shield electronic contributions or gifts management terminal 100 or peripheral 100 from damage in the event the terminal is accidentally dropped. Shock absorbing material can also be used inside electronic contributions or gifts management terminal 100 or peripheral 100 to shield circuitry. Alternately the shell of electronic contributions or gifts management terminal 100 or peripheral 100 may be constructed of shock absorbing material. Shock absorbing material includes shock absorbing foams, plastics, rubbers, and other material capable of absorbing shock.

A method of streamlining the generation and assembly of a contributor or gift giver list is also provided. It is appreciated that an enlargement of a prospective or actual contributor or gift giver identity list is quickened with the system, terminal, peripheral, and mode of operation described herein. A plurality of contributor or gift givers, e.g. 1, 2, ... N, enter card information, associated numerical contribution or gift amounts, or a combination thereof, into electronic contributions or gifts management terminal 100 or peripheral 100 as described above. Electronic contributions or gifts management terminal 100 or peripheral 100 stores plurality of contributions or gifts as described above. The data sets stored on terminal 100 or peripheral 100 include, information such as the names of each respective contributor or gift giver, an account number for each respective contributor or gift giver, and a corresponding numerical contribution or gift monetary amount for each respective contributor or gift giver. Optionally, the data sets comprising the names of the contributors or gift givers is segregated from numerical contribution amount data sets. The data sets comprising the names of the contributors or gift givers are then assembled and presented in a hard copy format.

Optionally, the contribution or gift information is transmitted to a card account processor, a funds transferring network, a bank, or combination thereof for processing. Processing includes associating an address with the respective contributions or gifts or portions thereof. The associated contribution or gift transaction information and address information for each contributor or gift giver is then grouped together. A hard copy of the grouped information is then printed out, stored onto a computer disk, or forwarded to a fund-raising organization via a communication link to a database. It will be appreciated that a list prepared by the method described above can be used by a fund-raising organization or gift recipient for the subsequent solicitation of contributor or gift givers or gift givers. In a variant, the information is entered on electronic contributions or gifts management terminal 100 or peripheral 100 subsequent to the contribution or gift.

The method described above may also include an ratification step whereby a contributor approves the provision of his address and other personal information for entry on a list, e.g. income information, age information, and other data which can be used for market research. The method described above may also include a step of associating the contributor's or gift giver's card information, contribution or gift information, or combination thereof, with other market research data, e.g. age of contributor or gift giver, income level of contributor or gift giver, and other normally obtained market research data. In this scenario electronic contributions or gifts management terminal 100 or peripheral 100 may be a portable hand-held terminal as described.

The present invention provides a method of increasing the giving of contributions and gifts, a method of increasing the average size of a contribution or gift given by an contributor or gift giver, a method of increasing the average contribution or gift given by an individual over a period of time, a method of increasing the contribution or gift revenue of a fund-raising organization, a method of increasing the average contribution or gift revenue of a fund-raising organization, a method of increasing the average giving of a contributor or gift giver to a single fund-raising organization, of a plurality of fund-raising organizations. The methods described above include a contribution or gift wherein the contribution or gift is a fund-raising organization contribution or gift, a political contribution, a religious organization contribution, a charitable contribution. The method steps are those as disclosed above. It is understood having terminals 100 or peripherals 100 dispersed among or between the contributors or gift givers in a crowd activates the latent contribution potential of the crowd thereby providing an impetus to make contributions or gifts. There results a positive interaction inducing the making of contributions and gifts among prospective contributors or gift givers who have portable, self-powered terminals 100 or peripherals 100 interspersed among the contributors and gift givers. Both positive and negative inducements from the interaction among the contributors or gift givers results therefrom.

The invention provides a method of minimizing the liability risk for a card account processor, a gift recipient, and fund-raising organization associated with utilization of an off-line information bearing card terminal. There is generally no risk of loss of a tangible in the context of a gift or contribution.

A method of decreasing the average number of charge backs associated with a group of transactions is also provided. The transactions are made on an off-line electronic contributions or gifts management terminal 100 or peripheral 100 that accepts transactions by use of information bearing card. The method includes the steps of gathering a plurality of contributions or gifts into a batch through the use of an off-line information bearing card terminal. The contribution or gift comprises information from an information bearing card for a respective contributor or gift giver and designated contribution or gift amount information for a respective contributor or gift giver. The contribution or gift data are transmitted in batch for authorization to a card account processor. Unauthorized transactions are discarded and authorized transactions are settled or reconciled.

The present invention also provides a system for fund raising, increasing fund-raising revenue, or combination thereof. The system comprises a portable off-line electronic contributions or gifts management terminal 100 or peripheral 100 that allows a plurality of contributor or gift givers or gift givers to make contributions and gifts sequentially by use of each cardholder contributor's or gift giver's information bearing card. Electronic contributions or gifts management terminal 100 or peripheral 100 is as described above.

The system includes an optional fund raiser's terminal 120 for accepting each respective contributor's or gift giver's correlated card information, numerical amount information, cause designation information, designation of tax deductibility of contribution or gift, or combination thereof. Terminal 120 post processes this information.

The system includes an optional communication link for downloading correlated card information for a respective contributor or gift giver, numerical amount information for a respective contributor or gift giver, cause designation information, or combination thereof, to a fund-raiser's terminal.

The system also includes optional card processing services for routing card transaction information, and a an account product for storing post processed contributions and gifts. The account product includes, e.g. a bank account. The system also includes the methods disclosed herein.

Figure 17:
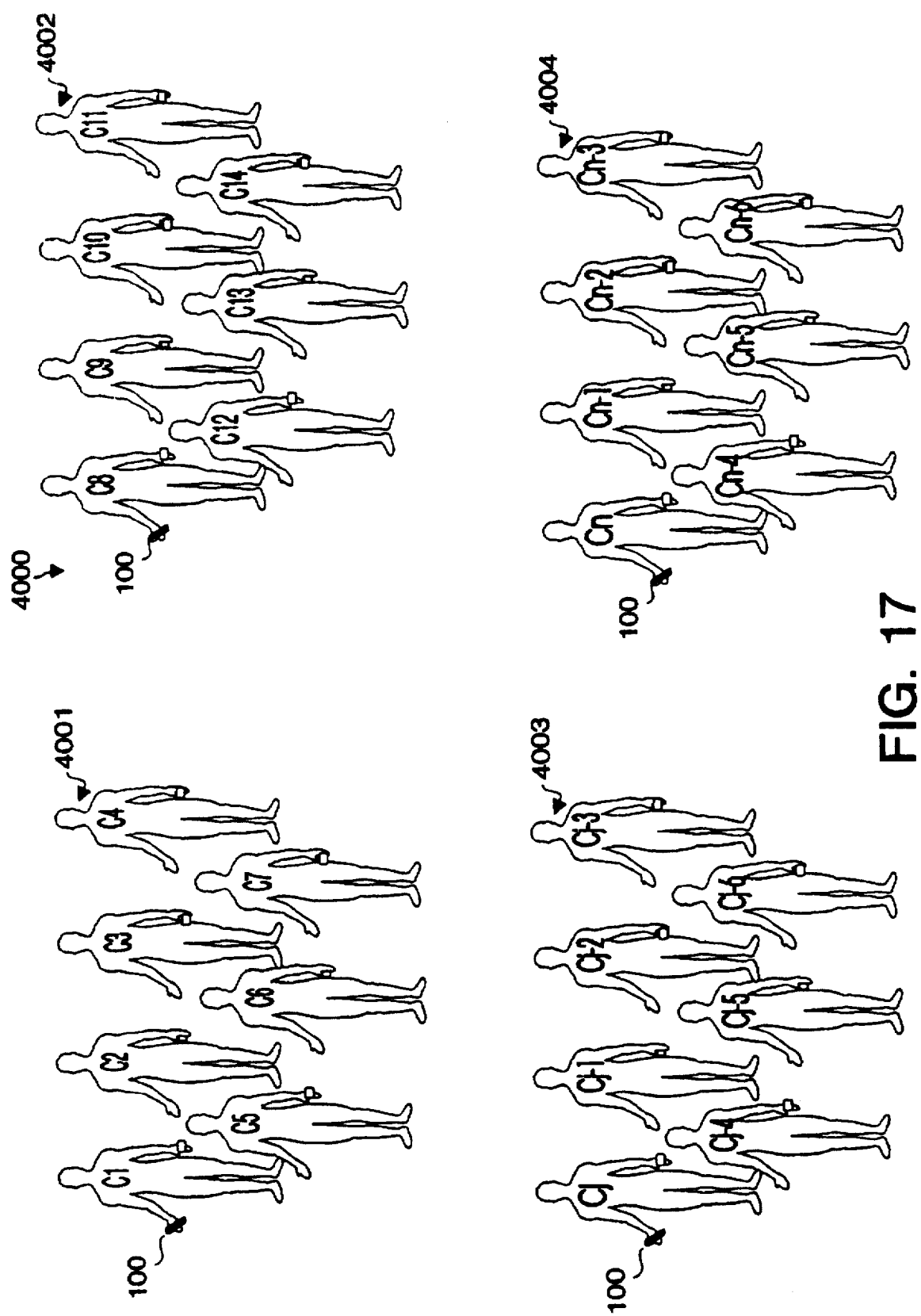
FIG. 17 is a diagram of groups and sub-groups of contributor or gift givers as used in the present invention.

FIG. 17 illustrates a group, crowd, throng, assemblage 4000 of prospective contributor or gift givers.

Figures 17B, 17C, 17D:
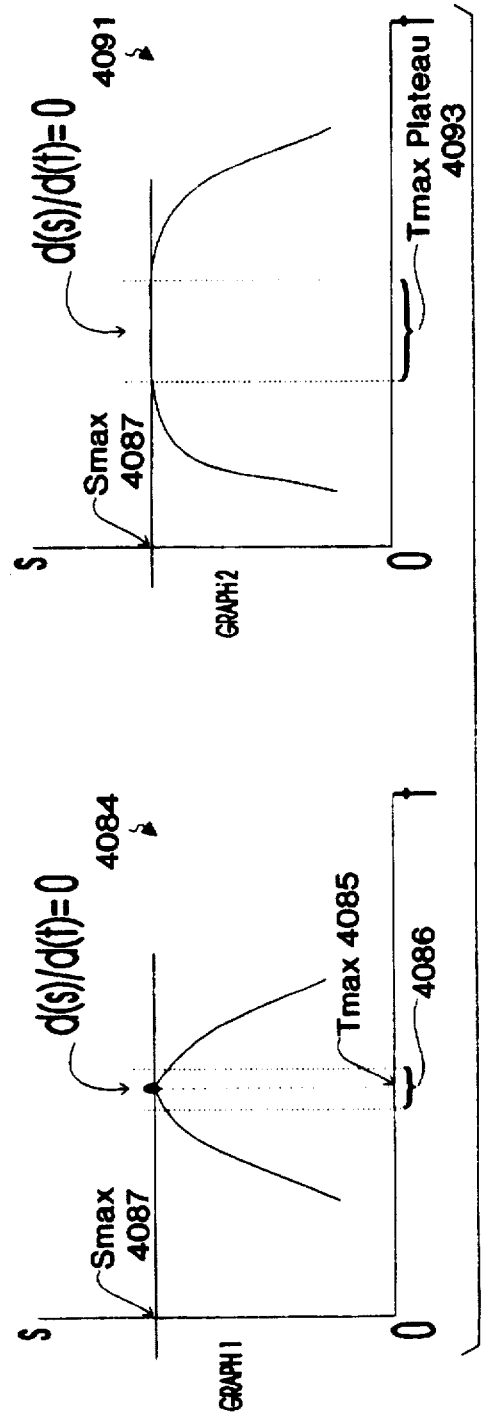
FIG. 17b is a diagram of a formula applied in the utilization of methods of the present invention.
FIG. 17c is a diagram of formulas applied in utilization of methods of the present invention.
FIG. 17d is a diagram of a function of stimulus versus time utilized in the methods of the present invention.

A group 4000 of people gathered has a intrinsic contribution or gift potential denoted by the function "C(p)" (FIGS. 17a, and 17b). The contribution or gift potential of a group is latent, intrinsic, inactive until a stimulus is provided to as to induce the making of a contribution of gift. Stimuli are provided by terminal 100 or peripheral 100, and by other means described herein. Typical groups include contributors or gift givers gathered at religious services, social gatherings, political fund-raising events, rallies, conferences, conventions, movies, birthday parties, parties in general, protest marches, parades, sporting events, offices, dinners, weddings, and the like. A contribution or gift session includes an amount of time allocated for the gathering of contributions and gifts with a group 4000 of prospective contributor or gift givers. C(p) denotes a function that includes the contributions or gifts that can theoretically be gathered from a group, crowd, throng 4000 of prospective contributors or gift givers, e.g. a first prospective contributor or gift giver, "contributor or gift giver$_1$" to an nth prospective contributor or gift giver, "contributor or gift giver$_n$."

Figure 17E:
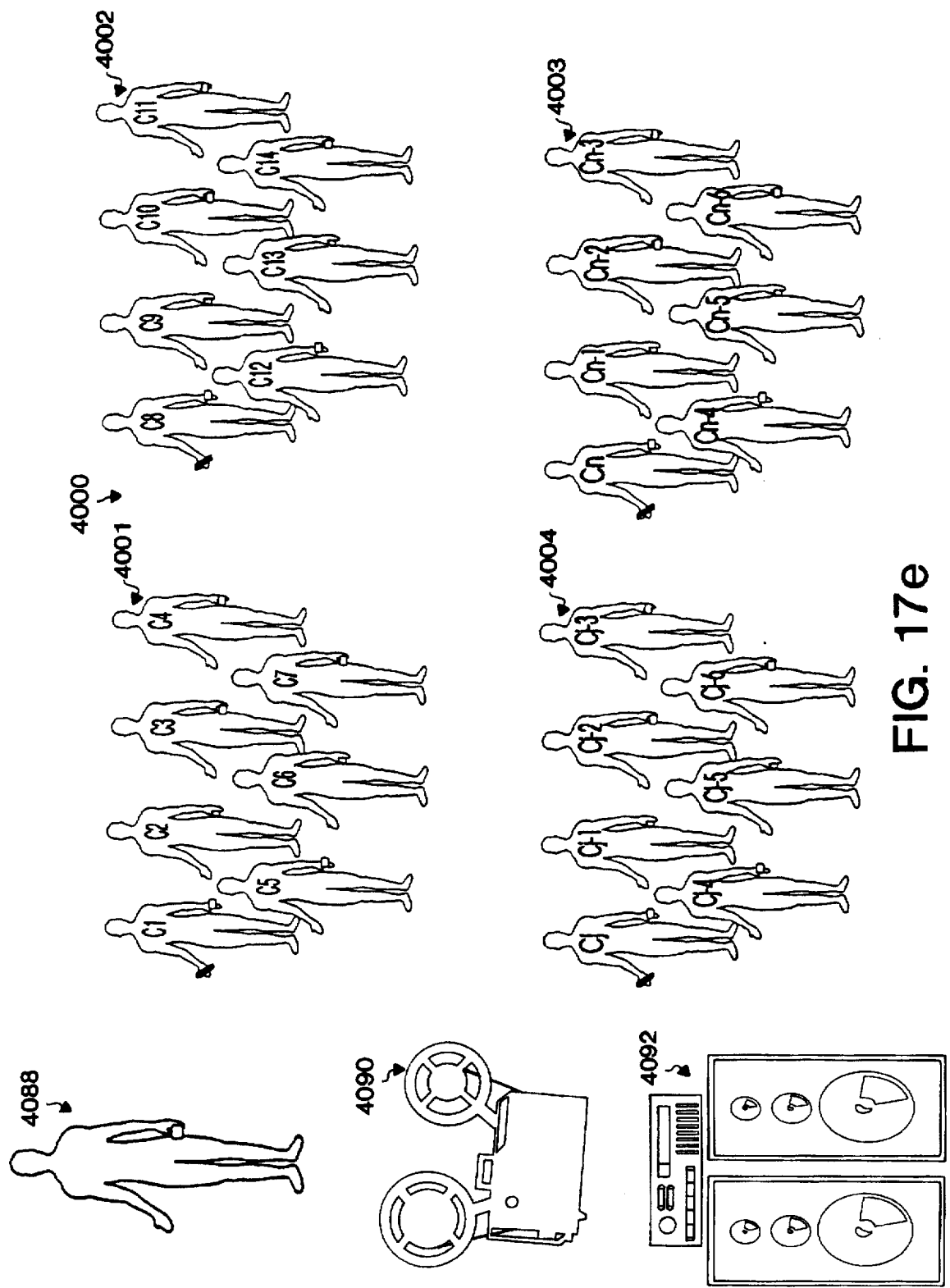
FIG. 17e is an illustration of different stimuli applied in the methods of the present invention and a diagram of groups and sub-groups of contributor or gift givers or gift givers.

The group 4000 of prospective contributors or gift givers consists of a first contributor or gift giver, "contributor or gift giver$_1$" to an nth contributor or gift giver, "contributor or gift giver$_n$." Group 4000 comprises sub-groups of contributors or gift givers, e.g. sub-groups 4001, 4002, 4003, and 4004 (FIGS. 17, 17e). Sub-group 4001 comprises "contributor or gift giver$_1$" through contributor or gift giver$_7$. Sub-group 4002 comprises "contributor or gift giver$_8$" through contributor or gift giver$_{14}$. Sub-group 4003 comprises "contributor or gift giver$_j$" through contributor or gift giver$_{j-6}$ where j is an integer and (21<j<(n-6)). Sub-group 4004 comprises "contributor or gift giver$_n$" through contributor or gift giver$_{n-7}$ where n is an integer. Generally, "n" is an integer with a large absolute value. Even though sub-groups 4001, 4002, 4003, and 4004 consist of seven contributors or gift givers it is understood that these sub-groups can consist of any number of contributors or gift givers, e.g. ten contributors or gift givers, twenty contributors or gift givers, fifty contributors or gift givers, including a multiplicity of contributors or gift givers, and that the number of contributors or gift givers in each sub-group need not be equal, e.g. sub-group 4001 may comprises fifty contributors or gift givers, and sub-group 4002 may comprise one-hundred contributors or gift givers. Moreover, it will be understood that there may be a multiplicity of sub-groups within group 4000, e.g. 100 sub-groups of fifty contributors or gift givers per sub-group.

A method of streamlining, simplifying and/or inducing the giving of monetary contributions or monetary gifts by the group, crowd, throng 4000 of prospective contributors or gift givers, entering, receiving and optionally immediately recording thereof upon receipt, is illustrated in FIG. 17e. The method comprises the steps of providing a stimulus evoking an impulse to make a contribution or gift commitment. The stimulus is selected from the group consisting of an audio stimulus 4092, a video stimulus 4090, and an audio/visual stimulus, e.g. a combination of 4092 and 4090, or a speaker 4088. Audio stimulus 4092 is also optionally provided by playing sound recordings on a tape deck, Cd-Rom player, record player, radio receiver, and the like. Video stimulus 4090 is presented by way of movie projector, laser disc players, television monitors, and the like.

The method further comprises the step of dispersing, advancing, interspersing, spreading, or combination thereof, through a crowd of prospective contributors or gift givers 4000 a plurality of electronic contributions or gifts management terminals or peripherals 100 for entry of (with immediate recordation at a remote terminal 120 or peripheral 120) and/or optionally immediately making of record information of successive or consecutive monetary contributions or gifts. It is appreciated that dispersing, advancing, interspersing and/or spreading terminals 100 or peripherals 100 are terminals or peripherals with keys as described herein, keyless terminals or peripherals as described herein (with or without optional key(s) for ratification of the entry of a contribution), or combination dual mode terminals and peripherals that accept variable contributions or gifts and fixed contributions or gifts as described herein. Preferably, the terminals or peripherals are self-powered and off-line.

The method illustrated is used in gatherings or assemblages of group 4000 in which the monetary contribution or gift is selected from the group consisting of a political contribution, a charitable contribution, and a religious contribution. It is further understood that where gifts are made rather than contributions of the type referenced above, the monetary gift is selected from the group consisting of a wedding gift, a funeral gift, a christening gift, a birthday gift, an anniversary gift, a graduation gift, a mother's day gift, a father's day gift, a baby shower gift, a first holy communion gift, and a baptism gift. Basically, monetary gifts are included that are given for social events, civic events and religious events.

By way of example, a crowd or group 4000 is gathered at a wedding. Terminals 100, peripherals 100, or a combination thereof, are provided to the gift givers in sub-groups 4001–4004. A plurality of the terminals 100 or peripherals 100 are dispersed, advanced, or interspersed through the sub-groups 4001–4004. Successive or consecutive gift givers, e.g. $C_1$ through $C_{n-6}$ in each sub-group have entered and/or optionally immediately recorded data selected from the group consisting of data comprised and/or consisting essentially of indicia from respective card record mediums, data comprised of respective card record mediums automatically correlated with a fixed gift numerical amount, data comprised of card record mediums automatically correlated with variable numerical gift amounts, or a combination thereof, on terminals or peripherals 100. It is appreciated that the dispersed or advanced terminals 100 or peripherals 100 are terminals or peripherals with keys as described herein, keyless terminals or peripherals as described herein (optionally with a single key for ratification of the contribution or gift), or combination terminals and peripherals that accept variable gift or contribution amounts and fixed gift or contributions amounts as described herein.

It is appreciated that the speed within which gifts are immediately recorded on terminals or peripherals 100 is greatly increased by the dispersion of advancement of a plurality of terminals 100 or peripherals 100 among the gift givers in group 4000. Not only is the speed increased, but the throughput of gifts made on each respective terminal or peripheral is greatly enhanced by the dispersion or advancement of the terminals or peripherals 100 among the gift givers. This in turn greatly decreases the time required for a gift giving session, and allows the other rites associated with the wedding ceremony, or other social event, to take place. Hence, it is possible to conclude a contribution session in a relatively short period of time.

It is further appreciated that the method and devices described herein have genera/applicability in soda/events in which groups, crowds or throngs of contributors or gift givers are assembled and gifts or contributions made. For example, in the methods described herein the monetary gift is selected from the group consisting of a wedding gift, a funeral gift, a christening gift, a birthday gift, an anniversary gift, a graduation gift, a mother's day gift, a father's day gift, a baby shower gift, a first holy communion gift, and a baptism gift.

It is further understood that where the monetary gift is selected from the group consisting of wedding gifts, birthday party gifts, christening gifts, graduation gifts, anniversary gifts, religious rite gifts, mother's day gifts, and father's day gifts, the gifts are made on the terminal 100 or peripheral 100 unimpeded by verification of authorization of each individual gift or a plurality of successive gifts made on terminal 100 of peripheral 100. Not having the gifts or contributions impeded by verification of authorization is facilitated since a gift or contribution is a one way giving. The throughput of gifts made on the terminal or peripheral is greatly enhanced, thereby allowing for the other rites associated with the social event to be observed. It is further appreciated that the inconvenience of a gift giver in searching for an appropriate gift is greatly minimized utilizing the methods and devices disclosed herein. Moreover, the gift giver and gift recipient is provided with a method and device that permits the gift giver's immediate desire to make his gift preference while the impulse to make the largest gift is still maximized, e.g. closest in time and space to the event or psychological impetus and prior to the dissipation of contribution or gift giving potential.

The methods described herein further optionally involve providing the terminal or peripheral 100 prior to the dissipation of the gift giving potential of the gift givers in group, crowd or throng 4000. The gift giving potential of the gift giving members in group 4000 is a function of time. Utilization of the method steps and mode of operation of the electronic contributions or gifts management devices described herein allows for the gift giving potential of the group 4000 to be maximized. By way of example, the gift givers of group 4000 are brought closer in space and time to the point of the maximum impulse or impetus to make a gift. This proximity in space and time to the impulse to make a gift results in larger gifts being made and also in a larger number of gifts being made than would otherwise be made by conventional methods.

Further, the risk of loss of gift or contribution data is minimized where the method further comprises the step of immediately communicating the contribution or gift data from terminal 100 or peripheral 100 to another terminal 120 or peripheral 120 for temporary storage thereof. For example, in this variant the method and the mode of operation of the terminal 100 or peripheral 100 is as follows:

A first contributor or gift giver α enters his respective card record medium information on terminal 100 or peripheral 100. Reader 307 reads first contributor or gift giver α respective card record medium α' information. Terminal 100 or peripheral 100 by way of communication circuitry immediately communicates respective card record medium α' information to remote terminal 120 or peripheral 120. Preferably, the communication is accomplished by a wireless communication link. Terminal 120 or peripheral 120 immediately records card record medium α' information thereon. Terminal 120 or peripheral 120 immediately correlates a fixed contribution or gift numerical amount to card record medium α' information thereon. In a variant, first contributor or gift giver α enters his respective variable contribution or gift numerical amount α" on terminal 100 or peripheral 100. Terminal 100 or peripheral 100 immediately communicates variable contribution or gift numerical amount α" to terminal 120 or peripheral 120. Terminal 120 or peripheral 120 by way of routines thereon immediately correlates a variable contribution or gift numerical amount α" to card record medium α' information.

A consecutive contributor or gift giver β enters his respective card record medium information on terminal 100 or peripheral 100. Reader 307 reads first contributor or gift giver α respective card record medium β' information. Terminal 100 or peripheral 100 by way of communication circuitry immediately communicates respective card record medium α' information to remote terminal 120 or peripheral 120. Preferably, the communication is accomplished by a wireless communication link. Terminal 120 or peripheral 120 immediately records card record medium β' information thereon. Terminal 120 or peripheral 120 immediately correlates a fixed contribution or gift numerical amount to card record medium β' information thereon. In a variant, second consecutive contributor or gift giver β enters his respective variable contribution or gift numerical amount β" on terminal 100 or peripheral 100. Terminal 100 or peripheral 100 immediately communicates variable contribution or gift numerical amount β" to terminal 120 or peripheral 120. Terminal 120 or peripheral 120 by way of routines thereon immediately correlates a variable contribution or gift numerical amount β" to card record medium β" information.

The same method and mode of operation is applied to consecutive contributors or gift givers $\zeta, \eta, \theta, \ldots I, K, \lambda, \mu, \nu, \ldots \xi, O, \pi, \rho, \sigma, \varsigma, T, U, \phi, X, \psi$, and $\ldots \omega$ for their respective contributions or gifts, or respective card information and numerical amounts.

It is appreciated that a multiplicity of the respective contributions or gifts both for a single contributor or gift giver and or a plurality of contributors' or gift givers' are processed in rapid succession with a minimization in time, a maximization of speed and throughput.

In mathematical terms as illustrated in FIG. 17a, C(p) is proportional to $I_i$ 4062, C(p) is proportional to $M_i$ 4064, C(p) is proportional to $P_i$ 4066, C(p) is proportional to $G_i$ 4068, C(p) is proportional to $_i$ C 4070, C(p) is proportional $_i$ to N 4072, C(p) is proportional to $X_i$ 4074, and C(p) is proportional to $A_i$ 4076. As is understood, $C(p)=(k_1)(I_i)$, $C(p)=(k_2)(M_i)$, $C(p)=(k_3)(P_i)$, $C(p)=(k_4)(G_i)$, $C(p)=(k_5)(C_i)$, $C(p)=(k_6)(N_i)$, $C(p)=(k_7)(X_i)$, and $C(p)=(k_8)(A_i)$. In these examples, $1<I<n$.

As illustrated in FIG. 17b, C(p) is also proportional to the sum from I=1 to I=n of the product of the function $[I_i*M_i*P_i*G_i*C_i*N_i*X_i*A_i]$ 4078. As is understood, $C(p)=$ the sum from I=1 to I=n of the product of the function $(k_9)$ $([I_i*M_i*P_i*G_i*C_i*N_i*X_i*A_i])$.

As is understood, the contribution or gift potential, C(p), of a group 4000 (FIG. 17 and 17e) of contributors or gift givers or a sub-group of contributors or gift givers, e.g. sub-groups 4001, 4002, 4003, and 4004 (FIG. 17 and 17e) is a function of a variety of different variables. The variable $I_i$ for a respective contributor or gift giver is a function of the importance a cause or objective has to a specific contributor or gift giver. By way of example, an "I"th contributor or gift giver may place a high level of importance or utility to contributions and gifts that are made to allow an individual to obtain an organ transplant, and a lower level of importance or utility on contributions and gifts made to an organization that has as its goal the creation of a habitat to save an endangered species. It will be understood that a method of the present invention for maximizing the C(p) of a contributor or gift giver, e.g. $C_i$; sub-groups 4001–4004 of contributor or gift givers or gift givers; or a group 4000 of contributor or gift givers or gift givers involves analyzing I for the respective unit by calculating the historical affinity of the unit for the cause being contributed to. This calculation is accomplished by utilizing known statistical techniques, and may be calculated from data collected on electronic contributions or gifts management terminal 100 or peripheral 100.

The variable $M_i$ is a function of the ease of making a contribution or gift at the time and place where the contribution or gift is solicited. $M_i$ is a function of, and is proportional to, the speed with which a contribution or gift or session can be consummated in the field denoted by $S_i$, and a convenience variable denoted by $Q_i$. $M_i$ can be increased in size by providing group 4000 or sub-groups 4001, 4002, 4003, 4004 of contributor or gift givers or gift givers a electronic contributions or gifts management terminal 100 or peripheral 100 or a plurality of terminals 100, and utilization of the methods herein. A plurality of terminals 100 or peripherals 100 are circulated, advanced, dispersed or interspersed among the crowd or throng of contributors or gift givers. The terminals 100 or peripherals 100 operate as disclosed above and are unimpeded by requests for authorization between sequential contribution or gifts. In one variant, a contributor or gift giver $C_{j-1}$ engages in a two step contribution or gift entry process that consists of entering his card information, and entering his contribution or gift numerical amount information. Optionally, a contributor or gift giver $C_{j-1}$ confirms his contribution or gift amount information. In a variant, $C_{j-1}$ engages in a one step contribution or gift process in the field whereby the contributor or gift giver simply enters his card information, e.g. slides his information bearing credit or debit card or enters Ms or her respective smart card thereon, through a slot or a port on electronic contributions or gifts management terminal 100 or peripheral 100. The card information for a respective contributor or gift giver is associated with a pre-programmed contribution or gift amount. As an example, the respective contributor's or gift giver's card information is associated at electronic contributions or gifts management terminal 100 or peripheral 100, terminal 120, a card account processor 1031, or a combination thereof. It will be understood that the use or this feature will allow a streamlining of the contribution or gift giving process and that the speed of the consummation of a contribution or gift in the field to be greatly accelerated. In a variant, electronic contributions or gifts management terminal 100 or peripheral 100 does not present to the prospective contributors or gift givers in the group a display or a keyboard or other forms of manually entry and presentation of the contribution or gift amount. Rather electronic contributions or gifts management terminal 100 or peripheral 100 has thereon a card reader. This version of electronic contributions or gifts management terminal 100 or peripheral 100 is optionally supplemented with indicia identifying the fund-raiser to which the contribution or gift is being made, indicia identifying the preferred orientation of a card that is to pass through the card reader, a means for visually, e.g. a flashing light, or an audio means for indicating the successful entry of card information on electronic contributions or gifts management terminal 100 or peripheral 100. For example, after each respective contributor or gift giver enters his or her card information on electronic contributions or gifts management terminal 100 or peripheral 100. Circuitry in combination with a speaker projects a message "Thank you for your contribution or gift of $25," "Your contribution or gift has allowed us to feed fifteen hungry children in Africa," etc. It is appreciated that these prompts provide an impetus for making contributions or gifts.

Immediately thereafter, the electronic contributions or gifts management terminal 100 or peripheral 100 is presented to a subsequent contributor or gift giver $C_i$ for entry of like information.

By way of further example, a first electronic contributions or gifts management terminal 100 or peripheral 100 is circulated, advanced, or dispersed among the contributors or gift givers 1 through 7 in sub-group 4001. The first electronic contributions or gifts management terminal 100 or peripheral 100 is then circulated, advanced, or dispersed among the contributors or gift givers 8 through 14 in sub-group 4002, and then circulated, advanced, or circulated among the contributors or gift givers j-6 through j, and n-6 through n in sub-groups 4003, 4004, respectively. It is understood that not imposing a request for authorization (unimpeding the process) between sequential contributions or gifts accelerates the time within which the first electronic contributions or gifts management terminal 100 or peripheral 100 reaches contributor or gift givers or gift givers further down stream, e.g. contributor or gift giver j-6 through contributor or gift giver j. This allows the down stream contributors or gift givers to make contributions or gifts closer to the point in time of maximum stimulus for evoking an impulse to make a contribution or gift, $t_{max}$ 4085 (FIG. 17d), and thereby enhances the amount of individual contributions and gifts by these down stream contributors or gift givers, and also the number of contributions and gifts made by these down stream contributors or gift givers since their incitement to action or impetus has not had a chance to dissipate.

In a variant, a first electronic contributions or gifts management terminal 100 or peripheral 100 is circulated, advanced or dispersed among the contributors or gift givers 1 through 7 in sub-group 4001, a second electronic contributions or gifts management terminal 100 or peripheral 100 is circulated, advanced, or dispersed among the contributors or gift givers 8 through 14 in sub-group 4002, a third electronic contributions or gifts management terminal 100 or peripheral 100 is circulated, dispersed or advanced among the contributors or gift givers j-6 through j in sub-group 4003, and a fourth electronic contributions or gifts management terminal 100 or peripheral 100 is circulated, advanced or dispersed among the contributors or gift givers n-6 through n in sub-group 4004. It will be understood that this method will allow contributors or gift givers in the various sub-groups to make contributions or gifts closer to the point in time of maximum stimulus for evoking a stimulus for making a contribution or gift, $t_{max}$ 4085. That is, the presentation of a plurality of terminals and the advancing or dispersing thereof in a crowd will allow contributor or gift giver 1 to make his contribution or gift transaction at about the same delta t from the point of maximum stimulus, $t_{max}$ 4085 (FIG. 17d), as contributor or gift giver 8 in sub-group 4002, as contributor or gift giver j in sub-group 4004, and as contributor or gift giver n in sub-group 4003. The individual amounts of contribution or gifts and gifts made by these contributors or gift givers is enhanced since their incitement to action or impetus has not had a chance to dissipate. It is understood that this method streamlines the process and accelerates the time within which the terminals 100 or peripherals 100 reach individual contributors or gift givers within sub-groups 4001–4004 thereby allowing contributions or gifts to be made prior to any significant dissipation of stimulus, motivation to action, or incitement to action.

Due to the increase of the availability and ease of use of debit card terminals ("cash station" machines) and the increase in the availability and acceptance of credit cards over time, contributor or gift givers or gift givers in group 4000 are less likely to have with them cash or a check book on hand. Concurrent, with this trend is the increased likelihood that a contributor or gift giver in group 4000 will carry a credit card and/or a debit card (a single card or a plurality of cards) on his or her person. The provision of electronic contributions or gifts management terminal 100 or peripheral 100 or a plurality of terminals 100 to the contributor or gift givers or gift givers in group 4000 increases the convenience variable $Q_i$, and also $S_i$ since the contributors or gift givers need not waste time searching for a preferred amount of a cash contribution or gift or a check book on their person or waste time filling out a check, in their wallets, or in their purse at the point a contribution or gift is solicited. Searching for cash and filling out a check to make a contribution or gift at the point a contribution or gift is solicited is an event decreases convenience and also $M_i$. Rather, the contributors or gift givers in group 4000 take their bank cards and simply swipe them across the card readers 307 on the terminals 100 or peripherals 100 or enter their respective smart card information thereon. Consequently, the convenience variable is increased, $Q_i$. Since the convenience variable, $Q_i$, is proportional to $M_i$, $M_i$ is increased. Moreover, going over to a cash station machine, or over to a stationary terminal or peripheral at a table increases the inconvenience associated with making a contribution or gift, e.g. waiting in line and/or searching for the location of the terminal, thereby decreasing the value of $Q_i$, and $M_i$. Circulating, dispersing, and/or advancing the portable hand-held, terminals 100 or peripherals 100 directly to contributors or gift givers so that they may personally enter their contribution or gift information in group 4000, or the respective sub-groups 4001, 4002, 4003, and 4004 increases the value of $Q_i$, and $M_i$ by making the contribution or gift more convenient for the contributors or gift givers within the group or sub-groups. The ability to personally enter a contribution or gift where the contributor or gift giver need not give his information bearing card to an intermediary to enter card information as with known card terminal increases $Q_i$, $S_i$, and consequently $M_i$.

$M_i$ is a function of the speed with which a contribution or gift may be consummated. The shorter the length of time within which it takes to consummate a contribution or gift by a respective contributor or gift giver within group 4000 or sub-groups 4001, 4002, 4003, 4004, with electronic contributions or gifts management terminal 100 or peripheral 100, the larger the $M_i$ variable. Hence, $M_i$ is inversely proportional to the speed within which a contribution or gift can be consummated at the time it is solicited. As is understood C(p) will be increased for group 4000, or the respective sub-groups 4001–4004 if the amount of time that it takes for the respective contributors or gift givers in the group 4000 to consummate their respective contributions or gifts in the field can be decreased.

Moreover it is understood that not impeding or interposing a request for authorization in the field where electronic contributions or gifts management terminal 100 or peripheral 100s are used (e.g. decoupling the request for authorization from each respective contribution or gift in the field where the contributions or gifts are entered onto electronic contributions or gifts management terminal 100 or peripheral 100) allows a larger number of prospective contributors or gift givers to be presented with terminal(s) 100 within a fixed, relatively short amount of time.

By way of example, the length of time it takes for contributors or gift givers in group 4000 to make their respective contributions or gifts is decreased if there is no request for authorization interrupting sequentially made contributions or gifts. Preferably, there is no request for authorization interrupting or impeding sequentially made contributions or gifts at the time and location where the sequential contributions or gifts are being entered by respective consecutive contributors or gift givers or gift givers, e.g in the field during a contribution or gift session.

By way of further example, assume a request for authorization and answer to the request takes 15 seconds for each sequential contribution or gift entered, and assume that the sub-group of prospective contributors or gift givers consists of 100 prospective contributors or gift givers and that each respective contributor or gift giver will make a contribution or gift on electronic contributions or gifts management terminal 100 or peripheral 100. Interposing a request for an authorization and obtaining an answer lengthens the time needed to enter and process contributions or gifts in the field from the sub-group of 100 an additional 1500 seconds, or 25 minutes of additional time. Adding the 1500 seconds of additional time to enter and process the contributions or gifts in the field would make the length of time the contribution or gift session would last unworkable. In a church the average amount of time allocate for the gathering of contributions and gifts is one to five minutes depending on the size of the congregation (of course, it is a longer period of time the larger the congregation).

Assuming that the sub-group of prospective contributors or gift givers consists of 1000 prospective contributors or gift givers and that each respective contributor or gift giver will make a contribution or gift on electronic contributions or gifts management terminal 100 or peripheral 100. Interposing an authorization or verification of authorization, and impeding the contribution or gift giving process, and the mode of operation of the terminal and peripheral, and obtaining an answer lengthens the time needed to enter and process contributions or gifts in the field from the sub-group of 1000 an additional 15,000 seconds, or 250 minutes of additional time. Adding the 15,000 seconds of additional time to enter and process the contributions or gifts in the field would make the length of time the contribution or gifts session would need to last to allow for entry of all contributions or gifts unfathomable and unworkable.

As the terminal 100 or peripheral 100 is passed or advanced from the contributor or gift giver$_{j-1}$ to the contributor or gift giver$_j$, the contributor or gift giver$_j$ does not wait for a request for authorization to be transmitted from electronic contributions or gifts management terminal 100 or peripheral 100 and answered in the field for the contributor's or gift giver$_{j-1}$ contribution or gift before the contributor or gift giver$_j$ enters his contribution or gift on the electronic contributions or gifts management terminal 100 or peripheral 100. Therefore, the speed of the consummation of the contribution or gift made in the field made by contributor or gift giver$_j$ is greatly accelerated, and streamlined, and the speed of the consummation of the sequentially or consecutively made contributions or gins on a first electronic contributions or gifts management terminal 100 or peripheral 100 made by the plurality of sequential contributors or gift givers is greatly accelerated. Consummation of the plurality of contributions or gifts utilizing a plurality of terminals 100 within group 4000 more greatly reduces the time to consummate the entire group's contributions or gifts which are made at a contribution or gift session. As is understood, these factors greatly decrease the time period required to conduct a contribution or gift session, and increase the contribution or gift potential of the group 4000. Further, these features allow for a contribution session to be conducted with terminals 100 or peripherals 100 within the time constraints of standard contribution or gift giving sessions.

Moreover, the streamlining of a contribution or gift session is greatly accelerated through the provision of and use by a contributor or gift giver of a recommended contribution or gift amount key on electronic contributions or gifts management terminal 100 or peripheral 100, e.g. a key with a recommended contribution or gift amount, e.g. $50.00 and $100.00. The recommended contribution or gift amount is of an order that induces the making of the monetary contribution or gift. Preferably, the user interface of electronic contributions or gifts management terminal 100 or peripheral 100 consists solely of keys representing recommended contributions and gifts numerical amounts of an order that induces the making of monetary contributions or gifts. It is understood that the time a single contribution or gift is consummated in the field is greatly reduced if a contributor or gift giver need not press several keys sequentially to enter a contribution or gift amount onto electronic contributions or gifts management terminal 100 or peripheral 100, e.g. if the contributor or gift giver need not press a "1," "0," "0," and "0" to enter a contribution or gift amount of ten dollars. Rather the contributor or gift giver presses a single key representative of a ten dollar contribution or gift. It is further understood that the time savings of a multiplicity of sequential contributors or gift givers utilizing this feature will greatly shorten the amount of time needed to complete a contribution or gift session in the field.

The speed of a contribution or gift session is also greatly accelerated (the time of the session is greatly decreased) by a pre-authorization step or pre-authorization mode of operation. A pre-authorization step or mode of operation comprises the designation of a monetary contribution or gift commitment numerical contribution or gift amount prior to the presentation of electronic contributions or gifts management terminal 100 or peripheral 100 or a plurality of terminals 100 to group 4000. By way of example, electronic contributions or gifts management terminal 100 or peripheral 100, terminal 120, or a combination thereof, is pre-programmed to automatically correlate a recommended contribution or gift amount, e.g. $25.00, once a respective contributor or gift giver enters his card information on electronic contributions or gifts management terminal 100 or peripheral 100, e.g. slides his respective information bearing card through reader 307 on electronic contributions or gifts management terminal 100 or peripheral 100. The pre-authorization is made by an individual respective contributor or gift giver prior to the solicitation of the contribution or gift in one variant.

In another variant, it will be understood that a fund-raiser or gift recipient pre-programs terminals 100 or peripherals 100 to automatically correlate a first recommended default contribution or gift numerical amount with a standard information bearing card, e.g. a Citibank Classic credit card, and/or a higher recommended default contribution or gift amount with a premium credit card, e.g. a VISA™ gold card. By way of example, contributor or gift giver$_j$ enters his card information that is card indicia representative of a Citibank Classic credit card, e.g. on the magnetic strip of the contributor's or gift giver's card. Electronic contributions or gifts management terminal 100 or peripheral 100, terminal 120, card account processor 1031, or a combination thereof, automatically correlate a pre-programmed recommended contribution or gift numerical amount of $10.00 with the card information of contributor or gift giver$_j$.

Contributor or gift giver, s enters his card information that is card indicia representative of a premium card, e.g. VISA™ gold credit card. Electronic contributions or gifts management terminal 100 or peripheral 100, terminal 120, card account processor 1031, or a combination thereof, automatically correlate a pre-programmed recommended contribution or gift numerical amount that is higher, e.g. $25.00 with the card information of contributor or gift giver$_{j-5}$. As is understood a fund-raiser or gift recipient instructs group 4000 that presenting their respective standard cards and premium cards will result in the respective smaller and larger contribution or gift numerical amounts being correlated with the contributor or gift givers or gift givers' respective standard and premium cards, and that the correlated information will be later processed. In this variant, it will be further understood that keys and a display on electronic contributions or gifts management terminal 100 or peripheral 100 are optional.

As is described, in a variant below, electronic contributions or gifts management terminal 100 or peripheral 100 only has a shell dimensioned to fit into a palm or hand of a contributor or gift giver, its own source of power, means for storing sequentially or consecutively entered card information, means for associating sequentially entered card information with a pre-programmed contribution or gift amount, and means for off-loading off-line sequentially or consecutively entered card information correlated with the pre-programed contribution or gift numerical amount. Optionally, in this variant, electronic contributions or gifts management terminal 100 or peripheral 100 has an indicator, e.g. a visual indicator or an audio indicator to indicate that a respective contributors' or gift givers' card information was successfully entered thereon.

This pre-authorization feature may also be indicia representative of a preferred contribution or gift among for a respective contributor or gift giver disposed on a respective contributor's or gift giver's information bearing card 145, 150 that the card reader 307 automatically reads once a respective contributor's or gift giver's information bearing card is presented thereto, e.g. a magnetic code on a magnetic stripe card or data stored on a smart card. By way of further example, in the case of IC information bearing cards a contributor or gift giver may pre-program a preferred contribution or gift amount so that when his card is presented to a card reader on electronic contributions or gifts management terminal 100 or peripheral 100 for reading, the preferred contribution or gift amount is automatically read by the card reader 307, s correlated, and processed accordingly.

All of these factors streamline and reduce the length of time needed to make a contribution or gift at the point in time and space of the solicitation of the contribution or gift and the cumulative length of a contribution or gift session for the group. These practices increase $M_i$ which in turn increases the contribution or gift potential of a group resulting in larger overall contributions and gifts made by group 4000. Moreover, if the contributor or gift givers or gift givers in group 4000 are required to stand in a line at a remote terminal to make a contribution or gift, e.g. a terminal that is not circulated, advanced or dispersed among contributors or gift givers in group 4000, $M_i$ is decreased by increasing the level of anxiety associated with the making a contribution or gift.

The variable $P_i$ is a function of the ability of the fund-raiser or gift recipient to consummate a contribution or gift whether in the field during a contribution or gift session or at some time thereafter. In the scenario where cash is used as a contribution or gift, $P_i$ is 1 since 100% of the contributions or gifts are consummated at the time and location where the contribution or gift is solicited. That is, the fund-raiser or recipient has cash in hand. In the scenario where pledges are used to coiled contribution or gifts, the $M_i$ may be very high since it is very easy to pledge a contribution or gift amount, but $P_i$ is substantially less than 1 since the collection step consummating the contribution or gift is far removed from the point in time and space from the application of external stimulus s (FIG. 17d) evoking an impulse to make a contribution or gift. Moreover, with known methods a large percentage of the contributions and gifts that are pledged does not result in a consummation of the contribution or gift since the financial situation of the contributor or gift giver changes, the contributor or gift giver forgets about the pledge altogether, or the impulse or impetus that prompted the contributor or gift giver to make the pledge dissipates and the contributor or gift giver no longer has a psychological motivation to consummate the contribution or gift. Electronic contributions or gifts management terminal 100 or peripheral 100 is used consummate the contribution or gift at the point of maximum stimulus (FIG. 17d) evoking an impulse or impetus to make a contribution or gift. Electronic contributions or gifts management terminal 100 or peripheral 100's use to solicit contributions and gifts brings the value of $P_i$ very close to 1 since most of the contributions and gifts made are immediately recorded, and will be successfully processed after the contribution or gift session with respective credits and debits being entered on the appropriate accounts of contributors or gift givers and recipient organizations.

Moreover, the use of a plurality of terminals 100 or peripherals 100 allows the impulse and the incitement to action arising by the state of mind of the contributor or gift giver, or the collective state of mind of sub-groups 4001–4004 or group 4000, to be harnessed at the time the impulse or incitement to action is at its maximum level. It will be understood that the impulse or impetus to make a contribution or gift dissipates over time. Contributions management terminals 100 or peripherals 100 are advanced among a crowd or throng of prospective contributors or gift givers prior to the dissipation of the contribution or gift giving potential of the throng or group in a variant of the method of the invention.

The contribution or gift potential function, C(p), is also proportional to and a function of an impulse giving function denoted by X. The impulse giving function measures the level of incitement to action to make a contribution or gift that arises from the creation of a state of mind by providing an external stimulus to a contributor or gift giver or a group of contributors or gift givers. A state of mind is created by the presentation of an external stimulus or stimuli to an individual prospective contributor or gift giver, or in a variant, to a group or crowd of prospective contributors or gift givers.

As illustrated in FIG. 17c, the impulse giving function, X(s) is proportional to a I stimulus variable, "s" 4080. X(s) is also proportional to time variable, "t" 4082.

As illustrated in FIG. 17d, graph 4084 has a point to that indicates the start of an event or the presentation of stimulus evoking an impulse to make a contribution or gift and the start of the presentation of stimulus so to a contributor or gift giver or to a group of contributors or gift givers. As t progresses forward (time goes forward), a stimulus or stimuli s is provided or presented to the group 4000 of contributors or gift givers as indicated by an increasing value of the variable s.

The stimulus (s) is any external stimulus or stimuli that creates a state of mind conducive to the making of contributions and gifts. By way of example, an external stimulus such as audio stimulus 4092 or a visual stimulus 4090 is presented to the group 4000. Audio stimulus 4092 includes sound recordings, optional live speeches by candidates, optional live presentations by missionaries, and the like, that evoke an emotion or impulse conducive of contribution or gift making, e.g. sympathy, anger, love, hate, a need for victory. Multi-media presentations evoking an emotion or impulse to make a contribution or gift by way of a computer network with a plurality of displays are also contemplated herein.

Video stimulus 4090 includes optional audio/visual presentations and "live" presentations of scenes or people such as poverty stricken individuals in need of resources, individuals in need of nutrition, individuals in need of medical care or having a medical condition, and the like. The methods of the invention teach that presentation of strong external stimuli increases the value of the impulse giving function and thus increases the overall value of the contribution or gift potential of the group or individual. The present invention also teaches that the stimulus should be increased and/or maintained at a plateau during the provision or presentation of terminals 100 of peripherals 100. By way of example, instrumentalities for the presentation of stimulus evoking an impulse to make a contribution or gift include, tape recordings, video players, laser disc players, movie projectors, tape players, movie projectors, cable television networks, television sets, projection televisions and the like.

The impulse giving function X will reach a maximum value where $d(s)/d(t)=0$ during the event or during the solicitation of a contribution or gift from an individual contributor or gift giver and then decay time (FIG. 17e). Hence, the more remote in time we get from the maximum value of the external stimulus at $t_{max}$ 4085, the lower the value of the impulse giving function becomes, and the lower the contribution or gift potential and the impulse to contribute. The impulse giving potential of a group (and the contribution or gift potential which is a function of the impulse giving potential of members of a group) decays and dissipates over time as we move further away from $t_{max}$. The present invention teaches that where $d(s)/d(t)=0$ a plurality of terminals 100 should be presented to the individual contributor or gift giver$_i$, or group 4000 of contributors or gift givers to maximize the impulse giving potential of the prospective contributors or gift givers (and contribution or gift potential) of the group 4000. This is the point where the maximum impulse level to make a contribution or gift exists.

In a variant, if it is not logistically possible to present the plurality of terminals 100 or peripherals 100 to the group or crowd 4000 of prospective contributors or gift givers or a single electronic contributions or gifts management terminal 100 or peripheral 100 to the individual contributor or gift giver or group or crowd 4000 where $d(s)/d(t)=0$, then terminals 100 are presented at a time as close as possible to where $d(s)/d(t)=0$ indicated by range 4086 in order to maximize the impulse giving potential of the group and/or the individual and the amount and number of contributions and gifts obtainable from a group of contributors or gift givers at an event or from an individual. The present invention teaches the maintenance of the stimulus evoking an impulse to make a contribution or gift at an effective level over a period of time during the presentation of the terminals 100 or peripherals as in FIG. 4085. By way of example, the stimulus is initially presented and repeated until to conclusion of the presentation of the terminals 100 or peripherals to group 4000.

Access in time and space is provided by the electronic contributions or gifts management terminal 100 or peripheral 100 to capture the impulse evoked by the stimulus to make a contribution or gift, notwithstanding the amount of cash a contributor or gift giver has on hand or whether or not a contributor or gift giver has a check book on hand.

The lack of interposing or impeding a contribution session with, a request for authorization, and/or the lack of interposing a signature verification of authorization, between the making of sequential contributions or gifts made by respective contributors or gift givers allows for the presentation of terminals 100 or peripherals 100 to all members of a group at a delta t, e.g. range 4086, that is close to where $d(s)/d(t)=0$ at $t_{max}$ 4085 (Graph 4084) or at delta $t_{max\ plateau}$ (Graph 4085) as for the entire group of contributors or gift givers as well as each individual contributor or gift giver. Further, this mode of operation of the terminals 100 or peripherals 100 permits presentation of all contributors' or gift givers' respective information bearing cards to terminals 100 or peripherals 100 within the limited amount of time that is a contribution session.

The provision of a plurality of portable, hand held terminals 100 to the group or crowd of contributors or gift givers also allows for all members of a group to be presented terminals 100 at a delta t that is close to where $d(s)/d(t)=0$ (FIG. 17d) (Graph 4084) or at delta $t_{max\ plateau}$ (Graph 4085) as for the entire group of contributors or gift givers and also for each respective contributor or gift giver. Access in space to where $d(s)/d(t)=0$ as for the entire group of contributor or gift givers or gift givers and also for each respective contributor or gift giver is provided by the fact that electronic contributions or gifts management terminal 100 or peripheral 100 has its own power source and is passable and/or advanced from one contributor or gift giver to another. Interposition of a time period of waiting in line to make a contribution or gift, or wait for an authorization, removes "down stream" contributions or gifts further from $t_{max}$ and/or delta $t_{max\ plateau}$ and moves the impulse giving function away from its maximum condition where $d(s)/d(t)=0$. The present invention teaches that this is undesirable.

That is, electronic contributions or gifts management terminal 100 or peripheral 100 facilities impulse giving. Electronic contributions or gifts management terminal 100 or peripheral 100 allows a plurality of contributions or gifts to be recorded, for post-processing, at the time, $t_{max}$ or delta $t_{max\ plateau}$, the psychological stimulus, $s_{max}$ 4087, e.g. a rousing speech by a political candidate, government official, minister, fund-raiser, etc, evokes the highest impulse to make a contribution or gift. The variable $G_i$ is a function of the incentive a contributor or gift giver$_i$ has in making a contribution or gift within the context of the contributor's or gift giver's physical location in the vicinity of sub-group 4001-4004, or group 4000. The use of terminals 100 in a group setting, where a contributor or gift giver$_i$ is in the vicinity of other prospective contributor or gift givers or gift givers, or actual contributors or gift givers entering contributions or gifts, stimulates the making of contributions or gifts by contributor or gift giver$_i$ and other contributors or gift givers in the group 4000 and the associated respective sub-groups by evoking a impulse to make a contribution or gift. The stimulus provided through the use of terminals 100 or peripherals 100 includes both positive and negative stimuli.

By way of example, contributor or gift giver$_i$ may only have $20 in cash in his pocket, and a credit card. The stimulus provided to contributor or gift giver$_i$ evokes an impulse to make a contribution or gift of $100. Electronic contributions or gifts management terminal 100 or peripheral 100 allows for the impulse to make the contribution or gift of $100 by the contributor or gift giver to be harnessed in time and space prior to the dissipation of said impulse.

With respect to positive stimulus, in one scenario, assume contributor or gift giver$_1$ through contributor or gift giver$_6$ in sub-group 4001 enter their respective card contributions or gifts on electronic contributions or gifts management terminal 100 or peripheral 100 as electronic contributions or gifts management terminal 100 or peripheral 100 is circulated or advanced amongst them (FIG. 17). Contributor or gift giver$_7$ does not want to feel left out of the group or feel like an outcast so he to follows the lead of other members of the sub-group 4001 and enters a contribution or gift on electronic contributions or gifts management terminal 100 or peripheral 100. That is, contributor or gift giver$_7$ feels an external stimulus of "peer pressure" from other members of the sub-group 4001 to conform to the actions of other members of the sub-group 4001. Moreover, since contributor or gift giver$_1$ through contributor or gift giver$_6$ around contributor or gift giver$_7$ are making contributions and gifts via electronic contributions or gifts management terminal 100 or peripheral 100 then the contributor or gift giver is more psychologically inclined and therefore more likely to make a contribution or gift. Contributor or gift giver$_7$ is also compelled to enter a contribution or gift on electronic contributions or gifts management terminal 100 or peripheral 100 because of a psychological guilt factor the contributor or gift giver feels if others in the group are making contributions and gifts and he or she does not contribute. Hence, the use and circulation or advancement of electronic contributions or gifts management terminal 100 or peripheral 100 or terminals 100 in a sub-group or group context facilities the entering of contributions and gifts by harnessing external and/or internal psychological pain/pleasure factors at a point in time and space where such factors are of maximum benefit in the solicitation of contributions or gifts, thus inducing contributor or gift givers or gift givers to make contributions or gifts more readily in the sub-group 4001. Further, it is appreciated that prospective contributors or gift givers are affect by these stimuli from all sides, e.g. 360 degrees around the contributor or gift giver.

That is, as the electronic contributions or gifts management terminal 100 or peripheral 100 is being circulated, advanced, or dispersed a contributor or gift giver feels "peer-pressure" to make a contribution or gift. Providing, circulating, or dispersing among or amidst a group 4000 of contributors or gift givers terminals 100 and/or peripherals 100 will increase $G_i$ for a group of contributors or gift givers because an impulse for an individual contributor or gift giver to make a contribution or gift will be evoked at the location of the terminal or peripheral and stimulus in time and space to the other contributors or gift givers to make a contribution or gift through interaction with other contributors or gift givers in the group, and the psychological effect the contributors or gift givers' actions will have on each other.

The present invention further teaches that the making of contributions or gifts by a first sub-group 4001 of contributors or gift givers on terminals or peripherals 100, will induce the making of contributions and gifts by subsequent sub-groups 4002–4004. The sub-groups of contributors or gift givers engage in contribution or gift sessions in the vicinity in time and space of an initiating sub-group.

The variable $C_i$ is a function of and proportional to the ability to retire the monetary contribution or gift commitment over time. If contributors or gift givers within group 4000 have the ability to retire a monetary contribution or gift commitment over a period of time, then $C_i$ will increase in value and the contribution or gift potential of group 4000 will increase. The provision and/or advancement of electronic contributions or gifts management terminals 100 or peripherals 100 facilitates the ability to retire a monetary contribution or gift commitment over time and increases $C_i$.

By way of example, where a contributor or gift giver$_n$ has $20.00 in cash at the point where a contribution or gift is solicited, the contributor or gift giver only donates $20.00 in cash. Assuming that the contributor's or gift giver's contribution or gift preference is to contribute $50.00 if he could retire the monetary contribution or gift commitment over a period of time, provision of electronic contributions or gifts management terminal 100 or peripheral 100 at this point in time and space allows the contributor or gift giver$_n$ to make his preferred contribution amount of $50.00 at the point where the contribution or gift is solicited, and allows the contributor or gift giver to retire the monetary contribution or gift commitment over a period of time. Therefore, providing electronic contributions or gifts management terminal 100 or peripheral 100 to this contributor or gift giver will increase $C_i$ and $C(p)$. The individual contributor or gift giver will receive the benefit of being able to retire the monetary contribution or gift commitment over time while the fundraising organization or gift recipient will be able to receive a "lump-sum" of contributions and gifts entered on electronic contributions or gifts management terminal 100 or peripheral 100 by contributors or gift givers in group 4000.

$N_i$ is a variable that is correlated to a psychological factor associated with the use of a bank card to make a contribution or gift, and the perception by a contributor or gift giver that a contribution or gift made by way of credit card does not involve the use of cash in hand or "real money." The use of bank cards for contributions or gifts involves variable $N_i$. Provision of or advancement of the electronic contributions or gifts management terminal 100 or peripheral 100 or a group of terminals 100 to or amidst a group 4000 induces contributors or gift givers to make larger contributions and gifts than would otherwise be made by way of cash or check. Hence, $N_i$ increases in value. $N_i>1$ when electronic contributions or gifts management terminals 100 or peripherals 100 are provided to a crowd of prospective contributors or gift givers, and/or advanced among or dispersed amidst a crowd of prospective contributors or gift givers. That is, the use of electronic contributions or gifts management terminal 100 or peripheral 100 increases the $C(p)$ for the group 4000.

The variable $X_i$ is the ability of a speaker or solicitor of a contribution or gift to incite the group 4000 to action. The speaker is the stimulus evoking an impulse to make a contribution or gift by contributors or gift givers in group or crowd 4000. The more charismatic the speaker or solicitor of contributions and gifts 4088 (FIG. 17e), the more likely a respective contributor or gift giver$_n$, or group 4000, will be to make a larger 6 respective individual contribution or gift or cumulative contributions and gifts. By way of example, a candidate for political office provides a stimulus evoking an impulse in his supporters to consummate contributions or gifts in the field on electronic contributions or gifts management terminal 100 or peripheral 100 by a rousing speech. By way of example, a derby member provides a stimulus by evoking a plurality of impulses in group 4000 at a service or fund-raiser to make a larger cumulative contribution on electronic contributions or gifts management terminal 100 or peripheral 100. By way of contrast, with the envelope donation system the amount of contribution or gift is generally fixed prior to the service. Consequently, impulse giving by contributors or gift givers in group 4000 is not induced of facilitated and Xi is not increased. The provision of or dispersal of contributions or gifts management terminal 100 or peripheral 100 or a plurality of terminals 100 and/or peripherals 100 harnesses the spontaneous impulse giving potential that is created by the incitement to action created by an external stimulus, e.g. a speech, a moving motion picture, and other auditory or visual stimulus designed to evoke a psychological response, e.g. sympathy, anger, compassion, thanksgiving, contrition, etc., conducive to the making of a monetary contribution or gift commitment.

An incitement or impetus to action can also be provided by an external stimulus provided by a religious object. A religious object includes an icon, a statue of a religious figure, a painting, a relic, or a passage from a holy book. It is understood that the presentation of electronic contribution or gifts or gifts management terminal 100 or peripheral 100 to a contributor or gift giver should be made to a contributor or gift giver when the contributor or gift giver is most inclined to make a contribution or gift. That is, electronic contributions or gifts management terminal 100 or peripheral 100 is presented, circulated, dispersed, or provided in the vicinity of a religious object. Contributors or gift givers are inclined to make contributions and gifts of thanksgiving or atonement when in the presence of a motivator, e.g. a religious object, and/or while praying or worshiping. Hence, in the scenario where an individual contributor or gift giver encounters electronic contributions or gifts management terminal 100 or peripheral 100 during a prayer session or near a religious object, an individual contributor or gift giver is inclined to make a contribution or gift, and to make a larger amount of each respective individual contribution or gift. A religious object is a stimulus that evokes an impulse to make a contribution or gift in one variant.

By way of example, electronic contributions or gifts management terminal 100 or peripheral 100 is an element in an offering system 7777 for the making of contributions and gifts at locations for prayer and worship, and at a religious site or a shrine where a religious object 1000 provides a negative or positive stimulus evoking an impulse in a contributor or gift giver or group of contributor or gift givers or gift givers to make a contribution or contributions and gifts. The system comprises, in combination, a religious object 1000 and an electronic contributions or gifts and gifts management electronic contributions or gifts management terminal 100 or peripheral 100. A religious object 1000 provides a psychological stimulus evoking an impulse or impetus for the making of monetary contribution or gift commitments. An electronic contributions or gifts management terminal 100 or peripheral 100 is positioned at a location in said site in the vicinity of the psychological stimulus (religious object 1000) for facilitating the satiation of an impulse or impetus to make a monetary contribution or gift commitment by use of information bearing card. The electronic contributions or gifts management terminal 100 or peripheral 100 has means for immediately recording and storing a contribution or gift at the point of maxima stimulus for evoking an impulse to make a contribution or gift, e.g. where the contributor or gift giver or group of contributors or gift givers are nearest to the psychological external stimulus, e.g. religious object, icon, religious painting, relic, etc. The information of the monetary numerical amounts of the successive contributions and gifts designated and entered therein are correlated to the individual cardholders whose cards were read by a card reader on electronic contributions or gifts management terminal 100 or peripheral 100. In this way the impulse or impetus to contribute evoked by the psychological stimulus or benefit (whether positive or negative) is satiated, gratified to the fullest, and satisfied.

To increase the impulse level electronic contributions or gifts management terminal 100 or peripheral 100 has a display for displaying message prompts to prospective contributors or gift givers soliciting the making of monetary contribution or gift commitments. Examples of such message prompts are disclosed herein.

In a variant, the contribution or gift system has a electronic contributions or gifts management terminal 100 or peripheral 100 with its own battery powered electrical energy source (electronic contributions or gifts management terminal 100 or peripheral 100 is portable in this variant). Further, electronic contributions or gifts management terminal 100 or peripheral 100 automatically records information entered of the numerical amounts of individual designated monetary contributions and gifts correlated to the indicia read on information bearing cards 145, 150 corresponding to a respective contributor or gift giver for identification of the contributor or gift giver without interposing or unimpeded by a request for authorization between sequential contributions. The information is recorded for eventual off-loading from electronic contributions or gifts management terminal 100 or peripheral 100.

In a further variant, the religious object 1000 inducing a psychological stimulus for evoking an impulse to make a monetary contribution or gift commitment is selected from the group consisting of an icon, a prop, a statue, a painting, a passage from a holy book, or combination thereof.

A method of simplifying and inducing the giving of monetary contribution or gift commitments by individuals, receiving and immediately entering (and optionally immediately recording) thereof upon receipt is provided with offering system 7777 for the making of contributions and gifts at locations for prayer and worship, and at a religious site or a shrine where a religious object 1000 provides a negative or positive stimulus evoking an impulse to make a contribution or gift. The method comprises providing individuals for immediately making of monetary contributions and gifts with electronic contributions or gifts management terminal 100 or peripheral 100 for making of record data of an contribution or gift commitment in the vicinity of a religious object 1000. Religious object 1000 provides a psychological stimulus for evoking an impulse to make monetary contribution or gift commitments. The electronic contributions or gifts management terminal 100 or peripheral 100 has a source of electric power and a plurality of optional entry keys manually operable for entering the amount of the monetary contribution or gift to be given, and a reader 307 on the electronic contributions or gifts management terminal 100 or peripheral 100 for reading a record medium, e.g. an information bearing card, having indicia thereon identifying an individual contributor or gift giver making a given monetary contribution or gift. In a variant, the electronic contributions or gifts management terminal 100 or peripheral 100 has means for making a visual display of the amount entered by manual operation of entry keys, and has means for immediately recording the amount of the contribution or gift including means for storing the amount correlated to the indicia read on the record medium of the corresponding contributor or gift giver. The correlated amount and indicia read by said reader are for eventual off-loading thereof. In yet another variant, the method further comprises the step of directly displaying message prompts, e.g. as those disclosed herein, to prospective contributors or gift givers soliciting the making of monetary contribution or gift commitments, and comprises the steps of refraining from interposing a request for authorization or verification of authorization between sequential or consecutive contributions or gifts made at off-line electronic contributions or gifts management terminal 100 or peripheral 100, off-loading said contributions or gifts from electronic contributions or gifts management terminal 100 or peripheral 100 to card account processor 1031 in order to obtain authorizations for said contributions or gifts, and processing said contributions or gifts by entering debits and credits to respective accounts for authorized contributions or gifts.

In yet another variant, the method further comprises the step of forwarding records of said authorized contributions or gifts to the contributors or gift givers to substantiate said contributions or gifts.

In yet another variant, the method further comprises the steps of refraining from interposing a request for authorization between sequential contributions or gifts made at off-line electronic contributions or gifts management terminal 100 or peripheral 100, off-loading said contributions or gifts from electronic contributions or gifts management terminal 100 or peripheral 100 to an optional clergy member's terminal 120 via communication link 140 from electronic contributions or gifts management terminal 100 or peripheral 100, down-loading the contributions or gifts from the clergy member's terminal 120 to card account processor 1031 in order to obtain authorizations for said contributions or gifts, and processing the contributions or gifts by entering debits and credits to respective accounts for authorized contributions or gifts.

The impulse giving potential is not limited by the amount of cash a contributor or gift giver has on hand, or whether or not the contributor or gift giver has a check book on hand utilizing the methods disclosed herein. Moreover, the provision of electronic contributions or gifts management terminal 100 or peripheral 100 in the vicinity of an externally stimulated contributor or gift giver or by directly handing the electronic contributions or gifts management terminal 100 or peripheral 100 to the contributor or gift giver at the point where he or she is maximally stimulated to make a contribution or gift results in a sudden inclination to enter a contribution or gift, theoretically without conscious thought in one variant. It will be understood that electronic contributions or gifts management terminal 100 or peripheral 100 is presented or provided to a contributor or gift giver or group of contributors or gift givers during a time interval where their arousal from the external stimulus is at its maximum, and where the contributor's or gift giver's or contributors' or gift givers' collective state of mind is most receptive to consummating contributions or gifts and/or making a larger contribution or gift than would otherwise be made if the impulse to contribute were allowed to dissipate or decay over time (FIG. 17d). These factors increase $X_i$ and increase the C(p) of group 4000.

By way of example, a group 4000 is gathered for the presentation of a movie at a movie theater with a projector 4090. Assume the movie's plot concerns a deeply moving social issue, e.g. the plight of individuals with a disease for which there is no known care, namely, cancer or AIDS, etc. or a social problem, e.g. the plight of homeless children. The presentation of the movie to group 4000 serves as the external psychological stimulus preparing the group 4000 for a contribution or gift session and evoking an impulse to contribute. Alternately, the stimulus evoking an impulse to contribute is augmented gradually by the presentation of sequential stimuli, e.g. the presentation of a film followed by the presentation of a speech of an individual with a disease.

A plurality of terminals 100 are circulated, dispersed, or advanced among the crowd or throng of contributors or gift givers in the group 4000. The provision of an external stimulus evoking an emotion, e.g. sympathy, results in a impulse of contributors or gift givers within the group 4000 to enter a contribution or gift on electronic contributions or gifts management terminal 100 or peripheral 100. These factors increase Xi and increase the C(p) of group 4000. Moreover, the interaction of the group, e.g. a "mob mentality," also induces the making of contributions or gifts on electronic contributions or gifts management terminal 100 or peripheral 100.

C(p) is also proportional to the affluence of sub-groups 4001–4004 or group 4000, $A_i$: C(p) $A_i$. More affluent contributors or gift givers are more likely to carry bank cards and are more likely to use them for contributions or gifts. The provision, circulation or advancement of a plurality of terminals 100 to a sub-group, e.g. sub-group 4002, of affluent contributors or gift givers will increase $A_i$. Moreover, $A_i$ is increased through the provision of terminals 100 or peripherals 100 to affluent contributors or gift givers and/or the use of the features on electronic contributions or gifts management terminal 100 or peripheral 100 that allow for a recommended contribution or gift amount to appear on the display of electronic contributions or gifts management terminal 100 or peripheral 100 as a function of the type of bank card used as disclosed herein above.

Figure 18:
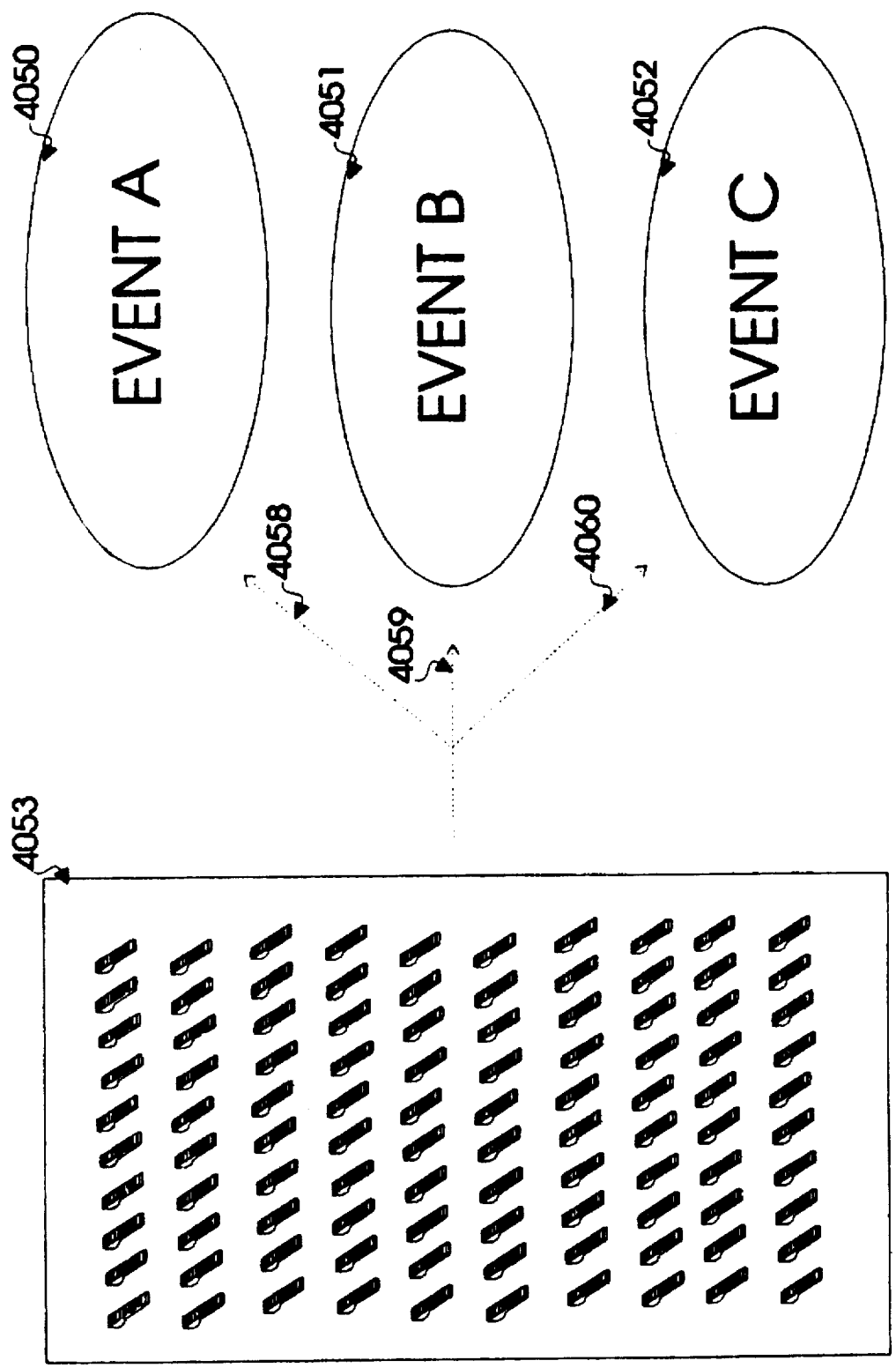
FIG. 18 is a diagram illustrating a method of allocating terminals or peripherals among competing fund-raising or social events.

FIG. 18 illustrates a method of maximizing the contribution or gift potential a single or a plurality of events with a fixed number of terminals 100. The present invention also provides a method of allocating a plurality of fund-raising terminals 100 to maximize the contribution or gift potential of a group of competing events, and to maximize the contribution or gift potential of an individual event.

Assume a fund-raising organization or gift recipient has a plurality of simultaneous competing fund-raising or gift giving events: fund-raising event$_A$ 4050, fund-raising event$_B$ 4051, and fund-raising event$_C$ 4052. Assume a fund-raising organization or gift recipient has a set 4053 of 100 fund-raising terminals 100, terminal$_1$, ... terminal$_{100}$. In order to maximize C(p) over the group of all contributors or gift givers at the competing events, e.g. fund-raising event$_A$ 4050, fund-raising event$_B$ 4051, and fund-raising event$_C$ 4052, a fund-raising organization allocates terminals from fixed set 4053 using a hierarchical method in which larger sub-sets of terminals 100 in set 4053 are allocated to events which have larger contribution or gift potentials. The contribution or gift potentials of events 4050–4052 are calculated first by an assessment of the individual prospective contributors or gift givers attending each respective event and assigning them an individual contribution or gift potential and then summing up the contribution or gift potentials of the individuals to get a total contribution or gift potential for the group.

It will be understood that either all of variables: $M_i$, $P_i$, $G_i$, $C_i$, $N_i$, $X_i$, $A_i$, or a combination thereof, are assessed and used in the calculation of contribution or gift potential for a group, an event, or a respective contributor or gift giver. Assume two competing contribution or gift events 4050, 4051. By way of example, where the group of contributors or gift givers that will attend fund-raising event$_A$ 4050 are on the average more affluent or historically tend to make larger contributions and gifts than the group of contributor or gift givers or gift givers that will attend fund-raising event$_B$ 4051 (with all other variables held constant), the C(p) of event 4050 is larger than the C(p) of event B. The fund-raising organization or gift recipient allocates a larger sub-set of fund-raising terminals from set 4053 to fund-raising event$_A$ 4050 (the event with the larger contribution or gift potential) than to event 4051 (the event with the lower contribution or gift potential). Routines on terminal 120 allow for immediate assessment of the contribution or gift potential of a prospective group of contributors or gift givers based on data stored in a data base, e.g. historical contribution or gift giving data, demographic contribution or gift giving data, etc.

In the scenario, where there are three or more competing contribution or gift events, e.g. events 4050–4052, sub-sets of terminals 100 from set 4053 are allocated proportionally to the contribution or gift potentials of each respective fund-raising event 4050–4052. By way of example, assume fund-raising event$_A$ 4050 has a contribution or gift potential rating of 10, fund-raising event$_B$ 4051 has a contribution or gift potential rating of 5, and fund-raising event $_C$ 4052 has a contribution or gift potential rating of 1. The fund-raising organization proportionally allocates the largest number of terminals to fund-raising event$_A$ 4050; the second largest number of terminals are allocated to fund-raising event$_B$ 4051; and the smallest number of terminals are allocated to fund-raising event $_C$. This method allows the maximization of the contribution or gift potential over the total number of competing events 4050–4052. Hence, this method of allocation maximizes the contribution or gift potential from fixed set 4053 of terminals 100. Routines on terminal or peripheral 100 assess the contribution potential of a group of crowd and provide data to assist in said allocation of terminals.

Figure 18A:
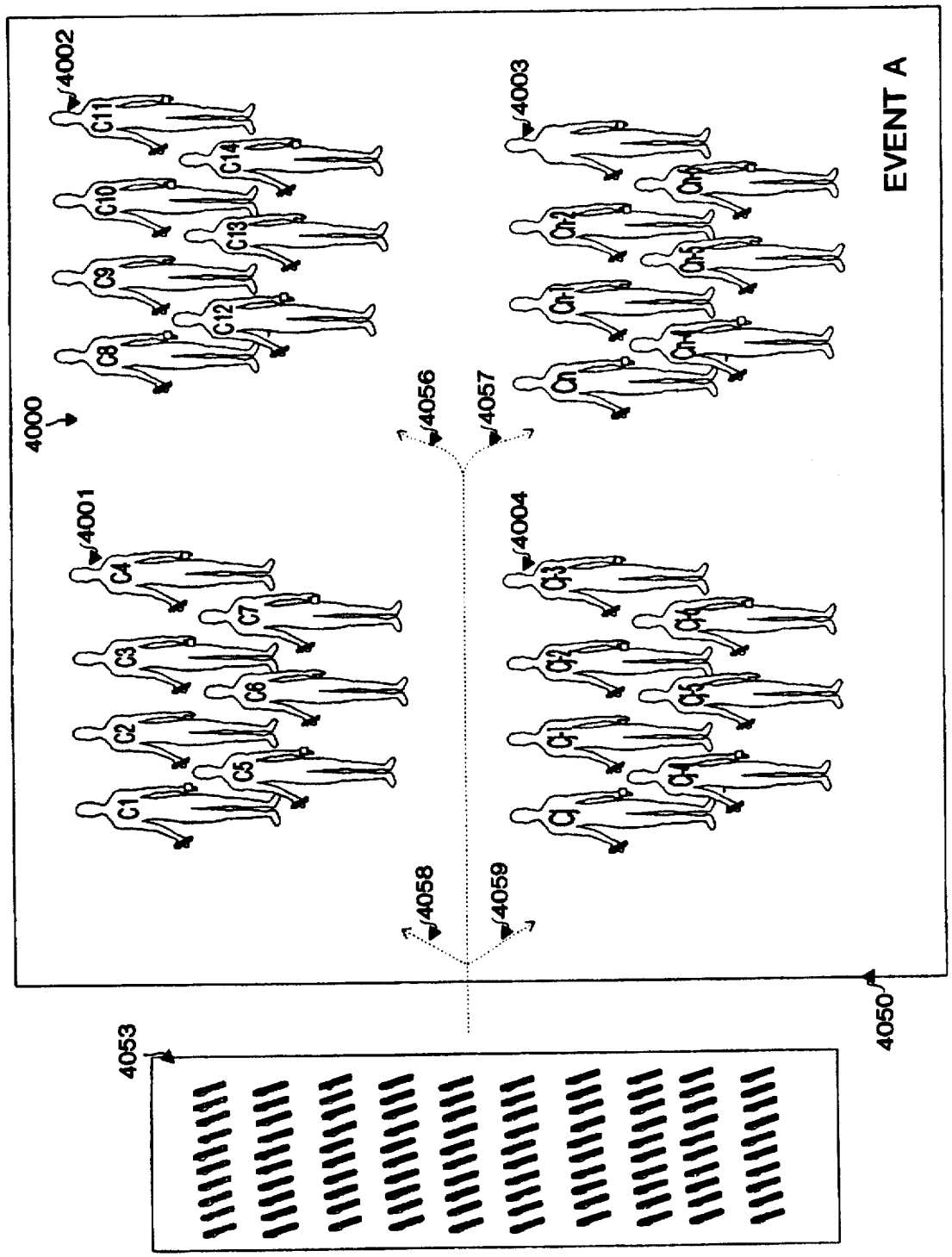
FIG. 18a is a diagram illustrating a method of allocating terminals or peripherals among competing sub-groups of contributors or gift givers within a single fund-raising or social event.

FIG. 18a illustrates the method of allocating a set of terminals 100 within a single fund-raising event$_A$ 4050 and a mode of operation of terminal 100, peripheral 100, and/or terminal 120. The method of allocation of the set 4053 of terminals 100 is used to maximize the contribution or gift return of a contribution or gift session. That is, within an individual fund-raising event$_A$ 4050, the fund-raising organization can maximize C(p) for event 4050. By way of example, group 4053 comprises one hundred (100) terminals 100. Of course, group 4053 can comprise any number of terminals 100 and will generally be a function of the number of terminals a fund-raising organization or gift recipient has means to purchase or obtain.

In a variant, terminals 100 are interchangeable from one fund-raising event to another fund-raising event so that initialization of any electronic contributions or gifts management terminal 100 or peripheral 100 can be accomplished from any terminal 120 or some remote location. Consequently, a first fund-raising organization or gift recipient utilizes un-initialized terminal or peripheral from a second fund-raising organization or gift recipient.

By way of example, the fund raiser, gift recipient, or fund-raising organization provides the group 4053, or subset thereof, to the group of contributors or gift givers with more affluence, group 4001 as indicated by phantom line 4058. We will assume in this scenario that group 4001 has a larger $A_i$ than groups 4002–4004. Terminals 100 or peripherals 100 are provided as described herein to the crowd of contributors or gift givers in group 4001 prior to being provided to groups 4002–4004 in one variant. Contributors or gift givers in group 4002–4004 are less affluent, e.g. have lower $A_i$ ratings. This will result in the group of more affluent contributors or gift givers in group 4001 having a higher $M_i$ thus increasing their satisfaction with the contribution or gift process and maximizing the contributions and gifts obtained from this group of affluent contributors or gift givers. Then terminals 100 and/or peripherals are then provided to a group of contributors or gift givers with lower $A_i$ ratings. As such the C(p) for event A can be maximized. Routines on terminals 100 or peripherals 100 provide immediate assessment of this variable as described herein.

Further, the $A_i$ ratings for the other groups 4002–4004 are calculated and terminals in group 4053 provided thereto in proportion to the $A_i$ ratings for the respective groups as indicated by phantom lines 4056–4059.

It is understood that the methods and modes of operation disclosed herein can also be used to provide terminals 100 or peripherals 100 to contributors or gift givers who have historically contributed to a fund-raising organization or gift recipient prior to providing the terminals or peripherals to other contributors or gift givers, and can also be used in combination with other factors that affect the contribution or gift potential of a group or an individual described herein.

Hence we see that providing the features and benefits of electronic contributions or gifts management terminal 100 or peripheral 100 will increase C(p) over a group of contributor or gift givers or gift givers and increase the amount of contributions and gifts collected.

The electronic contributions or gifts management terminal 100 or peripheral 100 gathers and provides information of who current contributors or gift givers are. It is desirable to obtain demographic information about current contributors or gift givers. By way of example, information concerning the sex of contributors or gift givers provides useful data that allows a fund-raising organization or gift recipient to tailor its efforts to maximize the contribution or gift process. Electronic contributions or gifts management terminal 100 or peripheral 100 allows a fund-raising organization or gift recipient to immediately record and obtain information comprising whether the current (optionally consecutive) contributors or gift givers are young or old, educated or non-educated, if they have conservative or liberal voting tendencies, whether they attend a baseball game or the opera, do they see themselves as extroverts or introverts. This information allows the fired-raiser or gift recipient to immediately know who the present contributors or gift givers are and allows the fund-raiser or gift recipient to cultivate, solicit and thank current contributors or gift givers thereby generating contributor or gift giver loyalty and future contributions and gifts.

Information whether current contributors or gift givers are male or female is obtained by reading information bearing card 100. The first name of a respective contributor or gift giver, or whether a contributor or gift giver has Mr., Ms., or Mrs. is read from the indicia encoded on the card. If the "first name" e.g. Steven, of a contributor or gift giver is read a software routine is run to determine if the first name is a name usually given to a male or to a female. This method allows a fund-raising organization, gift recipient, or person to determine percentages of male and female contributors or givers.

In a variant, the contributor or gift giver information entered from a respective contributor's or gift giver's information bearing card is entered into electronic contributions or gifts management terminal 100 or peripheral 100 by the methods and modes of operation described above. This card information is electronically associated with information that comprises an address of the contributor or gift giver from a database, such as a local electronic telephone directory, a national electronic telephone directory, e.g. MCI's national telephone directory service. The contributor or gift giver information is entered onto a mailing list.

Hence, a streamlined method of preparing a mailing list utilizing terminals 100 or peripherals is provided by the method and mode of operation disclosed herein.

In a variant, the card information entered into terminals 100 or peripherals 100 is used in a method and mode of operation to determine changes in demographic trends of the fund-raising organization's future prospective contributors or gift givers as compared to the fund-raising organizations or gift recipients present group of contributors or gift givers. Assume that groups 4001 and groups 4004 are a fund-raising organization's or gift recipient's current groups of prospective contributors or gift givers. Assume that groups 4002 and groups 4003 are a fund-raising organization's future groups of contributors or gift givers. Changes in patterns of contributions and gifts made by groups 4001 and 4004 are tabulated. This changes are used to predict the composition of groups 4002 and 4003 to determine if the future groups, 4002 and 4003, will have the same characteristics as the current groups, 4001 and 4004, or if the groups' characteristics will be different.

Electronic contributions or gifts management terminal 100 or peripheral 100 provides message prompts on display 840 that stimulate and motivate contributors or gift givers evoking an impulse or providing an impetus to make contributions and gifts by expressing the message that if a contribution or gift is made, the contributor or gift giver has, for example, "molded the future." For example, display 840 begins a contribution or gift session with the message "You can teach twelve illiterate people to read with a contribution or gift of $20.00" and concludes a respective contribution or gift session by displaying a message, "Your contribution or gift has just provided three meals a day for ten orphans." Prompts of this type stimulate and motivate the impulse for the making of initial and subsequent contributions or gifts by providing contributors or gift givers a positive psychological boost, e.g the message makes the contributors or gift givers "feel good" upon making the contribution or gift.

Electronic contributions or gifts management terminal 100 or peripheral 100, terminal 120, a card account processor 1031, or combination thereof, in one mode of operation, provide for automated and/or direct identification and categorization, grouping, classification, stratification, and/or ordering, compilation of statistical data about contributors or gift givers, contributions and/or gifts. By way of example, the system allows for and greatly facilitates and streamlines the organization of the largest contributor or gift giver gift or contribution down to the smallest contributor or gift giver contribution or gift given at a single or a multiplicity of contributions or gifts session. For example, assume contributor or gift giver 1 contributes $50, contributor or gift giver 2 contributes $100, and contributor or gift giver 3 contributes $150 on electronic contributions or gifts management terminal 100 or peripheral 100. Terminal or peripheral directly records the numerical contribution or gift data and immediately, or upon activation, tabulates statistically significant data about the contribution session involving the three contributors. At a remote site, a report is printed indicating that contributor or gift giver 3 was the major donor at the contribution or gift session, contributor or gift giver 2 was the second largest donor at the session, and contributor or gift giver 1 was the third largest donor at the contribution or gift session. Similarly, contribution or gift information for a plurality of contribution or gift sessions is tabulated indicating the rankings of respective contributor or gift givers or gift givers. It will be understood that the compilation of this information provides for rapid identification of contributors or gift givers who then can be subsequently solicited for contributions and gifts.

For example, a contributor or gift giver who makes a small contribution or gift on an annual basis, e.g. $50, for fifty or sixty years, will give $2500 over a fifty year period, and $3000 over a sixty year period. Therefore, electronic contributions or gifts management terminal 100 or peripheral 100, terminal 120, a card account processor, or combination thereof, provides a system and method for facilitating the tracking or keeping an account of the cumulative contributions and gifts of respective contributors or gift givers. In one mode of operation, terminal 100 or peripheral 100, terminal 120, computer 3397, or combination thereof, monitors the frequency of donations made by a multiplicity of contributors or gift givers.

Based on the contribution data entered on terminal 100, peripheral 100, or remote personal computers at the remote locations, as given to a single or a multitude of gift recipients, reports are then printed and forwarded to individual contributors or gift givers who make contributions and gifts to the fund-raising organization sharing the organizations appreciation with loyal contributors or gift givers and assisting in obtaining for continuing support. The method and mode of operation of described herein streamlines the acknowledgment process.

In yet a further variant, terminal 100, peripheral 100, or terminal 120, or computer 3397, have routines thereon that monitor the frequency of contributions made by respective contributors, an forward acknowledgments after a certain threshold has been reached. For example, a first contributor's or gift giver's frequency of contributions or gifts are monitored over time. If the contributor or gift giver gives contributions or gifts several times a week, the data surrounding the contributions or gifts is assembled on a data base and an acknowledgment is sent after a series of contributions or gifts have been made, e.g. 10 contributions or gifts. The historical frequency of the first contributor's or gift giver's giving is tabulated, and then used as a reference in determining when or after what interval of time to send the contributor or gift giver an acknowledgment. In the case of the first contributor or gift giver it would be extremely inefficient to send the contributor a separate acknowledgment for each individual contribution of gift. The method and mode of operation significantly streamlines the acknowledgment process.

Where a second contributor or gift giver gives contributions sporadically, an interval of time is tracked. We will assume that the second contributor or gift giver makes contributions or gifts once a month. The data surrounding the contributions or gifts is assembled on a data base. The frequency of the giving of the second contributor or gift giver is determined for an interval of time. An acknowledgment is optionally sent after a series of contributions or gifts have been made, e.g. 10 contributions or gifts. The historical frequency of the second contributor's or gift giver's giving is tabulated, and then used as a reference in determining when or after what interval of time to send the contributor or gift giver an acknowledgment. In the case of the second contributor or gift giver it would be extremely efficient to send the contributor a separate acknowledgment for each individual contribution of gift since they are spread out over a longer period of time. The method and mode of operation significantly streamlines and brings significant economies to the acknowledgment process for both sporadic and frequent contributors and gift givers.

These reports motivate and stimulate an impulse in a committed annual contributor or gift giver to continue to make contributions and gifts every year, or at some other appropriate interval, bringing the total of the respective contributors or gift givers contributions and gifts well into hundreds, even thousands of dollars. Electronic contributions or gifts management terminal 100 or peripheral 100 provides an input for entering contributor or gift giver information and contribution or gift information that allows for the tracking of contributor givers or gift givers, the frequency of the giving of contributions, and the like.

Figure 17G:
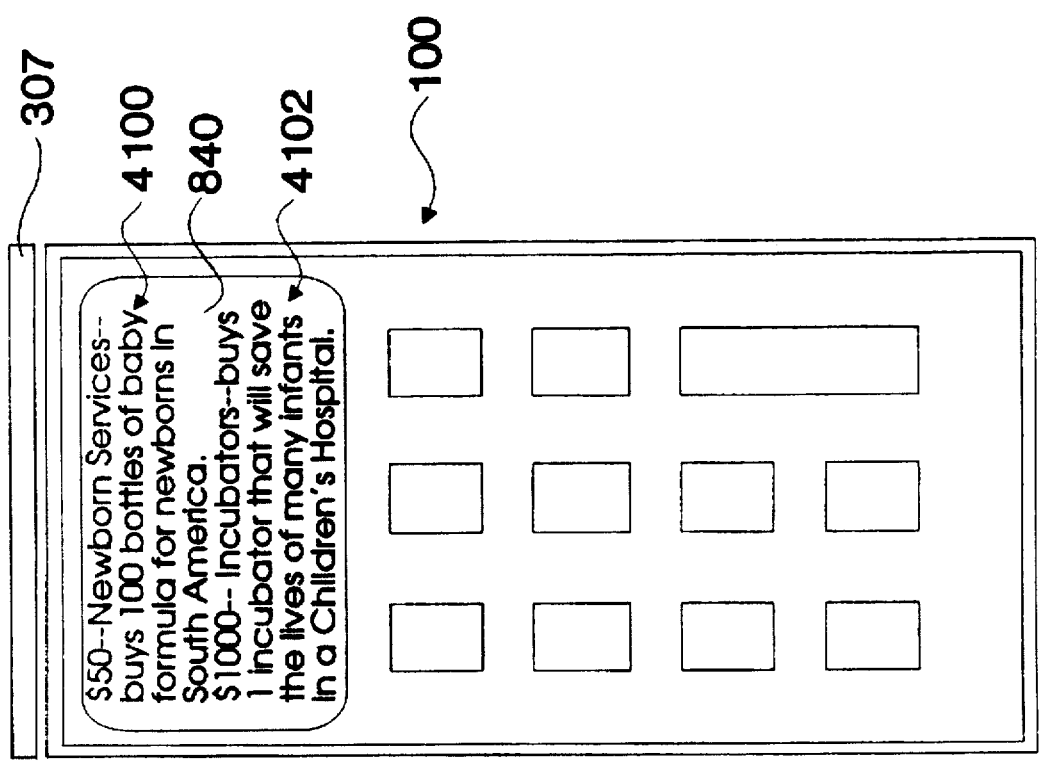
FIG. 17g is a plan view of a face of a terminal or peripheral for soliciting contributions and gifts for a fund-raising organization or gift recipient where there are another group of wish list messages displayed during a contribution or gift session.
Figure 17F:
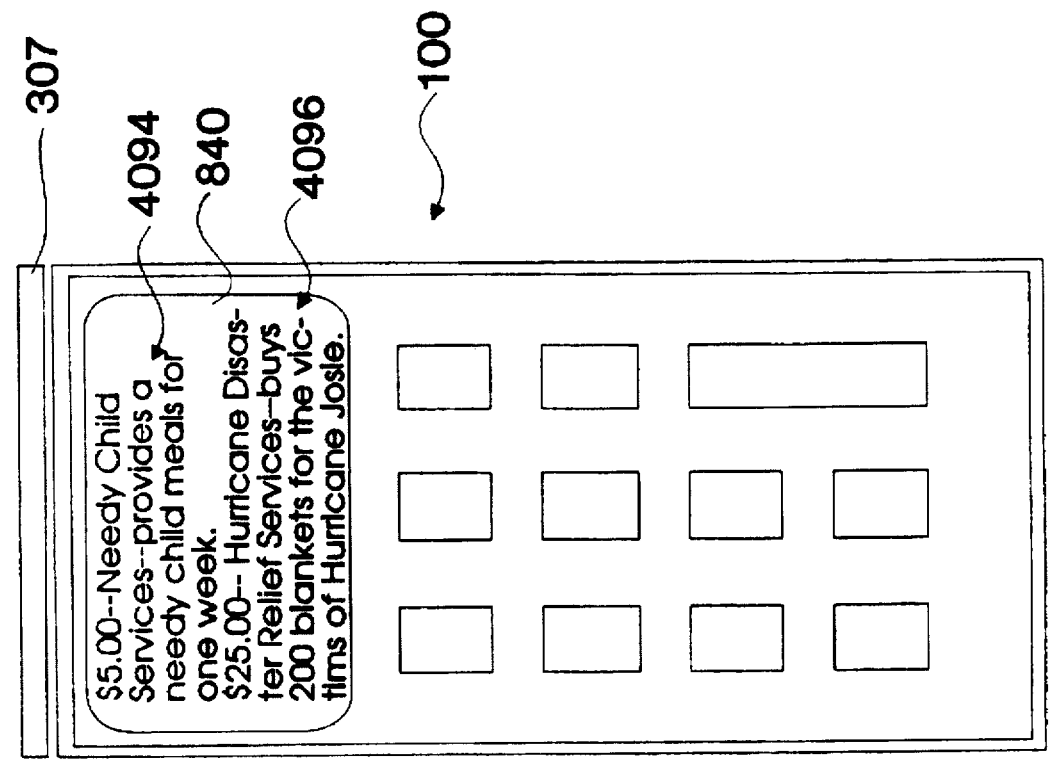
FIG. 17f is a plan view of a face of a terminal or peripheral for soliciting contributions and gifts for a fired-raising organization or gift recipient where there are wish list messages displayed during a contribution or gift session.

As illustrated in FIGS. 17*f* and 17*g*, electronic contributions or gifts management terminal 100 or peripheral 100 utilizes message prompts displayed on display 840 to communicate wish list item prompts 4094, 4096, 4100, and 4102. Wish list item prompts are stimulus that evoke an impulse to make a contribution or gift. Wish list item prompts generally present needs for items the fund-raising organization of gift recipient has for specific projects. For example, wish list items for a political candidate includes a phone system for a campaign, the printing of 5000 copies of a newsletter to be sent to voters, etc. Wish list items for a wedding might include a new car, a new house, a television set, spending money for a honey moon, and the like. Wish list items for a funeral might include a monetary gift to a research foundation, e.g. the American Heart Association (where the individual died from a heart attack), the American Lung Association (where the individual died from lung cancer), for the spouse or children of the deceased. A wish list item for a christening or baptism includes a monetary gift for a college fund, for the child's toys, etc. Exemplary, wish list items for an anniversary include a trip for a second honeymoon and the like. It is understood that wish list items are programmed into terminal 100 or peripheral 100 as a function of the social event the terminals or peripherals are used at. It is further appreciated that the wish list data, and contribution or gift data are further correlated in a variant of the mode of operation of the terminal or peripheral. This correlated data is then immediately recorded onto a report in one variant. In yet a further variant, terminal 100, peripheral 100, terminal 120, peripheral 120, provides for the automatic and customized generation by way of a remote printer of customized thank you cards for the contributors or gift givers. The customized thank you cards comprise gift giver name data, address data and optional wish list item data. The mode of operation and method described herein significant streamline the acknowledgment of gifts and contributions.

By way of further example, display 840 prompts a contributor or gift giver stimulating him or her and creating an impulse make a contribution or gift to obtain second wish list item 4094 for the fund-raising organization: "$5.00—Needy Child Services—provides a needy child meals for one week." Prompt 4094 is be displayed concurrently with other prompts, e.g. wish list item prompt 4069, in one variant. In another variant, prompt 4094 is displayed for a time out period on display 840.

A second electronic contributions or gifts management terminal 100 or peripheral 100 has second wish list item prompt 4096 displayed to a contributor or gift giver soliciting a contribution or gift for a second wish list item: "$5.00—Needy Child Services—provides a needy child meals for one week." A third wish list item prompt 4096 is displayed to a contributor or gift giver soliciting a contribution or gift for a third wish list item: "$25.00—Hurricane Disaster Relief Services—buys 200 blankets for the victims of Hurricane Josie." A fourth prompt 4100 is displayed to a contributor or gift giver soliciting a contribution or gift for a fourth fund-raising organization wish list item: "$50.00—Newborn Services—buys 100 bottles of baby formula for newborns in South America." A fifth prompt 4102 is displayed to a contributor or gift giver soliciting a contribution or gift for a fifth fund-raising organization wish list item: "$1000.00—Incubators for Prematurely Born Infants in India—buys 1 incubator that will save the lives of many infants in a Children's hospital."

It will be understood that the menu of wish list item prompts will induce contributors or gift givers to make contributions and gifts that are used to obtain specific wish list items. Further, terminals or peripherals 100 allow for a gift recipient to track in real time the wish list items for which contributions or gifts have been made, and those wish list items that remain outstanding. As each wish list item 4094, 4096, 4100, 4102 is correlated with a contribution or gift, the respective wish list item may be removed from the group of wish list items displayed on display 840 on electronic contributions or gifts management terminal 100 or peripheral 100 in one variant. Alternately, the group of wish list items may continue to be displayed and the amount of wish list items which are correlated with contributions and gifts may be tallied. The frequency of contributions or gifts correlated to specific wish list items is automatically tracked and monitored. In a variant this information is communicated in real time to terminal 120 or peripheral 120.

Moreover, electronic contributions or gifts management terminal 100 or peripheral 100 may route all contributions and gifts to a single account, and may keep a running total of the number of specific "wish list" items for which contributions and gifts have been made so that later the wish list items may be purchased according to the respective number of wish list items for which contributions and gifts have been given. By way of example, assume three contributors or gift givers give contributions and gifts selecting wish list item three above, two contributors or gift givers give contributions and gifts selecting wish list item four, and one contributor or gift giver gives a contribution or gift selecting wish list item five. Electronic contributions or gifts management terminal 100 or peripheral 100 stores information about the six total contributions or gifts. (3×$25)+(2× $50)+(1×$1000)=$1175 in contributions and gifts would be entered (optionally immediately recorded, and stored) in electronic contributions or gifts management terminal 100 or peripheral 100 for eventual off-loading thereof. This amount is off-loaded to a single account of the fund-raising organization while a tally of each respective type of wish list item is recorded, e.g. (3×200 blankets)+(2×100 baby bottles)+ (1×1 incubator), so that each item can be purchased in the quantity desired according to the request of the respective contributors or gift givers. The frequency of appearance of wish list item is further monitored and recorded so that future contribution or gift giving sessions can incorporate more wish list items of the type of the most popular wish list items in order to maximize the efficacy of future contribution or gift giving sessions. The mode of operation of the terminals 100 or peripherals 100 is altered to incorporate appropriate displays for the more frequently chosen with list items or items of the category of the more frequently chosen with list items.

In another variant, a plurality of terminals 100 communicate wish list item contribution or gift information among other terminals 100, terminal 120, a display with a transmitter and/or receiver for communicating with electronic contributions or gifts management terminal 100 or peripheral 100, terminal 120, or a combination thereof(not pictured) e.g. a large screen display, or a combination thereof showing the progress being made in with respect to contributions and gifts for respective with list items.

It will be further understood that electronic contributions or gifts management terminal 100 or peripheral 100 by displaying the wish list item prompts 4094, 4096, 4100, and 4102 on display 840 markets the specific philanthropic work a fund-raising organization, and does so without the need for a human solicitor of the contribution or gift in one variant. Moreover, the visual and audio presentation on the display of a larger screen television is a stimulus evoking an impulse to make a contribution or gift.

Electronic contributions or gifts management terminal 100 or peripheral 100 by displaying the various prompts 4094, 4096, 4100, and 4102 on display 840 induces a contributor or gift giver to upgrade his contribution or gift amount by demonstrating to him or her and allowing him or her to compare the difference a slightly larger contribution or gift amount made to a first wish list item makes as opposed to a smaller contribution or gift amount to a second wish list item. By way of example, modest contribution or gift amounts are upgraded, and the efficacy of a contribution session maximized, when a message prompt on terminal 100 or peripheral 100 suggests that "$40.00 purchases meals for a hungry family in South America for a week" as compared to a competing message prompt suggesting that "$35.00 purchases art supplies for a group of three children."

The present invention contemplates that display 840 displays stories, quotes, photographs, multi-media presentations, and other examples to present respective "wish list" items visually to prospective contributors or gift givers. The present invention also contemplates that electronic contributions or gifts management terminal 100 or peripheral 100 has means to display wish list items audibly. The audio display includes additions to processing circuitry that include audio circuitry and speakers.

Figure 18B:
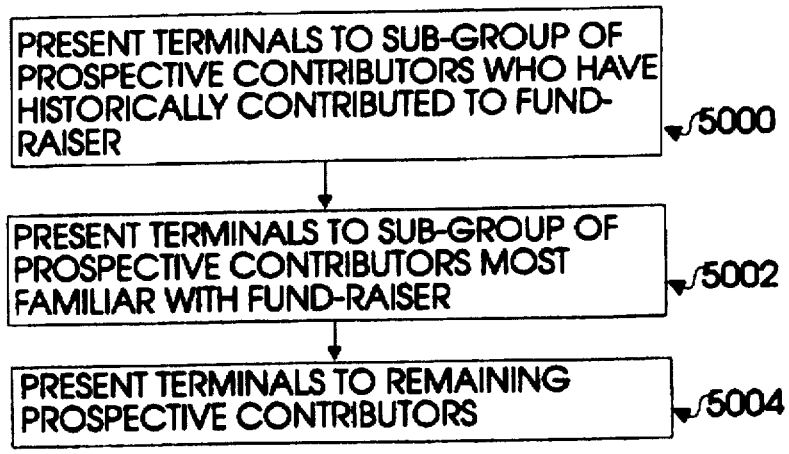
FIG. 18b is a diagram illustrating another variant of a method of allocating terminals among competing sub-groups of contributor or gift givers or gift givers within a single fund-raising event.

FIG. 18b illustrates a method of maximizing the contribution or gift potential of a group with terminal set 4053. Generally, the method comprises presentations or disseminations of terminals 100 within set 4053 to contributors or gift givers who are more likely to make a contribution or gift, a larger contribution or gift, or a combination thereof, prior to presentation to the terminals to group members who are less likely to make a contributions and gifts, are likely to make smaller contributions and gifts, or a combination thereof. The method includes a hierarchical approach for the presentation of terminals 100 to sequential prospective contributor or gift givers or gift givers. Historical gift and contribution giving data is collected as described herein for a group or crowd of contributors or gift givers, and stored on a data base. Routines on computer 3397, for example, analyze the historical contribution and gift patterns and frequencies of the respective members of the group. Identity data of attenders of a contribution session is entered into a data base. The routines then correlate the identity information of the respective attenders of the contribution session with the historical contribution and/or gift patterns with the identity information. Statistical calculations are then performed on the correlated data automatically to ascertain a projected contribution or gift amount for the contribution session based on the historical information and attender data, and this respective contribution session with these specific attenders is correlated with a prospective contribution or gift take value. The same procedure is performed for a plurality of competing events and the competing events are assigned prospective contribution or gift take values. The respective take values are then compared, and the various contribution sessions are then ordered.

For example, the method comprises the step of presenting, circulating, or advancing terminals 100 or peripherals 100 to prospective contributors or gift givers who have historically made commitments to the fund-raising organization 5000 or gift recipient prior to presentation of the terminals 100 or peripherals to other prospective contributors or gift givers at a contribution or gift session 5004. In a variant, the method comprises the step of presenting terminals 100 to sub-groups of prospective contributors or gift givers most familiar with the fund-raising organization 5002 or gift recipient prior to presentation of the terminals 100 to other prospective contributors or gift givers at a contribution session 5004. Based upon the historical contribution or gift frequency data, a respective contributor or gift giver is assigned a potential giving value. The givings values for a multiplicity of contributors or gift givers is assembled in a data base, and presented on terminals 100 or peripherals 100 to assist in the isolation of contributors or gift givers who are more likely to give than randomly chosen contributors.

It will be understood that the method steps 5000, 5002, can be combined. Moreover, it is understood that the analysis of the variable disclosed earlier allows for an assessment of which sub-group of prospective contributor or gift givers or gift givers should first have a sub-set 4053 of terminals 100 presented thereto.

By way of example, a fund-raiser or gift recipient may only have a fixed group of terminals or peripherals 100, e.g. 5 terminals. Assume that there is a group of 1000 prospective contributors or gift givers 4000, e.g. Contributor or gift giver 1 through Contributor or gift giver N (where n=1000) (FIG. 18a), to contact during a single contribution or gift session, e.g event A. We will assume that it would be logistically impossible for a fund-raiser or gift recipient to present the five electronic contributions or gifts management terminal 100 or peripheral 100 units to all 1000 contributors or gift givers during a single contribution or gift session. The fund-raiser or gift giver wishes to maximize the contribution or gift amounts collected from sub-groups 4001–4004 of the 1000 potential contributors or gift givers 4000 at the contribution or gift session, e.g. due to time constraints. The hierarchical approach in the method includes presenting electronic contributions or gifts management terminal 100 or peripheral 100 or the group of five terminals 100 to sub-group 4001 of the group 4000 of potential contributors or gift givers where sub-group 4001 comprises members of the board and development committee of a fund-raising organization, members of the staff of the fund-raising organization, current contributors or gift givers to the fund-raising organization, current volunteers of the fund-raising organizations, current members of the fund-raising organization, retired members of the fund-raising organization, retired staff of the fund-raising organization, contributors or gift givers of the fund-raising organization who have given historically, alumni, or a combination thereof, prior to presentation of electronic contributions or gifts management terminal 100 or peripheral 100 or a group of terminals 100 to the remaining potential contributors or gift givers in group 4000. In one mode of operation, terminal 100 or peripheral 100 stores in a data base an ordering or categorization of the previously mentioned prospective contributors or gift givers correlated to a potential gift or contribution giving value assigned on the respective contributor's or gift giver's propensity to give, e.g. as a function of historical contribution or gift data for the respective contributor or gift giver.

The general theory is that terminals 100 or peripherals 100 should be presented, circulated, advanced, or provided to prospective contributors or gift givers who are most familiar with the fund-raising organization and then sequentially presented and provided to the remaining potential contributors or gift givers who are less familiar with the fund-raising organization. This determination can be made in the field by evaluating data displayed on terminals 100 or peripherals 100, e.g. respective gift giving values. The likelihood of obtaining contributions and gifts from the remaining contributors or gift givers is lower than obtaining contributions and gifts from the groups presented above.

Another example, of utilizing this hierarchical method of providing, circulating, or advancing terminals or peripherals 100, includes presenting, circulating or advancing electronic contributions or gifts management terminal 100 or peripheral 100 to prospective contributors or gift givers who have historically attended prior fund-raising events of the fund-raising organization, customers of the fund-raising organization, potential contributors or gift givers who are family members of the fund-raising organizations loyal contributor or gift givers or gift givers, or a combination thereof, prior to presenting the terminals 100 to other remaining prospective contributors or gift givers.

In a variant, electronic contributions or gifts management terminal 100 or peripheral 100 stores information regarding the most promising contribution or gift prospects and displays this information to a human solicitor of contributions and gifts. For example, data regarding historical contribution or gift amounts and frequencies is gathered and downloaded to electronic contributions or gifts management terminal 100 or peripheral 100, e.g. "Mr. A" contributed $1000 during the last contribution or gift session, and "Mrs. B" contributed $15,000 during the last contribution or gift session. This information is displayed to a human solicitor of contributions and gifts on electronic contributions or gifts management terminal 100 or peripheral 100 in order to order the sequence of contribution or gift solicitation and schedule the amount of time that should be spent with each prospect, e.g. a solicitor may spend more time with Mrs. B since she has historically contributed larger contribution or gift amounts to the cause.

Figure 18C:
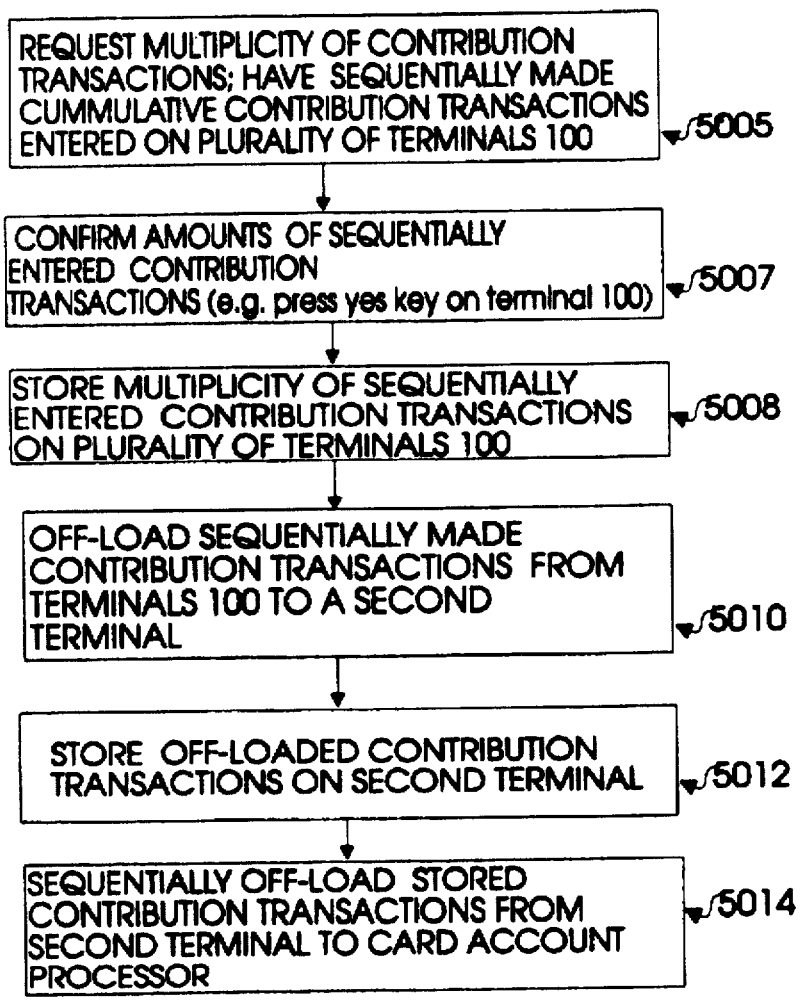
FIG. 18c is a diagram illustrating a method of facilitating the making of a cumulative contribution or gift over time and processing the cumulative contribution or gift over time.

As illustrated in FIG. 18c, electronic contributions or gifts management terminal 100 or peripheral 100 provides for a method of making a total or cumulative contribution or gift over time in one variant. By way of example, message prompt 5006 on display 840 displays a message prompt requesting the contributor or gift giver to make a cumulative contribution or gift over time 5005. For example, prompt 5006 on display 840 reads "Please consider making a monthly contribution or gift of $25.00 over One year for a total contribution or gift commitment of $300.00." The contributor or gift giver is requested to confirm the contribution or gift commitment amount 5007. If yes, electronic contributions or gifts management terminal 100 or peripheral 100 stores the cumulative contribution commitment 5008, e.g. $300, off-loads the contribution cumulative contribution commitment 5010 to, e.g. fund-raisers terminal 120 for storage 5012. As each monthly interval comes up fund-raiser's electronic contributions or gifts management terminal 100 or peripheral 100 transmits the contributor's or gift giver's monthly contribution amount of $25.00 for processing to a card account processor 1031 until the commitment period ends, e.g. until the total contribution of $300 is made. It is understood that the contributor's or gift giver's total amount of his commitment is important and substantial, and giving on a periodic basis allows the contributor or gift giver to budget to accomplish this goal and makes the giving of a larger contribution or gift more appealing since the contribution or gift can be made over time versus in one lump sum.

FIG. 21 is a perspective view of a variant of the fund-raising contributions and gifts management electronic contributions or gifts management terminal 100 or peripheral 100. A portable, hand-held contribution collection peripheral or electronic contributions or gifts management terminal 100 or peripheral 100 is passable and advanceable manually from one contributor or gift giver to another contributor or gift giver as discussed above. The terminal has its own battery electrical energy source 947 and a card reader 307 for reading indicia on an information bearing card identifying a respective contributor or gift giver making a contribution or gift using a respective card record medium for identification of the contributor or gift giver. Electronic contributions or gifts management terminal 100 or peripheral 100 may have a display, but not a keyboard in this variant. The variant is called a keyless terminal or peripheral. Optionally, electronic contributions or gifts management terminal 100 or peripheral 100 does not have a display or a keyboard. In this variant terminal 100 or peripheral 100 is used to automatically correlated a fixed contribution numerical amount to a string of consecutively entered contributor card information as described herein. Optionally, the terminal 100 or peripheral 100 immediately off-loads consecutive contribution or gift information from successive smart cards, and immediately records the information on the terminal 100 or peripheral 100. It will be understood that decreasing the contribution or gift process to one step will significantly decrease the amount of time to consummate a contribution or gift in the filed and also the amount of time necessary to consummate a plurality of contributions or gifts in the field.

Electronic contributions or gifts management terminal 100 or peripheral 100 correlates a pre-programmed contribution or gift amount of an order inducing the making of a contribution or gift with the respective contributor's or gift giver's card information read by the electronic card reader 307. Optionally, where smart cards are used a fixed contribution or gift numerical amount data is off-loaded from the consecutive smart cards of sequential contributors or gift givers and immediately stored on terminal 100 or peripheral 100. The resulting string of contribution or gift data is then off-loaded from terminal 100 or peripheral 100 to another terminal 120, peripheral 120, or other remote data base for storage and processing thereof.

By way of example, contributor or gift giver 1 enters his respective card information on electronic contributions or gifts management terminal 100 or peripheral 100. Electronic contributions or gifts management terminal 100 or peripheral 100 stores contributor or gift giver 1's respective card information correlated to a pre-programmed contribution or gift amount of $50.00. Contributor or gift giver 1 does not perform the step of entering a contribution or gift amount since his card information is correlated to a pre-programmed contribution or gift amount. Electronic contributions or gifts management terminal 100 or peripheral 100 is passed sequentially or advanced to contributor or gift giver 2.

Contributor or gift giver 2 enters his respective card information on electronic contributions or gifts management terminal 100 or peripheral 100. Electronic contributions or gifts management terminal 100 or peripheral 100 stores contributor or gift giver 2's respective card information correlated to a pre-programmed contribution or gift amount of $50.00. Contributor or gift giver 2 does not perform the step of entering a contribution or gift amount since his card information is correlated to a pre-programmed contribution or gift amount. Electronic contributions or gifts management terminal 100 or peripheral 100 is passed sequentially to contributor or gift giver 3. Electronic contributions or gifts management terminal 100 or peripheral 100 is passed or advanced to contributor or gift giver 3. The process is repeated by contributor or gift givers or gift givers sequentially until the last contributor or gift giver, contributor or gift giver N, enters Ms respective card information on electronic contributions or gifts management terminal 100 or peripheral 100. Electronic contributions or gifts management terminal 100 or peripheral 100 stores contributor or gift giver N's respective card information correlated to a pre-programmed contribution or gift amount of $50.00. Contributor or gift giver N does not perform the step of entering a contribution or gift amount since his card information is correlated to a pre-programmed contribution or gift amount.

Data storage in electronic contributions or gifts management terminal 100 or peripheral 100 stores the following:

Contributor or gift giver 1's card information $50.00

Contributor or gift giver 2's card information $50.00 . . . through

Contributor or gift giver N's card information $50.00

Subsequently, terminal or peripheral 100 transmits:

Contributor or gift giver 1's card information and associated $50.00

Contributor or gift giver 2's card information and associated $50.00 . . . through Contributor or gift giver N's card information and associated $50.00 to fund-raiser's or gift recipient's terminal or peripheral 120 via docking station 1999. That is a communication link is established between electronic contributions or gifts management terminal 100 or peripheral 100 and terminal 120 for the transmission of the information above. Terminal 120 stores the information:

Contributor or gift giver 1's card information and associated $50.00

Contributor or gift giver 2's card information and associated $50.00 . . . through Contributor or gift giver N's card information and associated $50.00

Terminal 120 then transmits the information, including optional information identifying a fund-raising organization or gift recipient, an account of a fund raising organization or gift recipient, or combination thereof, via communication link 1030, by way of example a telephone line, to card account processor 1031 or a funds processing network.

It is understood that the correlation of a pre-programmed contribution or gift amount can optionally occur at fund-raisers's terminal 120, a card account processor 1031, or some other site remote from electronic contributions or gifts management terminal 100 or peripheral 100.

In another variant electronic contributions or gifts management terminal 100 or peripheral 100 automatically stores information recorded of the indicia read from each respective consecutive cardholder contributor or gift giver card record medium, e.g. credit card or debit card, on electronic contributions or gifts management terminal 100 or peripheral 100 for eventual off-loading thereof.

For example, data storage in electronic contributions or gifts management terminal 100 or peripheral 100 stores the following in an off-line mode:

Contributor or gift giver 1's card information;
Contributor or gift giver 2's card information; ... through
Contributor or gift giver N's card information.

Subsequently, terminal or peripheral 100 transmits: Contributor or gift giver 1's card information;

Contributor or gift giver 2's card information; ... through
Contributor or gift giver N's card information to fund-raiser's or gift recipient's terminal or peripheral 120 via docking station 1999 or other communication link. Fund-raising terminal 120 stores and correlates each respective contributor's or gift giver's card information with a pre-programmed, post programmed, fixed or pre-set contribution or gift numerical amount:

Contributor or gift giver 1's card information and associated $50.00

Contributor or gift giver 2's card information and associated $50.00 ... through Contributor or gift giver N's card information and associated $50.00.

A communication link is established between terminal 120 for the transmission of the information above to a card account processor. Terminal 120 then transmits the correlated information, including optional information identifying a fund-raising organization, an account of a fund raising organization, or combination thereof, via communication link 1030, by way of example a telephone line, to card account processor 1031 or a funds processing network.

Where a smart cards (the smart card having data comprised of cyber cash, pre-programmed cash equivalents, or combination thereof, stored thereon), are used by consecutive contributors or gift givers to enter contributions on terminals 100 or peripherals 100, the terminals 100 or peripherals 100 have entered thereon (and then transmit for recordation thereof on a remote terminal, peripheral or other piece of hardware) or immediately record thereon, data comprised of:

$50.00 and (Optional contributor or gift giver 1's card information associated thereto)

$50.00 and (Optional contributor or gift giver 2's card information associated thereto) ... through $50.00 and (Optional contributor or gift giver N's card information associated thereto).

A communication link is optionally established between electronic contributions or gifts management terminal 100 or peripheral 100 and terminal 120, or other piece of hardware for the transmission of the information above. Terminal 120 or piece of hardware stores the information:

Total numerical amount data of the contributions made, and optional contributor or gift giver card information.

The data then is transmitted for further processing thereof, including converting the data to other equivalents of cash.

The electronic contributions or gifts management terminal 100 or peripheral 100 or peripheral 100 as described above is utilized in a method of simplifying and inducing the giving of monetary contributions and gifts by individuals, receiving and immediately recording thereof upon receipt. The method comprises the steps of providing, dispersing, advancing, or disseminating among individuals for making of monetary contributions and gifts with a portable, hand-held electronic contributions or gifts management terminal 100 or peripheral 100 for entering and optionally immediately making of record information of a respective contributor's or gift giver's or gift giver's card information. Electronic contributions or gifts management terminal 100 or peripheral 100 has its own source of electric power. Electronic contributions or gifts management terminal 100 or peripheral 100 optionally has a case dimensioned for being held in the palm of an individual's hand, a reader 307 on terminal for reading a cardholder contributor's or gift giver's respective record medium having indicia thereon identifying an individual contributor or gift giver making a given monetary contribution or monetary gift. The electronic contributions or gifts management terminal 100 or peripheral 100 or peripheral 100 has a means for verifying that the respective contributor's or gift giver's card information was correctly entered and read by the card reader 307 on electronic contributions or gifts management terminal 100 or peripheral 100. For example, a light located on the terminal or peripheral flashes after the contributor or gift giver enters his card information on electronic contributions or gifts management terminal 100 or peripheral 100 and the terminal or peripheral correctly reads and stores the card information. By way of yet another example, electronic contributions or gifts management terminal 100 or peripheral 100 audibly indicates that a respective contributor or gift giver has correctly entered his respective card information on electronic contributions or gifts management terminal 100 or peripheral 100, e.g. the electronic contributions or gifts management terminal 100 or peripheral 100 or peripheral 100 projects an audible "Thank you" message via a speaker on the terminal and electronic circuitry.

It is further understood that electronic contributions or gifts management terminal 100 or peripheral 100 has a shell that is dimensioned to be comfortably held in the palm of a contributor's or gift giver's hand. The shell has optional indicia indicating the fund-raising organization or gift recipient to which the contribution is being made and optional indicia thereon indicating the order of the contribution or gift amount made thereon by entering a respective cardholder's card information thereon. The keyless terminal 100 or keyless peripheral 100 has optional means for ratification of the contribution or gift thereon. In this variant, a respective contributor's or gift giver's card information is entered. Prior to recordation on terminal 100 or peripheral 100, or entry and recordation on a remote terminal 120, a contributor ratifies the contribution or gift by e.g. pressing a single key. The process and mode of operation is utilized for a plurality of consecutive contributors or gift givers.

Figure 19:
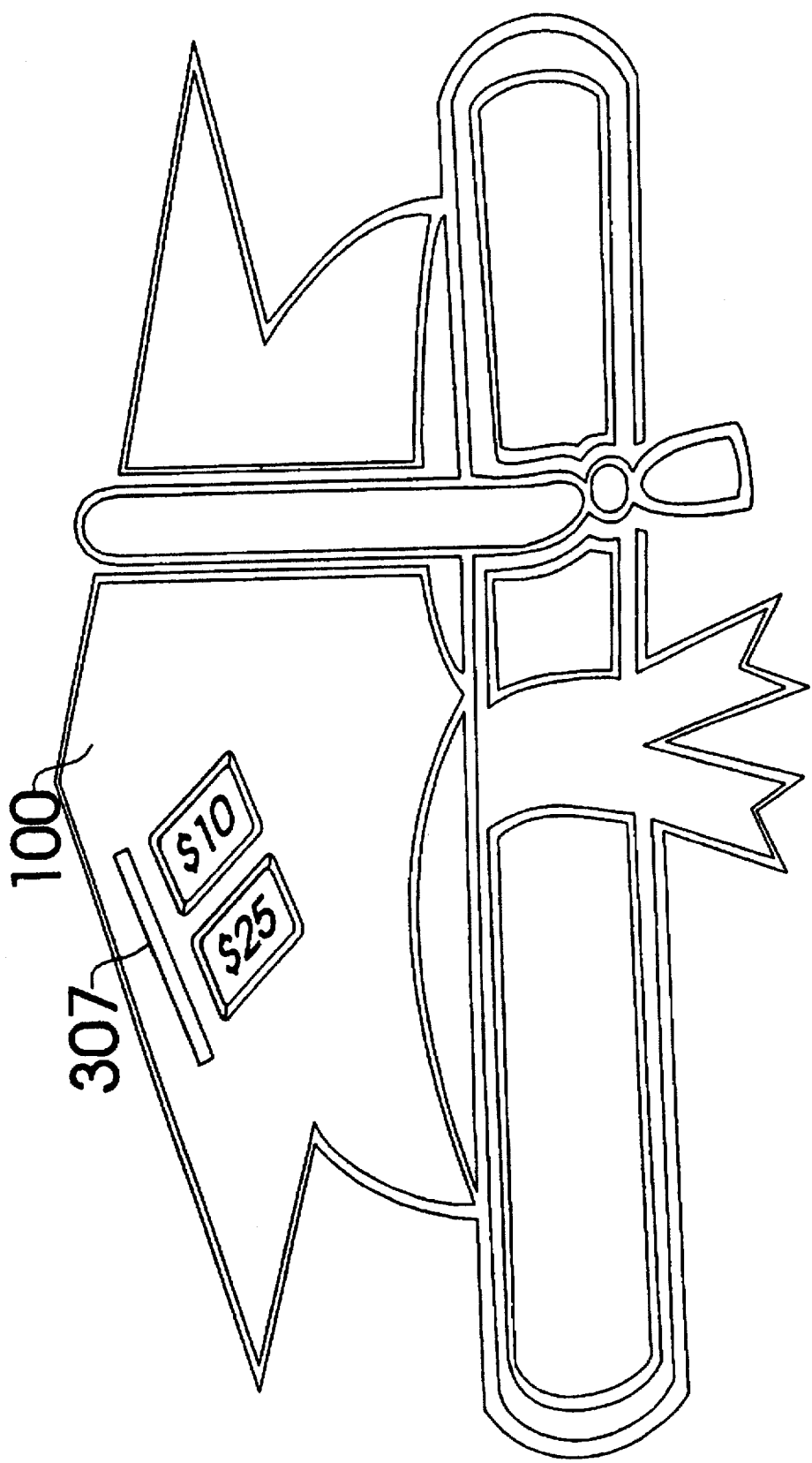
FIG. 19 illustrates a device of the present invention for inducing the making of greater contributions or gifts at exemplary social events such as a graduation.

Electronic contributions or gifts management terminal 100 or peripheral 100 optionally functions in two modes of operation. One mode of operation includes the use of a display and keyboard as described above. A second mode operates in a mode where the keyboard and/or display of the electronic contributions or gifts management terminal 100 or peripheral 100 is overlayed with a removable cover 4600. That is, a case 4600 is provided overlaying the embodiment of electronic contributions or gifts management terminal 100 or peripheral 100 having a keyboard and a display. Optionally case 4600 is in the size and shape of a prop associated with a particular social even, e.g. a wedding cake, a graduation hat (as illustrated in FIG. 19, a birthday cake, or other novelty item inducing the making of a gift, etc. In yet another variant case 4600 encapsulated terminal 100 or peripheral 100, and is removable or modular.

Cover 4600 overlays electronic contributions or gifts management terminal 100 or peripheral 100 in a manner so as to only reveal card reader 307 in one variant. Cover 4600 is removably connected to electronic contributions or gifts management terminal 100 or peripheral 100 so that electronic contributions or gifts management terminal 100 or peripheral 100 can function in the mode where a pre-programed contribution or gift amount is correlated to respective card information.

It is understood that electronic contributions or gifts management terminal 100 or peripheral 100 is activated to work in a mode in which a pre-programed or post-programmed contribution or gift amount is correlated to a respective cardholding contributor's or gift giver's card information automatically once card information is entered onto electronic contributions or gifts management terminal 100 or peripheral 100. When cover 4600 is removed from electronic contributions or gifts management terminal 100 or peripheral 100, the terminal 100 or peripheral 100 is then be activated to work so that contribution or gift amounts are entered via keyboard as described above, e.g. variable contribution amounts are entered thereon. Cover 4600 is made of vinyl, plastic, or other appropriate material. In a variant, cover 4600 is made to removably snap onto terminal's 100 shell. The ability to have a cardholder contributor or gift giver simply enter his card information and not have to manually enter a contribution or gift amount on electronic contributions or gifts management terminal 100 or peripheral 100 greatly decreases the time required to consummate a contribution or gift in the field for a single contributor or gift giver and also for a multiplicity of consecutive contributors or gift givers.

In yet another variant, cover 4600 is of a two piece construction and serves to protect terminal 100 or peripheral 100. The cover is removable and interchangeable so that as it becomes worn from use, the old cover is discarded and a new cover 4600 is placed on terminal 100 or peripheral 100.

FIG. 18b illustrates an optional method of allocating terminals 100 among various contributors or gift givers to maximize contribution or gift collection in a group.

FIGS. 18c illustrate an optional methods of facilitating the making of a multiplicity of contributions or gifts.

FIG. 20 illustrates an optional method of safeguarding contributions or gifts made on terminals 100 or peripherals 100 by communicating the contributions or gifts to a remote terminal, or peripheral.

FIGS. 21-21d illustrate variants of electronic contributions or gifts management terminal 100 or peripheral 100 that increase the convenience of making a contribution or gift on contributions and gifts management electronic contributions or gifts management terminal 100 or peripheral 100. FIG. 21 illustrates electronic contributions or gifts management terminal 100 or peripheral 100 with card reader 307, display 840, and a single confirmation key 96 (A key representing a yes, e.g. a confirmation or ratification key). In these variants, a contributor's or gift giver's card information and a multiplicity of contributor or gift givers or gift givers' respective card information are correlated with a pre-programed or post-contribution session numerical contribution or gift amount. Hence, the contributors or gift givers need only perform the act of sliding (entering) their respective card information on electronic contributions or gifts management terminal 100 or peripheral 100 to make a contribution or gift. Where a smart card is used the card is communicatively linked to terminal 100 or peripheral 100. Data representative of the numerical amount of the contribution or gift is then communicated from the smart card to the terminal or peripheral. Optionally, the data is immediately recorded on terminal 100 or peripheral 100. The process and mode of operation of terminal 100 or peripheral 100 is repeated for a plurality of consecutive contributors' or gift givers' having smart cards and making contributions therewith.

In a variant of the contributions and gifts management terminal 100 or peripheral 100 us utilized for fund-raising silent auctions. Terminal 405 includes shell 405. As illustrated in FIG. 21a, shell 405 includes optional indicia 3235, 3237 thereon representative of the fund-raising organization or gift recipient to which the contribution or gift is being made, and indicia indicating the numeric amount of the contribution or gift, and a method of entering the contribution or gift.

Figures 22, 22A:
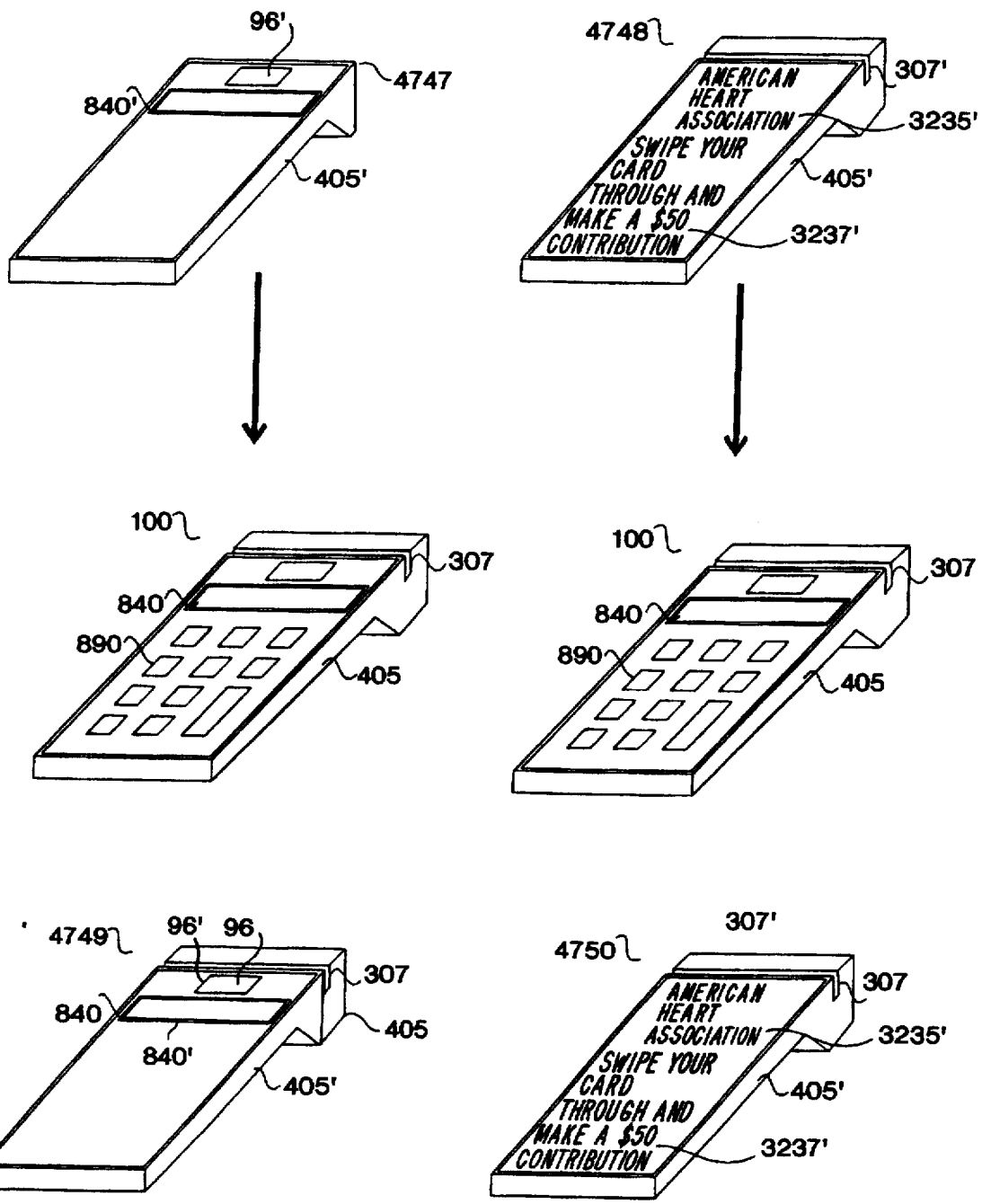
FIGS. 22–22a are perspective views of variants of contributions and gifts management terminals or peripherals that immediately record fixed contributions and gifts and in another mode of operation allow for variable contributions and gifts to be made and immediately recorded thereon; and, FIG. 23 is a perspective view of a system for simplifying the acknowledgment of a plurality of contributions made at remote locations on contributions management terminals or peripherals.

FIGS. 22 and 22a illustrate electronic contributions or gifts management terminal 100 or peripheral 100 and optional terminal covers 4747 and 4748. Terminal covers 4747 and 4748 allow electronic contributions or gifts management terminal 100 or peripheral 100 to operate in the mode as the terminals described in FIGS. 21-21d. That is, electronic contributions or gifts management terminal 100 or peripheral 100 is programmed to operate in standard mode, e.g. one in which a contributor or gift giver enters a variable numeric contribution or gift designation, or an enhanced accelerated contribution or gift mode in which the contributor or gift giver or contributor or gift giver(s) enter only their respective card information, e.g. by sliding their information bearing cards through card reader 307, and having a pre-programmed contribution or gift numeric amount correlated to their respective card information or a post contribution or gift session contribution or gift numeric amount correlated to their respective card information. Covers 4747, 4748 snap on to electronic contributions or gifts management terminal 100 or peripheral 100. In a variant, covers 4747, 4748 are made from a cloth, e.g. vinyl or plastic.

As illustrated in FIG. 22 cover 4747 has aperture 96' and 840'. It will be understood that when cover 4747 is placed over electronic contributions or gifts management terminal 100 or peripheral 100, optional display 840 and optional key 96 are visible and operable. As illustrated in FIG. 22a cover 4748 also has aperture 307' which allows card reader 307 to be accessible when cover 4748 is placed over electronic contributions or gifts management terminal 100 or peripheral 100.

It is understood that the terminals in FIG. 21-21d and terminals 100 with covers 4747, 4748 allow for a contribution or gift to be made quickly and conveniently, and also allow for a multiplicity or plurality of contributions and gifts to be made on electronic contributions or gifts management terminal 100 or peripheral 100 very rapidly since the step of entering a numeric contribution or gift amount by a respective contributor or gift giver(s) is eliminated.

The invention provides a method of simplifying and inducing the giving of successive monetary contributions or successive monetary gifts by prospective contributors or gift givers or prospective giftmakers, receiving and immediately recording thereof upon receipt comprising the step of dispersing through a crowd of prospective contributor or gift givers or gift givers or gift givers a plurality of keyless, electronic contributions or gifts management terminals 100 or peripherals 100 as illustrated in FIGS. 21, 21a, 21b, 21c, 21d, 22 and 22a for immediately making of record successive data sets comprising the identifies of the successive contributors or gift givers or gift givers making the monetary contributions or monetary givers. By way of example, operation of terminal or peripheral 100 in this variant of the method is as follows:

For example, data storage in electronic contributions or gifts management terminal 100 or peripheral 100 immediately records the following in an off-line mode as each successive contributor or gift giver enters his or her respective card information thereon:

Contributor or gift giver 1's card information;
Contributor or gift giver 2's card information; ... through
Contributor or gift giver N's card information.

It is understood that terminal 100 or peripheral 100 is optionally self-powered.

Subsequently, terminal or peripheral 100 communicates:
Contributor or gift giver of gift giver 1's card information;

Contributor or gift giver 2's card information; ... through
Contributor or gift giver N's card information to terminal 120 via optional docking station 1999. Fund-raising terminal 120 correlates each respective contributor's or gift giver's card information with a pre-programmed or pre-set contribution or gift amount:

Contributor or gift-giver 1's card information and associated $50.00
Contributor or gift giver 2's card information and associated $50.00 ... through
Contributor or gift giver N's card information and associated $50.00.

A communication link is established between terminal 120 for the transmission of the information above to a card account processor. Terminal 120 then transmits the correlated information, including optional information identifying a fund-raising organization or gift recipient, an account of a fund raising organization or gift recipient, or combination thereof, via communication link 1030, by way of example a telephone line, to card account processor 1031 or a funds processing network.

It is further understood that terminal or peripheral 100 need not communicate the respective contributor or gift giver card information to terminal 120 for correlation of the respective contributors' or gift givers' or gift givers' card information to a fixed numerical amount at terminal 120. Terminal 100 or peripheral 100 further comprises optional means for immediate correlation of a fixed contribution or gift numerical amount, e.g. $5.00, $50.00, $1000.00, to the successive contributors' or gift givers' card information. In yet a further variant, sub-groups of contributors' or gift givers' card information are correlated with fixed or pre-determined numerical contribution or gift amounts on terminal or peripheral 100 while other sub-groups are correlated with fixed or pre-determined numerical contribution or gift amounts at a remote location.

It is further understood that the method and operator less, e.g. keyless, device provided herein accelerates the speed in which a plurality of successive contributions or gifts can be made over and above the increase in speed a keyed terminal or peripheral provides. The substitution of an automatic correlation of a numerical amount to successive card record information of contributors or gift givers decreases the decision making time needed to select a variable numerical contribution or gift amount. Further, this substitution greatly increases the convenience of making a contribution or gift by a contributor or gift giver.

Optionally the method further includes having certain contributors or gift givers make gifts or contributions on the terminal 100 or peripheral 100 that are correlated to a fixed numerical contribution or gift amount and in which other contributors or gift givers make gifts or contributions correlated to variable contribution numerical amounts or variable gift numerical amounts.

By way of example, data storage in electronic contributions or gifts management terminal 100 or peripheral 100 immediately records the following in an off-line mode as each successive contributor or gift giver enters his or her respective card information thereon:

Contributor or gift giver 1's card information;
Contributor or gift giver 2's card information; ... through
Contributor or gift giver N's card information.

It is understood that terminal 100 or peripheral 100 is optionally self-powered.

Subsequently, terminal or peripheral 100 automatically correlates or associates a fixed contribution numerical amount or fixed gift numerical amount to the respective successive contributors' or gift givers' card:

Contributor or gift-giver 1's card information and associated $50.00
Contributor or gift giver 2's card information and associated $50.00 ... through
Contributor or gift giver N's card information and associated $50.00.

Other successive contributors or gift givers enter variable contribution or gift amounts on terminal 100 or peripheral 100 for immediate recordation thereof. By way of example, contributor or gift giver N+1 has entered contributor or gift giver N+1's respective contribution or gift amount of $5.00, and his respective card information; where contributor or gift giver N+2 has contributed his respective contribution or gift amount of $10.00 and his respective card information; and, where contributor or gift giver N+3 has contributed his respective contribution or gift amount of $50.00 and his respective contribution or gift amount, contributor or gift giver X has contributed his respective contribution or gift amount of $100.00 and his respective card information, electronic contributions or gifts management terminal 100 or peripheral 100 immediately records the following:

Contributor or gift giver N+1's card information $5.00
Contributor or gift giver N+2's card information $10.00
Contributor or gift giver N+3's card information $50.00
Contributor or gift giver X's card information $100.00

Subsequently, electronic contributions or gifts management terminal 100 or peripheral 100 communicates:

Contributor or gift giver 1's card information and associated $50.00
Contributor or gift giver 2's card information and associated $50.00 ... through
Contributor or gift giver N's card information and associated $50.00.
Contributor or gift giver N+1's card information and associated $5.00
Contributor or gift giver N+2's card information and associated $10.00
Contributor or gift giver N+3's card information and associated $50.00
Contributor or gift giver X's card information and associated $100.00 to terminal 120 via docking station 1999 or communication link 140. That is a communication link is established between electronic contributions or gifts management terminal 100 or peripheral 100 and terminal 120 for the communication of the information above. Terminal 120 records a copy or original of the information:

Contributor or gift giver 1's card information and associated $5.00

Contributor or gift giver 2's card information and associated $10.00

Contributor or gift giver 3's card information and associated $50.00

Contributor or gift giver N's card information and associated $100.00

Contributor or gift giver N+1's card information and associated $5.00

Contributor or gift giver N+2's card information and associated $10.00

Contributor or gift giver N+3's card information and associated $50.00

Contributor or gift giver X's card information and associated $100.00

Terminal or peripheral 120 then transmits the information, including optional information identifying a fund-raising organization or gift recipient, an account of a fund raising organization or gift recipient, information of the recipient of the gift or combination thereof, via communication link 1030, by way of example a telephone line, to card account processor 1031 or a funds processing network.

Optionally, an authorization is obtained at card account processor 1031 for each contribution or gift. By way of example, information designating each contribution or gift as authorized or unauthorized may be added to each respective contribution or gift data sets:

Contributor or gift giver 1's card information and associated $5.00—unauthorized Contributor or gift giver 2's card information and associated $10.00—authorized Contributor or gift giver 3's card information and associated $50.00—authorized Contributor or gift giver N's card information and associated $100.00—authorized . . . and so on.

The authorized contributions or gifts are then processed further. Processing includes debiting or charging, as appropriate, an account of a Contributor or gift giver for the amount of the authorized contribution or gift. By way of example, Contributor or gift giver 2's account is debited $10.00;

Contributor or gift giver 3's account has a charge added to it of $50.00; and,

Contributor or gift giver N's account has a debit entered to it of $100.00 . . . and so on.

An account of a fund-raising organization or gift recipient is augmented the amount of the authorized contributions and gifts. By way of example, fund raiser's or gift recipient's account 1033 would be augmented for the $10.00 received from Contributor or gift giver 2, for the $50.00 received from Contributor or gift giver 3, and for the $100.00 received from Contributor or gift giver N.

Contributor or gift giver 1's contribution or gift was unauthorized. As an unauthorized contribution or gift it may be reported to the fund raising organization or gift recipient. The fund raising organization or gift recipient may choose to follow up with Contributor or gift giver 1 to determine if the Contributor or gift giver would like to resubmit another contribution or gift. Optionally, Contributor or gift giver 1's card information and respective contribution or gift amount of $5.00 may be discarded.

In the methods described herein the numerical amount to which successive contributor's or gift giver's card information is associated or correlated is selected from the group of a pre-programmed numerical amount, a fixed numerical amount, a variable numerical amount, a numerical amount of an order inducing the making of a monetary contribution or gift, and a post-programmed numerical amount. A pre-programmed amount is entered in one variant on terminal 100 or peripheral 100 for subsequent correlation to the respective contributor or gift givers or gift givers' or gift givers' respective card information entered on terminal 100 or peripheral 100. Variable contribution and gift numerical amounts are also correlated on terminal 100, peripheral 100, terminal 120, card processor 1037, or other remote location with respective contributor or gift givers or gift givers' and gift givers' card information. Optionally, a numerical amount of an order inducing the making of a monetary contribution or gift, e.g. $5.00, $20.00, $50.00, $100.00 is correlated with respective contributor or gift giver card information. In yet another variant, a post contribution or gift session numerical amount is correlated with respective contributor or gift giver card information.

As illustrated in FIGS. 21–22a, a portable contribution or gift management device passable manually from one contributor or gift giver to another contributor or gift giver comprises a self-powered, keyless contributions or gifts management terminal 100 or peripheral 100. The terminal 100 or peripheral 100 has means for immediately recording successive data of information identifying contributors or gift givers. Optionally, the device 100 further comprises means for successively recording information of a plurality of successive card record mediums without or unimpeded by verification of authorization. The device further comprises means for correlating a numerical amount to the successive contributors' or gift givers' card information. By way of example, the numerical amount is selected from the group consisting of a pre-programmed numerical amount, a fixed numerical amount, a variable numerical amount, a numerical amount of an order inducing the making of a monetary contribution or gift, and a post-programmed numerical amount. The device optionally operates in a mode in which the contributions or gifts are made on the terminal or peripheral without interposing requests for verification of authorization between a plurality of contributions or gifts made on the terminal or peripheral whereby the throughput of contributions and gifts and gifts made on the terminal or peripheral is greatly enhanced.

In yet a further variant, the portable, hand-held contribution or gift management device is passable manually from one contributor or gift giver to another contributor or gift giver for the immediate recording of successive contributions and gifts. The device is a self-powered electrical energy powered contributions and gifts management terminal or peripheral having a card reader for reading indicia on a card record medium identifying a respective contributor or gift giver making a corresponding contribution or gift using a respective card record medium for identification of the contributor or gift giver; and, means that immediately record information of successive card record mediums corresponding to the successive contributor or gift givers or gift givers for identification of the contributor or gift givers or gift givers, and said information recorded for eventual off-loading thereof.

As illustrated in FIGS. 22 and 22a, the device comprises means for successively making contributions or gifts on the terminal or peripheral that are correlated to a fixed numerical contribution or gift amount and, means for successively making gifts or contributions correlated to variable contribution or gift numerical amounts. For example, terminal 100 or peripheral 100 operates in one mode of operation that allows a contributor or gift giver to make a variable contribution or gift numerical amount thereon by manually, or vocally, activating an operator 890. In a second mode of operation, overlays or covers 4747, 4748 are snapped on terminal 100 in one variant, and terminal 100 or peripheral 100 is activated so that it functions in a second mode of operation that solely immediately records contributor or gift giver card information. The contributor or gift giver swipes or enters his card record medium (e.g. magnetic stripe card or other type of card, e.g. IC card, etc.) through or into card reader 307. There is immediate correlation with a numerical contribution or gift amount. Optionally, there is subsequent correlation of the successive contributor or gift givers or gift givers' s or gift givers' card information with a numerical contribution or gift amount. Overlay or cover 4747 has apertures 840' and 96' that expose entry key 96 and display 840. Overlay or cover 4748 has optional indicia thereon 3235' identifying the recipient of the gift or contribution, e.g. the American Heart Association. There is also optional indicia 3237 instructing prospective contributor's or gift giver's regarding use of the terminal and informing the prospective contributor or gift givers or gift givers or gift givers of the amount of the gift or contribution that will be correlated to the contributor's or gift giver's or gift giver's respective card information.

In many situations it will be desirable to use terminals 100 or peripherals 100 with a plurality of recipeints of gifts or contributions, or with a plurality of causes associated with a single recipient of gifts or contributions. Contributor or gift givers frequently verify entries on acknowledgments acknowledging the making of a gift or contribution. If an entry is incorrect a contributor or gift giver may dispute the contribution or gift. Hence, it is important for a gift giver or contributor or gift giver to have an accurate description of the identity of a recipient of a gift or contribution on an acknowledgment, the present invention provides a method, device and system for accomplishing this desirable goal.

The invention provides an improved system for immediately making of record contributions and gifts made by successive contributors or gift givers having a portable electronic contributions or gifts management terminal or peripheral for facilitating, accommodating, obliging, attending to the convenience of, harmonizing, contribution or gift preferences of contributors or gift givers with the contributions and gifts actually received on, entered on, or recorded on the terminal and peripheral 100. The invention further provides for inducing the making of successive data strings comprised of monetary contributions or monetary gifts by individual cardholders having a card record medium. As used herein, the term contribution means monetary contribution, and the term gift means monetary gift. The improvement comprises a method of and a means for selectively associating data comprised of the identity of a recipient of a gift or contribution with a string of successive data of contributions or gifts, in which the identity of the recipient of the gift or contribution appears on an acknowledgment forwarded to a contributor or gift giver making said gift or contribution to said respective recipient.

By way of example, a first string of successive data of contributions or gifts, e.g. $C_{1000}$–$G_{1200}$, are entered and immediately recorded on terminal 100 or peripheral 100. The first siring of data is associated or correlated with data set(s) of the recipient of the first string of contributions or gifts, e.g. Organization X:

$C_{1000}$–$G_{1200}$ associated with data sets representative of Organization X.

Terminal 100 or peripheral 100 is activated to correlate a subsequent string of contributions or gifts, e.g. $C_{2000}$–$G_{2200}$, with a recipient of the second group of gifts or contributions, e.g. John Doe. By way of example, the second string of successive data of contributions or gifts, e.g. $C_{2000}$–$G_{2200}$, are entered and immediately recorded on terminal 100 or peripheral 100. The second string of successive data is associated or correlated with data set(s) of the recipient, e.g. John Doe:

$C_{1000}$–$G_{1200}$ associated with data sets representative of John Doe.

The contributions and gifts $C_{1000}$–$G_{1200}$ and $C_{2000}$–$C_{2200}$ are off-loaded from terminal 100 or peripheral 100, to terminal 120, a card processor 1037 or a combination thereof for further processing. The contributors or gift givers who made contributions or gifts $C_{1000}$–$G_{1200}$ have information representative of "Organization X" entered on acknowledgments of the contributions or gifts. The contributors or gift givers who made contributions or gifts $C_{2000-G2200}$ have information representative of "John Doe" entered on their respective acknowledgments of the contributions or gifts. It is understood that the versatility of terminal 100 or peripheral 100 is greatly enhanced by this feature. It is further appreciated that the quantity of recipients for which a single terminal 100 or peripheral 100 can be used to simplify the making of monetary contributions and gifts is also greatly enhanced.

The present invention also provides a method and system of simplifying and streamlining the acknowledgment of a plurality of contributions or gifts. The method comprises the steps of dispersing through a crowd of prospective contributors or gift givers 4000 located at remote locations a plurality of portable, self-powered terminals 100 or peripherals 100 for immediately making of record data comprised of the contributions or gifts. The method further comprises the step of communicating the data to a central location data base or remote location data base. The central location data base or remote location data base, and associated hardware and software, acts as a clearing house and comprises a computer that receives successive data comprised of contributions or gifts from the remote portable, self powered terminals 100 or peripherals 100. The computer stores the successive data directly correlating the data with address information data of respective contributors or gift givers, optionally located on another remote data base. Acknowledgments are forwarded to the contributors or gift givers for the contributions or gifts in which a multiplicity of contributions or gifts made at remote locations are readily acknowledged.

The method of optionally includes the steps of associating said data sets comprised of contributions and gifts with data sets resident in a data base comprised of mailing address data sets.

Portable electronic contributions or gifts management terminal 100 or peripheral 100 facilitates and induces the making of monetary contributions or gifts by individual cardholders having a card record medium. The terminal 100 or peripheral 100 comprises a housing, a card reader on said housing for reading indicia on respective individual card records indicative of the corresponding cardholders making the corresponding monetary contributions and gifts. The terminal 100 or peripheral 100 also includes means in the housing for immediately recording and storing successive variable numerical information and means for correlating the numerical information recorded with successive recorded information corresponding to the respective contributors or gift givers to obtain variable amount contributions and gifts. The housing is enclosed by a second protective housing or overlay. The terminal 100 or peripheral 100 including means for correlating a fixed numerical contribution or gift amount information with successive recorded card information corresponding to the respective contributors or gift givers when the overlay is used with the housing to obtain fixed amount contributions and gifts. Both variable amount and fixed amount contributions and gifts are immediately recorded and stored on the terminal or peripheral for future off-loading of the recorded information from the terminal or peripheral.

A system for simplifying the management of a multiplicity of contributions or gifts made at remote locations is also provided as illustrated in FIG. 23. The system comprises a plurality of portable self-powered contributions or gifts management terminals or peripherals dispersed among a plurality of prospective contributors or gift givers at remote locations. The terminals 100 or peripherals 100 have a multiplicity of data sets comprised of contributions or gifts thereon. The system further includes communication links between the portable contributions or gifts management terminals 100 or peripherals 100 for communicating the contribution or gift data to a central database 3397 (FIG. 23). The system further includes software routines for correlating the contribution data sets with data comprised of address information of respective contributors or gift givers. Address information is optionally resident on remote data bases 3390, 3395 and is communicated to data base 3397 by communication links. Another remote data base has routines thereon for entering credits and debits to accounts of contributors or gift givers for the contributions or gifts and accounts of recipient's of the respective gifts or contributions. Optionally, the system has the portable terminals 100 or peripherals 100 which have routines thereon for immediately recording successive contributions or gifts, and in which contributions or gifts are made upon the portable terminals or peripherals without or unimpeded by verification of authorization.

It is further appreciated that the terminal 100, peripheral 100, method, mode of operation and/or system described herein provides for increasing/enhancing the capacity of a peripheral 100 or terminal 100 to receive a plurality of consecutive contributions or gifts within a limited period of time. Limited periods of time include contribution sessions during, in the course of, in the middle of religious and social events described herein. It is further appreciated that consecutive contributions and gifts made, entered, and/or recorded herein are optionally without, save, disregarding, not including, with the exception of, disregarding and/or omitting remote authorization/verification. The method, terminal, and peripheral of the present invention provide great flexibility in that they are used anyplace, everywhere, in any place, wherever, or in whatever place there is a crowd, gathering, assembly, meeting, conclave, caucus, parley, council, conference, band, congregation, junction, gathering, throng, swarm, flock, convention, synod, horde, social gathering of prospective contributors or gift givers resulting in the accumulation, aggrandizing, enlargement, amassing, aggregation, accrual of contributor or gift giver identity information, contributions and/or gifts. Optionally, one can convene, and/or mobilize a group of prospective contributors, and converge on a group of prospective contributors with terminals 100 or peripherals 100.

It is yet further appreciated that the terminal, peripheral, and methods described herein provide abbreviation, truncation, and paring of the amount of time necessary for the accomplishment of entry and/or recordation of contributions of gifts given at remote locations.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A method of streamlining, simplifying and inducing the giving of contribution or gift commitments by contributors or prospective gift givers comprising, dispersing through a crowd of prospective contributors or gift givers a plurality of keyless, electronic contributions or gifts management devices for immediate entry of consecutive data comprising the identities of the contributors or gift givers making the monetary contribution commitments or monetary gift commitments, entering on said keyless, electronic contributions or gifts management devices said consecutive data comprising the identities of the contributors or gift givers making the monetary contribution commitments or monetary gift commitments, and giving said contributions or gifts by processing said consecutive data comprising the identities of the contributors or gift givers making the monetary contribution commitments or monetary gift commitments.

2. The method of claim 1 in which there are a plurality of gift recipients of the monetary contribution or gift commitments, and further comprising the step of supplanting gift recipient or fund-raising organization data with some other gift recipient or fund-raising organization to which contribution or gift commitments are made, whereby the entry of gifts or contribution commitments to a plurality of the gift recipients or fund-raising organizations is simplified and streamlined.

3. The method of claim 1 further comprising the step of correlating a numerical amount to the successive contributors' or gift givers' data to obtain contribution or gift data sets, and in which the step of dispersing is selected from the group consisting of spreading, distributing, migrating, advancing, disseminating, and diffusing said devices.

4. The method of claim 3 in which a plurality of consecutive contribution or gift commitments are entered on the devices unimpeded by verification of authorization whereby the throughput of contribution or gift commitments entered on the devices is enhanced.

5. The method of claim 3 further comprising the step of communicating the contribution or gift data to a card account processor for processing thereof.

6. The method of claim 5 in which the step of processing comprises entering credits to accounts of recipients of the gifts or contributions and entering debits to accounts of the contributors or gift givers.

7. The method in accordance with claim 5 further comprising the step of temporarily retaining substantially identical data of the contribution and gift commitments at said device and at another remote device simultaneously, whereby there is a decreased risk of loss or corruption of the contribution or gift data on said keyless contributions or gifts management device.

8. The method of claim 1 further comprising the steps of communicating the data for a plurality of contributions or gifts in a substantially continuous stream to a remote device for immediate recordation thereof on said remote device.

9. The method of claim 1 in which a first group of contributors or gift givers make gift or contribution commitments on the devices that are correlated to a fixed numerical contribution or gift amount and in which other contributors or gift givers make gift or contribution commitments correlated to mutable contribution numerical amounts.

10. The method of claim 1 in which a numerical amount of said monetary contribution commitment or said monetary gift commitment is selected from the group of a pre-programmed numerical amount, a prearranged numerical amount, a fixed numerical amount, a variable numerical amount, a numerical amount of an order inducing the making of a monetary contribution, and a post-programmed numerical amount.

11. The method of claim 1 in which the entry of the consecutive contribution or gift commitments further comprises immediately recording said commitments on the devices.

12. The method of claim 1 in which the devices have user interfaces consisting essentially of a means for ratification of a contribution or gift commitment.

13. A portable contribution or gift management device for the making of gift or contribution commitments, said device transferable manually from one contributor or gift giver to another contributor or gift giver, comprising:

a self-powered, keyless contributions or gifts management device, said device having means for immediate entry of data identifying consecutive contributors or gift givers having card record mediums therewith, means for capturing the immediate entry of said data identifying consecutive contributors or gift givers, and means for giving said contributions by processing said data identifying said consecutive contributors or gift givers making the monetary contribution commitments or monetary gift commitments, said means for giving said contributions by processing said data identifying said consecutive contributors or gift givers making the monetary contribution commitments or monetary gift commitments disposed on said self-powered, keyless contributions or gifts management device or optionally disposed on a remotely located device receiving said data identifying said consecutive contributors or gift givers from said self-powered, keyless contributions or gifts management device.

14. The device of claim 13 further comprising means for supplanting a gift recipient or fund-raising organization to which contribution or gift commitments are made with another gift recipient or fund-raising organization to which the contribution or gift commitments are made.

15. The device of claim 13 further comprising means for capturing information of a plurality of consecutive card record mediums of contributors or gift givers without breaking up the capture of the information of the card record mediums, and in which the card record mediums comprise data which is updated periodically.

16. The device of claim 13 further comprising means for directly correlating numerical amount data to the successive contributors' or gift givers' respective card record medium information to obtain contribution or gift data sets.

17. The device of claim 16 in which the monetary contribution commitments or monetary gift commitments further include numerical amount data selected from the group consisting of pre-programmed numerical amount data, fixed numerical amount data, variable numerical amount data, numerical amount data of an order inducing the making of a monetary contribution, and post-programmed numerical amount data.

18. The device of claim 16 in which the consecutive contribution or gift data sets are immediately recorded on the device unimpeded by a remote verification of authorization, whereby the throughput of contribution and gift commitments entered on the device is greatly enhanced.

19. The device of claim 13 further comprising a user interface consisting essentially of means for ratifying the successful entry of the data on the device.

20. The device of claim 13 further comprising means for immediate communication of the contribution or gift commitment data entered on the device to a remote device for immediate recordation thereof on the remote device.

21. The device of claim 20 further comprising means for the remote device and the keyless contributions or gifts management device both to temporarily retain substantially identical data of the contribution and gift commitments, whereby there is a decreased risk of loss or corruption of the contribution or gift data on said keyless contributions or gifts management device.

22. The device according to claim 13 in which said medium has indicia thereon detectable by said card reader for indicating the credit level of the corresponding contributor or gift giver, and said device automatically indicating to the contributor or gift giver whose credit level has been detected a suggested monetary contribution or gift amount to be contributed.

* * * * *